(12) United States Patent
Zafiropoulos et al.

(10) Patent No.: US 11,648,521 B2
(45) Date of Patent: May 16, 2023

(54) CARBON AEROGEL-BASED ELECTRODE MATERIALS AND METHODS OF MANUFACTURE THEREOF

(71) Applicant: Aspen Aerogels, Inc., Northborough, MA (US)

(72) Inventors: Nicholas A. Zafiropoulos, Wayland, MA (US); Roxana Trifu, Worcester, MA (US); Redouane Begag, Hudson, MA (US); Wendell E. Rhine, Belmont, MA (US); George L. Gould, Mendon, MA (US); Alexei A. Erchak, Easton, MA (US); Harris R. Miller, Sharon, MA (US); Nicholas Leventis, Worcester, MA (US)

(73) Assignee: Aspen Aerogels, Inc., Northborough, MA (US)

( * ) Notice: Subject to any disclaimer, the term of this patent is extended or adjusted under 35 U.S.C. 154(b) by 326 days.

(21) Appl. No.: 16/803,348

(22) Filed: Feb. 27, 2020

(65) Prior Publication Data
US 2020/0269207 A1    Aug. 27, 2020

Related U.S. Application Data

(60) Provisional application No. 62/811,230, filed on Feb. 27, 2019.

(51) Int. Cl.
*B01J 13/00* (2006.01)
*H01M 4/38* (2006.01)
(Continued)

(52) U.S. Cl.
CPC ......... *B01J 13/0091* (2013.01); *H01M 4/386* (2013.01); *H01M 4/583* (2013.01);
(Continued)

(58) Field of Classification Search
CPC .... B01J 13/0091; H01M 4/386; H01M 4/583; H01M 10/0525; H01M 2004/021; H01M 2004/023
(Continued)

(56) References Cited

U.S. PATENT DOCUMENTS

| | | | |
|---|---|---|---|
| 4,474,662 | A | 10/1984 | Makino et al. |
| 4,606,955 | A | 8/1986 | Eastman et al. |

(Continued)

FOREIGN PATENT DOCUMENTS

| | | |
|---|---|---|
| CN | 102277648 A | 12/2011 |
| CN | 104241734 A | 12/2014 |

(Continued)

OTHER PUBLICATIONS

Wang ("Nanostructured Si—C composite anodes for lithium-ion batteries") (Year: 2004).*

(Continued)

*Primary Examiner* — Matthew T Martin
*Assistant Examiner* — Paul Christian S T Wyrough
(74) *Attorney, Agent, or Firm* — Womble Bond Dickinson (US) LLP; Deborah M. Vernon; Scott R. Breining

(57) ABSTRACT

Nanoporous carbon-based scaffolds or structures, and specifically carbon aerogels and their manufacture and use thereof are provided. Embodiments include a silicon-doped anode material for a lithium-ion battery, where the anode material includes beads of polyimide-derived carbon aerogel. The carbon aerogel includes silicon particles and accommodates expansion of the silicon particles during lithiation. The anode material provides optimal properties for use within the lithium-ion battery.

26 Claims, 64 Drawing Sheets

(51) Int. Cl.
*H01M 10/0525* (2010.01)
*H01M 4/583* (2010.01)
*H01M 4/02* (2006.01)

(52) U.S. Cl.
CPC .. *H01M 10/0525* (2013.01); *H01M 2004/021* (2013.01); *H01M 2004/023* (2013.01)

(58) Field of Classification Search
USPC ..................................................... 429/231.8
See application file for complete search history.

(56) References Cited

U.S. PATENT DOCUMENTS

| | | | |
|---|---|---|---|
| 4,610,863 A | 9/1986 | Tewari et al. | |
| 4,898,753 A | 2/1990 | Inoue et al. | |
| 4,997,804 A | 3/1991 | Pekala | |
| 5,231,162 A | 7/1993 | Nagata | |
| 5,234,966 A | 8/1993 | Barringer et al. | |
| 5,260,855 A | 11/1993 | Kaschmitter et al. | |
| 5,275,796 A | 1/1994 | Tillotson et al. | |
| 5,284,519 A | 2/1994 | Gadgil | |
| 5,358,802 A | 10/1994 | Mayer et al. | |
| 5,376,209 A | 12/1994 | Stoakley et al. | |
| 5,395,805 A | 3/1995 | Droege et al. | |
| 5,420,168 A | 5/1995 | Mayer et al. | |
| 5,476,878 A | 12/1995 | Pekala | |
| 5,502,156 A | 3/1996 | St. Clair et al. | |
| 5,520,960 A | 5/1996 | Rancourt et al. | |
| 5,565,142 A | 10/1996 | Deshpande et al. | |
| 5,575,955 A | 11/1996 | Caplan et al. | |
| 5,601,938 A | 2/1997 | Mayer et al. | |
| 5,626,977 A | 5/1997 | Mayer et al. | |
| 5,677,418 A | 10/1997 | Thompson et al. | |
| 5,859,171 A | 1/1999 | Sawasaki et al. | |
| 5,908,896 A | 6/1999 | Mayer et al. | |
| 5,962,539 A | 10/1999 | Perrut et al. | |
| 6,194,099 B1 | 2/2001 | Gernov et al. | |
| 6,315,971 B1 | 11/2001 | Wallace et al. | |
| 6,332,990 B1 | 12/2001 | Mayer et al. | |
| 6,399,669 B1 | 6/2002 | Suzuki et al. | |
| 6,451,965 B1 | 9/2002 | Kanada et al. | |
| 6,544,648 B1 | 4/2003 | Nesbitt et al. | |
| 6,586,081 B1 | 7/2003 | Nishinaka et al. | |
| 6,670,402 B1 | 12/2003 | Lee et al. | |
| 6,726,962 B1 | 4/2004 | Loszewski | |
| 7,071,287 B2 | 7/2006 | Rhine et al. | |
| 7,074,880 B2 | 7/2006 | Rhine et al. | |
| 7,811,711 B2 | 10/2010 | Cooper et al. | |
| 8,404,278 B2 | 3/2013 | Albrecht et al. | |
| 8,414,805 B2 | 4/2013 | Wang | |
| 8,999,202 B2 | 4/2015 | Mulik et al. | |
| 9,178,208 B2 | 11/2015 | Park et al. | |
| 9,745,198 B2 | 8/2017 | Leventis et al. | |
| 9,871,248 B2 | 1/2018 | Rayner et al. | |
| 2006/0029857 A1 | 2/2006 | Cherepy et al. | |
| 2006/0084707 A1 | 4/2006 | Ou Duan et al. | |
| 2009/0053594 A1 | 2/2009 | Johnson et al. | |
| 2010/0310847 A1 | 12/2010 | Suh et al. | |
| 2011/0223494 A1 | 9/2011 | Feaver et al. | |
| 2012/0134909 A1 | 5/2012 | Leventis et al. | |
| 2012/0141889 A1 | 6/2012 | Lee et al. | |
| 2012/0152846 A1 | 6/2012 | Leventis et al. | |
| 2012/0202112 A1 | 8/2012 | Yushin et al. | |
| 2013/0040229 A1 | 2/2013 | Grigorian et al. | |
| 2013/0220974 A1 | 8/2013 | Yushin | |
| 2013/0224594 A1 | 8/2013 | Yushin et al. | |
| 2013/0344391 A1 | 12/2013 | Yushin et al. | |
| 2014/0170503 A1 | 6/2014 | Yushin et al. | |
| 2014/0272592 A1 | 9/2014 | Thompkins et al. | |
| 2014/0287641 A1 | 9/2014 | Steiner, III | |
| 2014/0315100 A1 | 10/2014 | Wang et al. | |
| 2015/0064568 A1 | 3/2015 | Yushin et al. | |
| 2015/0236372 A1 | 8/2015 | Yushin et al. | |
| 2015/0283534 A1 | 10/2015 | Costantino et al. | |
| 2015/0325882 A1 | 11/2015 | Yushin et al. | |
| 2015/0349346 A1 | 12/2015 | Yushin et al. | |
| 2016/0104882 A1 | 4/2016 | Yushin et al. | |
| 2016/0133394 A1 | 5/2016 | Sakshaug et al. | |
| 2016/0149278 A1 | 5/2016 | Woehrle et al. | |
| 2016/0240840 A1 | 8/2016 | He et al. | |
| 2016/0344030 A1 | 11/2016 | Sakshaug et al. | |
| 2017/0015559 A1 | 1/2017 | Costantino et al. | |
| 2017/0062219 A1 | 3/2017 | Li et al. | |
| 2017/0098823 A1 | 4/2017 | Yushin et al. | |
| 2017/0121483 A1 | 5/2017 | Poe et al. | |
| 2017/0170477 A1 | 6/2017 | Sakshaug et al. | |
| 2017/0170515 A1 | 6/2017 | Yushin et al. | |
| 2017/0233579 A1 | 8/2017 | Yushin et al. | |
| 2017/0355829 A1 | 12/2017 | Sakaguchi et al. | |
| 2018/0043656 A1 | 2/2018 | Song et al. | |
| 2018/0067262 A1* | 3/2018 | Larson ................ | G02B 6/2556 |
| 2018/0145328 A1 | 5/2018 | Mullins et al. | |
| 2018/0151884 A1 | 5/2018 | Yushin et al. | |
| 2018/0205111 A1 | 7/2018 | Yushin et al. | |
| 2018/0331356 A1 | 11/2018 | Feaver et al. | |
| 2018/0346337 A1 | 12/2018 | Tour et al. | |
| 2019/0006672 A1 | 1/2019 | Yushin et al. | |
| 2019/0040497 A1 | 2/2019 | Yushin et al. | |
| 2019/0051892 A1 | 2/2019 | Yushin et al. | |
| 2019/0062517 A1 | 2/2019 | Steiner et al. | |
| 2019/0081359 A1 | 3/2019 | Yushin et al. | |
| 2019/0081360 A1 | 3/2019 | Yushin et al. | |
| 2019/0123339 A1 | 4/2019 | Yushin et al. | |
| 2019/0148803 A1 | 5/2019 | Lee et al. | |
| 2019/0157682 A1 | 5/2019 | Ho et al. | |
| 2019/0198837 A1 | 6/2019 | Yushin et al. | |
| 2019/0259546 A1 | 8/2019 | Kron et al. | |
| 2019/0326589 A1 | 10/2019 | Ho et al. | |
| 2020/0024796 A1 | 1/2020 | Yushin et al. | |
| 2020/0083542 A1 | 3/2020 | Yushin et al. | |
| 2020/0091517 A1 | 3/2020 | Yushin et al. | |
| 2020/0235420 A1 | 7/2020 | Yushin et al. | |

FOREIGN PATENT DOCUMENTS

| | | |
|---|---|---|
| CN | 106207142 A | 12/2016 |
| DE | 10 2015 207 552 A1 | 10/2016 |
| EP | 0 987 294 A1 | 3/2000 |
| EP | 1 205 512 A1 | 5/2002 |
| WO | 02/052086 A2 | 7/2002 |
| WO | 2004/009673 A1 | 1/2004 |
| WO | 2016/127084 A1 | 8/2016 |
| WO | 2018/095283 A1 | 5/2018 |
| WO | 2018/095285 A1 | 5/2018 |
| WO | 2018/200827 A1 | 11/2018 |

OTHER PUBLICATIONS

Gorgolis ("Graphene aerogels: a review") (Year: 2017).*
Wang ("Preparation and performances of carbon aerogel microspheres for the application of supercapacitor") (Year: 2010).*
Via ("Tensile Modulus Modeling of Carbon Black/Polycarbonate, Carbon Nanotube/Polycarbonate, and Exfoliated Graphite Nanoplatelet/Polycarbonate Composites") (Year: 2011).*
Worsley ("Mechanically robust and electrically conductive carbon nanotube foams") (Year: 2009).*
Gash, et al., "New sol-gel synthetic route to transition and main-group metal oxide aerogels using inorganic salt precursors", Journal of Non-Crystalline Solids, vol. 285, No. 1, Jun. 2001, 22 pages.
Chidambareswarapattar et al., "One-step room-temperature synthesis of fibrous polyimide aerogels from anhydrides and isocyanates and conversion to isomorphic carbons", Journal of Materials Chemistry, Issue 43, 2010, pp. 9666-9678.
Dai et al., "Metal-organic framework-templated synthesis of sulfur-doped core-sheath nanoarrays and nanoporous carbon for flexible all-solid-state asymmetric supercapacitors", Nanoscale. vol. 33, 2018, pp. 15454-15461.
Frackowiak et al., "Carbon materials for the electrochemical storage of energy in capacitors", Carbon, vol. 39, No. 6, May 2001, pp. 937-950.

(56) References Cited

OTHER PUBLICATIONS

Bekyarova et al., "Structure and Physical Properties of Tailor-Made Ce, Zr-Doped Carbon erogels", Advanced Materials, vol. 12, No. 21, 2000, pp. 1625-1628.
F. J. Maldonado-Hodar, et al., "Synthesis and textural characteristics of organic aerogels, transition-metal-containing ) rganic aerogels and their carbonized derivatives," Carbon, 37 (1999) 1199.
Biesmans et al., "Polyurethane based organic aerogels and their transformation into carbon aerogels", Journal of Non-Crystalline Solids, vol. 225, Apr. 1998, pp. 64-68.
Guo et al., "Polyimide Aerogels Cross-Linked through Amine Functionalized Polyoligomeric Silsesquioxane", ACS Appl. Mater Interfaces, vol. 3, No. 2, 2011, pp. 546-552.
Miller et al. "Morphology and Electrochemistry of Ruthenium/ Carbon Aerogel Nanostructures", Langnuir, vol. 15, No. 3, 1999, pp. 799-806.
Wang et al., "Carbon cloth reinforced carbon aerogel films derived from resorcinol formaldehyde", Journal of Porous Materials, vol. 8, 2001, pp. 159-165.
Wang et al., "Electrical Transport Properties of Carbon Aerogels", Journal of Porous Materials, vol. 8, 2001, pp. 167-170.
Kistler, S. S. "Coherent Expanded-Aerogels" Journal of Physical Chemistry. Vol. 36, No. 1, 1932, pp. 52-64.
Leventis et al. "Isocyanate-Derived Organic Aerogels: Polyureas, Polyimides, Polyamides", MRS Proceedings, 2011.
Leventis et al., "Polyimide Aerogels by Ring-Opening Metathesis Polymerization (ROMP)", Chemistry of Materials, vol. 23, No. 8, 2011.pp. 2250-2261.
Li et al., "Novel approach toward a binder-free and current collector-free anode configuration: highly flexible nanoporous carbon lanotube electrodes with strong mechanical strength harvesting improved lithium storage", Journal of Materials Chemistry, vol. 22, 2012 pp. 18447-18553.
Lizeng et al: "Polymer/Carbon-Based Hybrid Aerogels: Preparation, Properties and Applications", Materials, vol. 8, No. 10, Oct. 9, 2015, pp. 6806-6848.
Glora et al., "Integration of Carbon Aerogels in PEM Fuel Cells", Journal of Non-Crystalline Solids, vol. 285, No. 1-3, Jun. 2001, pp. 283-287.
Meador et al., "Mechanically Strong, Flexible Polyimide Aerogels Cross-Linked with Aromatic Triamine", ACS Applied Materials and Interfaces, vol. 4, No. 2, 2012, pp. 536-544.
Meador et al., "Polyimide Aerogels with Amide Cross-Links: A Low Cost Alternative for Mechanically Strong Polymer Aerogels", ACS Applied Materials & Interfaces, vol. 7, No. 2, 2015, pp. 1240-1249.
Nguyen et al., Development of High Temperature, Flexible Polyimide Aerogels, American Chemical Society, Proceedings published 2011.
Pei et al., "Preparation and Characterization of Highly Cross-Linked Polyimide Aerogels Based on Polyimide Containing Trimethoxysilane Side Groups", Langmuir, vol. 30, No. 44, 2014, pp. 13375-13383.
Petricevic et al., "Planar fiber reinforced carbon aerogels for applications in PEM fuel cells", Carbon, vol. 39, No. 6, May 2001, pp. 857-867.
Saliger et al., "High surface area carbon aerogels for supercapacitors", Journal of Non-Crystalline Solids, vol. 225, Apr. 1998, pp. 81-85.
Pekala et al., "Carbon aerogels for electrochemical applications", Journal of Non-Crystalline Solids, vol. 225, Apr. 1998, pp. 74-80.
Hutagalung et al., "Optical and Electrical Characteristics of Silicon Nanowires Prepared by Electroless Etching", Nanoscale Research Letters, vol. 12, 2017, p. 425.
Singh et al., "Sulfur-Doped Laser-Induced Porous Graphene Derived from Polysulfone-Class Polymers and Membranes", ACS Nano, vol. 12, No. 1, 2018, pp. 289-297.
Ye et al., "A new electrocatalyst consisting of a molecularly homogeneous platinum-aerogel nanocomposite", Canadian Journal of Chemistry, vol. 75, No. 11, Nov. 1997, pp. 1666-1673.
Ye et al., "A New Fuel Cell Electrocatalyst Based on Carbonized Polyacrylonitrile Foam: The Nature of Platinum-Support Interactions", Journal of The Electrochemical Society, vol. 144, No. 1, 1997, 90 pages.
Bock et al., "Influence of monomer and catalyst concentration on RF and carbon aerogel structure", Journal of Non-Crystalline Solids, vol. 225, Apr. 1998, 69-73.
Wang et al.: "A dual pore carbon aerogel based air cathode for a highly rechargeable lithium-air battery", Journal of Power Sources, vol. 272, Dec. 25, 2014, pp. 1061-1071.
Hanzawa et al., "Activated carbon aerogels", Langmuir, vol. 12, No. 26, 1996, pp. 6167-6169.
Zhang et al., "Graphene/carbon aerogels derived from graphene crosslinked polyimide as electrode materials for supercapacitors", RSC Advances, vol. 2, 2015, pp. 1301-1308.
International Search Report and Written Opinion of the International Searching Authority in PCT/US2020/020148, dated May 27, 2020.
International Search Report and Written Opinion of the International Searching Authority in PCT/US2020/024086, dated Jun. 16, 2020.
International Search Report and Written Opinion of the International Searching Authority in PCT/US2020/024113, dated Jun. 18, 2020.
Zuo et al., "Polymer/Carbon-Based Hybrid Aerogels: Preparation, Properties and Applications", Materials vol. 8, No. 10, 2015, pp. 6806-6848.
Nitze et al., "A binder-free sulfur/reduced graphene oxide aerogel as high performance electrode materials for lithium sulfur batteries", Scientific Reports, vol. 6, 2016.

\* cited by examiner

| | Si (%) in PI | PI + Si (%) | Carbon fiber (%) | Si (%) in system | Density |
|---|---|---|---|---|---|
| Green PI aerogel | 19.00% | 76.88% | 23.13% | 14.61% | 0.144116 |
| Carbon aerogel | | | | 23.71% | 0.118381 |
| After 2 hours @ 1050C | | | | | |

CARBON AEROGEL-BASED ELECTRODE MATERIALS AND METHODS OF MANUFACTURE THEREOF

CROSS REFERENCES TO RELATED APPLICATIONS

This application claims the benefit of priority from U.S. Provisional Patent Application No. 62/811,230 filed Feb. 27, 2019, which is hereby incorporated by reference in its entirety, with any definitions of terms in the present application controlling.

FIELD

This invention relates, generally, to nanoporous carbon-based materials. More specifically, it relates to carbon aerogels suitable for use in environments containing electrochemical reactions, for example as an electrode material within a lithium-ion battery.

BACKGROUND

Aerogels are solid materials that include a highly porous network of micro-sized and meso-sized pores. Depending on precursor materials used and processing undertaken, the pores of an aerogel can frequently account for over 90% of the volume when the density of the aerogel about 0.05 g/cc. Aerogels are generally prepared by removing the solvent from a gel (a solid network that contains its solvent) in a manner that minimal or no contraction of the gel can be brought by capillary forces at its surface. Methods of solvent removal include, but are not limited to, supercritical drying (or drying using supercritical fluids, such that the low surface tension of the supercritical fluid exchanges with the transient solvent within the gel), exchange of solvent with supercritical fluid, exchange of solvent with fluid that subsequently transformed to supercritical state, sub- or near-critical drying, and sublimating a frozen solvent in a freeze-drying process, see for example, PCT Patent Application Publication No. WO2016127084A1. It should be noted that when drying in ambient conditions, gel contraction may take place with solvent evaporation, and a xerogel can form. Therefore, aerogel preparation through a sol-gel process or other polymerization processes typically proceeds in the following series of steps: dissolution of the solute in a solvent, formation of the sol/solution/mixture, formation of the gel (may involve additional cross-linking), and solvent removal by either supercritical drying technique or any other method that removes solvent from the gel without causing pore collapse.

Aerogels can be formed of inorganic materials and/or organic materials. When formed of organic materials—such as phenols, resorcinol-formaldehyde (RF), phloroglucinol furfuraldehyde (PF), polyacrylonitrile (PAN), polyimide (PI), polyurethane (PU), polybutadiene, polydicyclopentadiene, and precursors or polymeric derivatives thereof, for example—the aerogel may be carbonized (e.g., by pyrolysis) to form a carbon aerogel, which can have properties (e.g., pore volume, pore size distribution, morphology, etc.) that differ or overlap from each other, depending on the precursor materials and methodologies used. However, in all cases, there have been certain deficiencies based on material and application, for example low pore volume, wide pore size distribution, low mechanical strength, etc. Recently, there has been effort devoted to the development and characterization of carbon aerogels as electrode materials with improved performance for applications in energy storage devices, such as lithium-ion batteries (LIBs).

LIBs have seen widespread use in a variety of applications, from handheld electronics to automobiles. They are a type of rechargeable battery in which lithium ions travel from an anode to a cathode during discharge and from the cathode to the anode during charge. Conventionally, the cathode is formed of lithium metal (e.g., cobalt, nickel, manganese) oxide, and the anode is formed of graphite, where lithium ions intercalate within graphite layers during charge (energy storage). Graphite is widely used because lithium intercalation is higher with graphite than other known carbons.

A major drawback of conventional LIBs when there is an increasing demand for higher capacity anode and cathode materials is the limited capacity of graphite; in other words, graphite can accommodate only limited amounts of lithium. It is known that silicon has a greater affinity for lithium compared to graphite (carbon) and is capable of storing significantly higher amounts of lithium than graphite during charging, theoretically resulting in higher capacity on the anode side of the LIB. By comparison, graphite has a theoretical capacity of 372 mAh/g in combination with lithium, whereas silicon has a theoretical capacity of 4200 mAh/g. These numbers have resulted in a desire to dispose as much silicon as possible within the anode. A considerable problem with silicon, however, is that its volume expands 3-4× when fully lithiated (and often breaks or cracks), which drastically limits the amount of silicon that can be disposed within the electrode.

Accordingly, what is needed is an improved nanoporous carbon material that includes a functional morphology and optimal pore structure, while resolving at least one of the issues discussed above. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicants in no way disclaim these technical aspects, and it is contemplated that the claimed invention may encompass one or more of the conventional technical aspects discussed herein, especially in combination with the innovative aspects described herein.

The present invention may address one or more of the problems and deficiencies of the art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY

The long-standing but heretofore unfulfilled need for an improved nanoporous carbon material is now met by a new, useful, and nonobvious invention.

A first general aspect relates to a carbon composition, the carbon composition including a carbon material, e.g., a nanoporous carbon material, and a silicon-based material. The carbon material includes a pore structure and the carbon composition includes greater than about 10% by weight of the silicon-based material and has a silicon utilization of at least about 20%.

In exemplary embodiments, the carbon material has one or more of a pore structure comprising a fibrillar morphology, a Young modulus of at least about 0.2 GPa, an electrical conductivity of at least about 10 S/cm, and a density between about 0.15 g/cc and about 1.5 g/cc.

In another exemplary embodiment, the carbon composition includes a silicon-doped nanoporous carbon material having a silicon utilization of at least about 20%, wherein the carbon material is doped with greater than about 25% of silicon by weight of the carbon material. Optionally, the carbon material can have an electrical conductivity of at least about 10 S/cm. Optionally, the carbon material can have a Young modulus of at least about 0.2 GPa.

In a further exemplary embodiment, the carbon composition includes a silicon-doped nanoporous carbon material having the following properties: a pore structure comprising a fibrillar morphology, a Young modulus of at least about 0.2 GPa, a density between about 0.15 g/cc and about 1.5 g/cc, and a silicon utilization of at least about 20%. Optionally, the carbon material can have an electrical conductivity of at least about 10 S/cm.

In another exemplary embodiment, the carbon composition includes a silicon-doped nanoporous carbon material having the following properties: a pore structure comprising a fibrillar morphology, an electrical conductivity of at least 10 S/cm, a density between about 0.15 g/cc and about 1.5 g/cc, and a silicon utilization of at least about 20%. Optionally, the carbon material can have a Young modulus of at least about 0.2 GPa.

In any embodiment, the nanoporous carbon material can be a carbon aerogel, for example an imide-derived carbon aerogel, e.g., a polyimide-derived carbon aerogel. In a further embodiment, the carbon aerogel can take the structure of a monolith or a particulate form, e.g., a powder. When a carbon aerogel is present in the form of a monolith, the carbon material can be substantially free of binders or completely binder-free. Alternatively or in addition, a monolithic carbon aerogel can have a thickness between about 10 micrometers and about 500 micrometers.

In exemplary embodiments in which the carbon aerogel is in a particulate form, the particulate carbon aerogel can have a diameter of about 1 micrometer to about 50 micrometers.

In any embodiment, the pore structure of the nanoporous carbon material may be characterized by pores of the carbon material partially, substantially, or completely surrounding the silicon-based material, for example by forming interconnected structures around the silicon characterized by multiple connection points between the silicon and pore walls. For example, the silicon-based material can be present at least partially within the pore structure of the carbon material.

In any embodiment, the nanoporous carbon material can be doped with about 5%-80% of silicon by weight of the carbon material. For example, the carbon material can include about 25% to about 65% of silicon by weight of the carbon material.

In any embodiment, the nanoporous carbon material can have a pore volume of at least 0.3 cc/g.

In any embodiment, the nanoporous carbon material can have a pre-lithiation porosity between about 10% and about 80%.

In any embodiment, the carbon material, e.g., the nanoporous carbon material, can include residual nitrogen of at least about 4 wt %.

In any embodiment, the silicon-doped nanoporous carbon material can have a capacity of at least about 800 mAh/g. For example, the silicon-doped nanoporous carbon material can have a capacity up to about 2000 mAh/g.

In any embodiment, the pore structure of the nanoporous carbon material can include a full width at half max of about 50 nm or less (i.e., a narrow pore size distribution).

In any embodiment, the pore structure of the nanoporous carbon material can include a pore size at max peak from distribution of about 100 nm or less.

In any embodiment, the fibrillar morphology of the nanoporous carbon material can include an average strut width of about 2-10 nm, or even more specifically about 2-5 nm.

Exemplary embodiments provide a collector-less, binder-less, interconnected anode material for a lithium-ion battery. The anode material comprises an open-cell, monolithic, polyimide-derived nanoporous carbon material (also referred to as a CPI composite) having a fibrillar network and an array of pores, where the silicon particles are in the pores surrounded by the fibrillar network, which comprise between about 20% and 80% by weight of the anode material. The fibrillar network includes an average strut width of about 2-10 nm. The carbon material has a porosity between about 20% and about 50%, where the porosity includes pores that contain the silicon particles in an unlithiated state and can accommodate the silicon particles in a lithiated, volumetrically-expanded state. The carbon aerogels have the following properties: a pore volume of about 0.1 cc/g or more, a substantially uniform pore size distribution with a full width at half max of about 50 nm or less, and a pore size at max peak from distribution of about 100 nm or less. The resulting anode material has the following properties: a density between about 0.50 g/cc and about 1.5 g/cc, an electrical conductivity of about 10 S/cm or more, a Young modulus of about 0.5 GPa or more, and a thickness of between about 10 micrometers and about 200 micrometers.

Exemplary embodiments provide a collector-less, binder-less anode material for a lithium-based energy storage device. The anode material comprises an open-cell, monolithic nanoporous carbon material having a fibrillar network and an array of pores, where the silicon particles are in the pores surrounded by the fibrillar network, which comprise greater than 0% and less than about 95% by weight of the anode material. The fibrillar network includes an average strut width of about 2-10 nm that acts as a carbon coating for the silicon particles that may protect the silicon particles from breaking during lithiation. The carbon material has a porosity of about 80% or less, where the porosity includes pores that surround the silicon particles in an unlithiated state and can accommodate the silicon particles in a lithiated, volumetrically-expanded state. The carbon aerogels have the following properties: a pore volume of about 0.3 cc/g or more, a substantially uniform pore size distribution with a full width at half max of about 50 nm or less, and a pore size at max peak from distribution of about 100 nm or less. The resulting anode material has the following properties: a density between about 0.50 g/cc and about 1.5 g/cc, an electrical conductivity of about 10 S/cm or more, a Young modulus of about 0.5 GPa or more, and a thickness of between about 10 micrometers and about 4 cm.

Other embodiments involve a binder-free composite material, comprising an open-cell, porous carbon scaffold having an array of pores and an electrochemically active species is disposed within the array of pores of the carbon scaffold and in direct contact with the carbon scaffold, resulting in the carbon scaffold having a porosity of about 90% or less. The electrochemically active species comprises between about 5% and 65% by weight of the composite material. The carbon aerogels have the following properties: a pore volume of about 0.3 cc/g or more, and a substantially uniform pore size distribution with a full width at half max of about 50 nm or less.

Other embodiments involve a composite material, comprising an open-cell, nanoporous carbon network and an electrochemically active species disposed within the pores of the nanoporous carbon network. The carbon network has a porosity of about 90% or less and a substantially uniform pore size distribution with a full width at half max of about 50 nm or less. The composite material is formed as a monolith or a powder. Optionally, the material has an electrical conductivity of about 10 S/cm or more. Optionally, the material has a Young modulus of about 0.5 GPa or more, with a thickness of between 10 micrometers and about 500 micrometers.

Another embodiment provides a silicon-containing, monolithic imide-derived carbon aerogel composite formed of a nanoporous carbon material, wherein the composite is free of binders and wherein silicon particles are embedded within the monolithic polyimide-derived carbon aerogel composite.

Optionally, the composite may be pre-doped with a metal or metal oxides selected from the group consisting of tin, sulfur, phosphorus, nickel, copper, cobalt, manganese, lithium, magnesium, iron, zinc, boron, titanium, aluminum oxide, titanium oxide, niobium oxide, molybdenum oxide, silica, and aluminosilicate.

Optionally, the silicon particles may be pre-doped with a p-type acceptor selected from the group consisting of boron, aluminum, gallium, and indium. Alternatively, the silicon particles may be pre-doped with an n-type donor selected from the group consisting of phosphorus, lithium, arsenic, antimony, and bismuth.

Optionally, the carbon aerogel includes fibrillar morphology, comprising an average strut width of about 2-10 nm.

A further embodiment provides an electrode comprising the nanoporous carbon material as described. This electrode may be the anode and optionally free of a distinct current collector.

Another embodiment provides an electrochemical cell comprising the carbon composition, nanoporous carbon material, and/or the electrode as described. A further embodiment provides an energy storage device, such as a battery or more specifically a lithium-ion battery, comprising the carbon composition, nanoporous carbon material, and/or the electrochemical cell as described.

A further general aspect relates to methods of forming or manufacturing a carbon composition. In an exemplary embodiment, a method includes providing a mixture of a polyimide precursor and a silicon-based material, imidizing the mixture chemically or thermally, e.g., by adding an imidization catalyst or through heating; drying the imidized mixture to yield a porous polyimide silicon composite; and carbonizing, e.g., pyrolyzing, the porous polyimide silicon composite to yield the carbon composition that is greater than about 25% by weight silicon and with a porosity between about 10% and about 90%. In some embodiments, the method further includes combining the mixture with a medium, e.g., a dispersion medium, that is non-miscible with the mixture, thereby forming droplets of the imidized mixture. For example, an emulsion can be formed with the imidized mixture as the dispersed phase. In exemplary embodiments, the method further includes drying the droplets to form particles. In any embodiment, the carbon composition can include a carbon aerogel and can be formed as a monolith or as particles.

In exemplary embodiments, the methods include forming or manufacturing a continuous porous carbon-silicon composite, such as a carbon aerogel. Imide precursors, such as diamine and dianhydride that can each include an aromatic group and/or an aliphatic group, are mixed in a suitable solvent (e.g., polar, aprotic solvent). Prior to adding imidization catalysts, the additive(s), e.g., in this embodiment, silicon particles, are mixed into the imide precursors in solvent. The imidization catalyst is then added to initiate the imidization. In alternative embodiments, imidization can be accomplished via thermal imidization. A gel is formed in which the additive particles, e.g., the silicon particles, are uniformly dispersed. The resulting mixture is then dried to yield a continuous porous polyimide silicon composite, where the drying may be performed using subcritical and/or supercritical carbon dioxide. Optionally, the polyimide silicon composite may be densified. For example, the polyimide silicon composite can be compressed, preferably uniaxially (e.g., up to 95% strain), to increase density, adjustable up to about 1.5 g/cc based on the amount of compression. Regardless of whether compression has taken place, the polyimide silicon composite is pyrolyzed to yield the continuous porous carbon silicon composite, where the resulting composite comprises greater than 0% and less than about 95% silicon by weight and comprises a porosity between about 5%-99%. In certain embodiments, pyrolysis may be performed at a maximum temperature of between about 750° C. and about 1600° C., optionally with graphitization from about 1600° C. up to about 3000° C.

Another embodiment provides a method of forming or manufacturing a continuous porous carbon silicon composite, such as a carbon aerogel. Polyimide precursors, such as diamine and dianhydride that can each include an aromatic group and/or an aliphatic group, are mixed in a suitable solvent (e.g., polar, aprotic solvent). Prior to adding imidization catalysts, a silicate (e.g., silicon dioxide, aluminosilicate, and/or halloysite) and a reducing agent (e.g., magnesium, lithium, sodium, potassium, aluminum, calcium, or a combination thereof) are mixed into the polyimide precursors in solvent. The imidization catalyst is then added. In alternative embodiments, imidization can be accomplished via thermal imidization. The resulting mixture is then dried to yield a continuous porous polyimide silicate and reducing agent composite, where the drying may be performed using subcritical and/or supercritical carbon dioxide. Optionally, the polyimide silicate and reducing agent composite may be compressed, preferably uniaxially (e.g., up to 95% strain), to increase density, adjustable up to about 1.5 g/cc based on the amount of compression. Regardless of whether compression has taken place, the polyimide silicate and reducing agent composite is heated under pyrolyzing and reducing environment conditions to yield the continuous porous carbon silicon composite, where the resulting composite comprises greater than 0% and less than about 95% silicon by weight and comprises a porosity between about 5%-99%. In certain embodiments, pyrolysis may be performed at a maximum temperature of between about 750° C. and about 1600° C., optionally with graphitization from about 1600° C. up to about 3000° C. Furthermore, the silicate and the reducing agent may react to form silicon in situ within the carbon composite under inert conditions with hydrogen gas at a temperature greater than about 700° C.

A further embodiment provides a method of forming or manufacturing a porous carbon silicon composite, such as a silicon doped carbon aerogel. Polyimide precursors, such as diamine and dianhydride that can each include an aromatic group and/or an aliphatic group, are mixed in a suitable solvent (e.g., polar, aprotic solvent). The imidization catalyst is then added. In alternative embodiments, imidization can be accomplished via thermal imidization. The resulting mixture is then dried to yield a continuous porous polyimide, where the drying may be performed in subcritical conditions and/or using supercritical carbon dioxide.

Optionally, the polyimide may be compressed, preferably uniaxially (e.g., up to 95% strain), to increase density, adjustable up to about 1.5 g/cc based on the amount of compression. Regardless of whether compression has taken place, the polyimide is pyrolyzed to yield a continuous porous carbon. Silicon is then deposited onto or into the silicon to yield the continuous porous silicon composite that is greater than 0% and less than about 95% silicon by weight and comprises a porosity between about 5%-99%. In certain embodiments, pyrolysis may be performed at a maximum temperature of between about 750° C. and about 1600° C., optionally with graphitization from about 1600° C. up to about 3000° C.

Optionally, the silicon may be deposited by dip coating the porous carbon into a silicon-forming silane precursor, followed by heating under inert conditions to decompose the silane to form a conformal silicon coating within the porous carbon. This dip processing can be performed multiple times to increase thickness and silicon content by weight up to about 95%. In other embodiments, the silicon can be deposited via atomic layer deposition or chemical vapor deposition (CVD).

In any of the above-described methodologies of producing a carbon composition, e.g., a continuous porous carbon silicon composite, the carbon composition may optionally be a monolith or a freestanding structure, can be prepared on or off a substrate, can be formed as beads, or may be micronized to a powder form. Furthermore, the composite may be reinforced with or without a non-woven or woven material (e.g., fiber, foam, etc.).

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a full and clear understanding of the invention, reference should be made to the following detailed description, taken in connection with the accompanying drawings, in which.

DETAILED DESCRIPTION OF THE INVENTION

Figure 1:
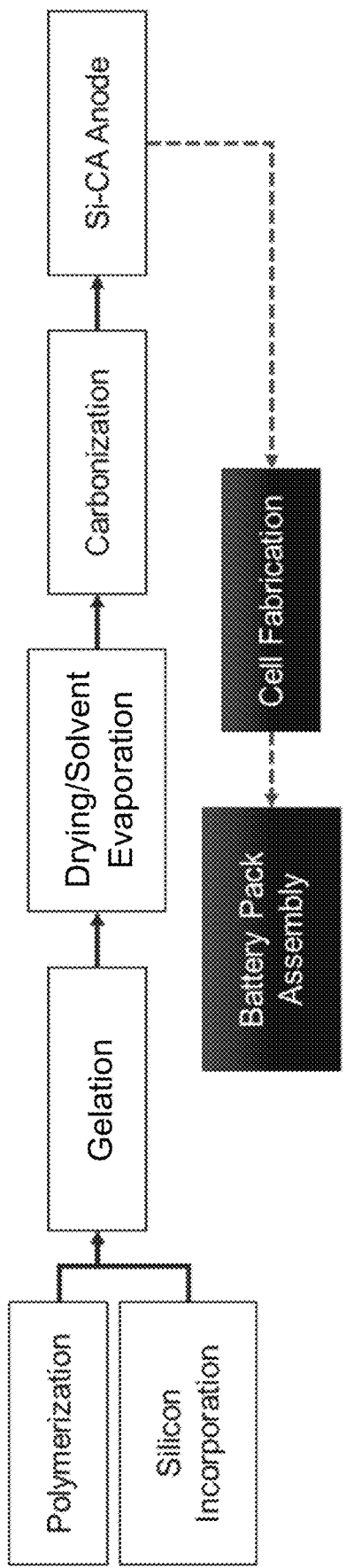
FIG. 1 is a flow diagram illustrating formation of a carbon aerogel for use within a battery application.

In the following detailed description of the invention, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

As used herein, "about" means approximately or nearly and in the context of a numerical value or range set forth means ±15% of the numerical. In an embodiment, the term "about" can include traditional rounding according to significant figures of the numerical value. In addition, the phrase "about 'x' to 'y'" includes "about 'x' to about 'y'".

Within the context of the present disclosure, the term "aerogel" or "aerogel material" refers to a gel comprising a framework of interconnected structures, with a corresponding network of interconnected pores integrated within the framework, and containing gases such as air as a dispersed interstitial medium; and which is characterized by the following physical and structural properties (according to nitrogen porosimetry testing) attributable to aerogels: (a) an average pore diameter ranging from about 2 nm to about 100 nm; (b) a porosity of at least 80% or more, and (c) a surface area of about 20 m$^2$/g or more. It can be understood that the inclusion of additives, such as a reinforcement material or an electrochemically active species, may decrease porosity of the resulting aerogel composite. Densification may also decrease porosity of the resulting aerogel composite. This will become clearer as this specification continues.

Aerogel materials of the present disclosure thus include any aerogels or other open-celled compounds, which satisfy the defining elements set forth in previous paragraphs, including compounds, which can be otherwise categorized as xerogels, cryogels, ambigels, microporous materials, and the like.

Within the context of the present disclosure, the terms "framework" or "framework structure" refer to the network of interconnected oligomers, polymers, or colloidal particles that form the solid structure of a gel or an aerogel. The polymers or particles that make up the framework structures typically have a diameter of about 100 angstroms. However, framework structures of the present disclosure can also include networks of interconnected oligomers, polymers, or colloidal particles of all diameter sizes that form the solid structure within in a gel or aerogel.

Within the context of the present disclosure, the term "aerogel composition" refers to any composite material that includes aerogel material as a component of the composite. Examples of aerogel compositions include, but are not limited to, fiber-reinforced aerogel composites; aerogel composites including additive elements such as opacifiers and electrochemically active species; aerogel-foam composites; aerogel-polymer composites; and composite materials incorporating aerogel particulates, particles, granules, beads, or powders into a solid or semi-solid material, such as binders, resins, cements, foams, polymers, or similar solid materials.

Within the context of the present disclosure, the term "reinforced aerogel composition" refers to aerogel compositions comprising a reinforcing phase within the aerogel material, which either is not part of the aerogel framework or can be modified in a manner to covalently bond to the aerogel framework. The reinforcing phase can be any material that provides increased flexibility, resilience, conformability, or structural stability to the aerogel material. Examples of well-known reinforcing materials include, but are not limited to, open-cell foam reinforcement materials, closed-cell foam reinforcement materials, open-cell membranes, honeycomb reinforcement materials, polymeric reinforcement materials, and fiber reinforcement materials such as discrete fibers, woven materials, non-woven materials, battings, webs, mats, and felts. Additionally, reinforcements may be combined with one or more of the other reinforcing materials and can be oriented continuously throughout or in limited preferred parts of the composition. In other embodiments, no reinforcement phase may be used at all, if the aerogel material and/or aerogel framework is structurally stable on its own (i.e., self-sustaining). This self-sustaining nature of certain carbon aerogels will become clearer as this specification continues.

Within the context of the present disclosure, the term "wet gel" refers to a gel in which the mobile interstitial phase within the network of interconnected pores is primarily comprised of a liquid phase such as a conventional solvent, liquefied gases such as liquid carbon dioxide, or a combination thereof. Aerogels typically require the initial production of a wet gel, followed by processing and extraction to replace the mobile interstitial liquid phase in the gel with air or another gas. Examples of wet gels include, but are not limited to: alcogels, hydrogels, ketogels, carbonogels, and any other wet gels known to those in the art.

Within the context of the present disclosure, the terms "additive" or "additive element" refer to materials that can be added to a composition before, during, or after the production of the composition. Additives can be added, for example, to alter or improve desirable properties in an aerogel composition, or to counteract or mitigate undesirable properties in an aerogel composition. Additives are typically added to an aerogel composition either prior to or during gelation. Additives can also be added to the aerogel composition via atomic layer deposition or chemical vapor deposition (CVD). A particular example of an additive is an electrochemically active species, such as silicon, e.g., silicon particles.

Within the context of the present disclosure, the term "silicon particles" refers to silicon or silicon-based materials with a range of particle sizes suitable for use with aerogel compositions disclosed herein. Silicon particles of the present disclosure can be nanoparticles, e.g., particles with two or three dimensions in the range of about 1 nm to about 150 nm. Silicon particles of the present disclosure can be fine particles, e.g., micron-sized particles with two or three dimensions, e.g., a diameter for a substantially spherical particle, in the range of about 150 nm to about 10 micrometers or larger. For example, silicon particles of the present disclosure can have two or three dimensions, e.g., a diameter for a substantially spherical particle, of about 10 nm, 50 nm, 100 nm, 150 nm, 200 nm, 500 nm, 1 micrometer, 1.5 micrometers, 2 micrometers, 3 micrometers, 5 micrometers, 10 micrometers, 20 micrometers, 40 micrometers, 50 micrometers, 100 micrometers, or in a range between any two of these values. In some embodiments, the silicon particles can be monodispersed or substantially monodispersed. In other embodiments, the silicon particles can have a particle size distribution. Within the context of the present disclosure, the dimensions of silicon particles are provided based upon the median of the particle size distribution, i.e., the D50. Silicon particles of the present disclosure can be silicon wires, crystalline silicon, amorphous silicon, silicon alloys, silicon oxides ($SiO_x$), coated silicon, e.g., carbon coated silicon, and any combinations of silicon particle materials disclosed herein.

Within the context of the present disclosure, the term "self-supporting" refers to the ability of an aerogel material or composition to be flexible and/or resilient based primarily on the physical properties of the aerogel. Self-supporting aerogel materials or compositions of the present disclosure can be differentiated from other aerogel materials, such as coatings, which rely on an underlying substrate or reinforcement material to provide flexibility and/or resilience to the material.

Within the context of the present disclosure, the term "density" refers to a measurement of the mass per unit volume of an aerogel material or composition. The term "density" generally refers to the true density of an aerogel material, as well as the bulk density of an aerogel composition. Density is typically recorded as $kg/m^3$ or g/cc. The density of an aerogel material or composition may be determined by methods known in the art, including, but not limited to: Standard Test Method for Dimensions and Density of Preformed Block and Board-Type Thermal Insulation (ASTM C303, ASTM International, West Conshohocken, Pa.); Standard Test Methods for Thickness and Density of Blanket or Batt Thermal Insulations (ASTM C167, ASTM International, West Conshohocken, Pa.); or Determination of the apparent density of preformed pipe insulation (ISO 18098, International Organization for Standardization, Switzerland). Within the context of the present disclosure, density measurements are acquired according to ASTM C167 standards, unless otherwise stated. Preferably, aerogel materials or compositions of the present disclosure have a density of about 1.50 g/cc or less, about 1.40 g/cc or less, about 1.30 g/cc or less, about 1.20 g/cc or less, about 1.10 g/cc or less, about 1.00 g/cc or less, about 0.90 g/cc or less, about 0.80 g/cc or less, about 0.70 g/cc or less, about 0.60 g/cc or less, about 0.50 g/cc or less, about 0.40 g/cc or less, about 0.30 g/cc or less, about 0.20 g/cc or less, about 0.10 g/cc or less, or in a range between any two of these values, for example between about 0.15 g/cc and 1.5 g/cc or more particularly 0.50 g/cc and 1.5 g/cc.

Production of an aerogel, according to certain embodiments, generally includes the following steps: i) formation of a solution containing a gel precursor; ii) formation of a gel from the solution; and iii) extracting the solvent from the gel materials to obtain a dried aerogel material. Production of aerogel beads, according to certain embodiments, follows the general process for production of an aerogel and generally includes the following steps: i) formation of a solution containing a gel precursor; ii) dispersing the gel precursor in a medium that is non-miscible with the gel precursor; iii) formation of gel beads within the non-miscible medium from the gel precursor solution; iv) removing the gel beads from the medium; and v) extracting the solvent from the gel beads to obtain a dried aerogel material. These processes are discussed below in greater detail, specifically in the context of forming organic aerogels, such as polyimide aerogels.

However, the specific examples and illustrations provided herein are not intended to limit the present disclosure to any specific type of aerogel and/or method of preparation. The present disclosure can include any aerogel formed by any associated method of preparation known to those in the art.

An exemplary solution to produce a silica aerogel is formed by combining at least one gelling precursor with a solvent. Suitable solvents for use in forming a solution include lower alcohols with 1 to 6 carbon atoms, preferably 2 to 4, although other solvents can be used as known to those with skill in the art. Examples of useful solvents include, but are not limited to: methanol, ethanol, isopropanol, ethyl acetate, ethyl acetoacetate, acetone, dichloromethane, tetrahydrofuran, and the like. Multiple solvents can also be combined to achieve a desired level of dispersion or to optimize properties of the gel material. Selection of optimal solvents for the polymerization and gel formation steps thus depends on the specific precursors, fillers, and additives being incorporated into the solution; as well as the target processing conditions for gelling and liquid phase extraction, and the desired properties of the final aerogel materials.

An exemplary solution to produce a polyimide aerogel is formed by combining at least one diamine and at least one dianhydride in a common polar aprotic solvent(s). Additional details regarding polyimide gel/aerogel formation can be found in U.S. Pat. Nos. 7,074,880 and 7,071,287 to Rhine et al.; U.S. Pat. No. 6,399,669 to Suzuki et al.; U.S. Pat. No. 9,745,198 to Leventis et al.; Leventis et al., Polyimide Aerogels by Ring-Opening Metathesis Polymerization (ROMP), Chem. Mater. 2011, 23, 8, 2250-2261; Leventis et al., Isocyanate-Derived Organic Aerogels: Polyureas, Polyimides, Polyamides, MRS Proceedings, 1306 (2011), Mrsf10-1306-bb03-01. doi:10.1557/opl.2011.90; Chidambareswarapattar et al., One-step room-temperature synthesis of fibrous polyimide aerogels from anhydrides and isocyanates and conversion to isomorphic carbons, J. Mater. Chem., 2010, 20, 9666-9678; Guo et al., Polyimide Aerogels Cross-Linked through Amine Functionalized Polyoligomeric Silsesquioxane, ACS Appl. Mater. Interfaces 2011, 3, 546-552; Nguyen et al., Development of High Temperature, Flexible Polyimide Aerogels, American Chemical Society, proceedings published 2011; Meador et al., Mechanically Strong, Flexible Polyimide Aerogels Cross-Linked with Aromatic Triamine, ACS Appl. Mater. Interfaces, 2012, 4 (2), pp 536-544; Meador et al., Polyimide Aerogels with Amide Cross-Links: A Low Cost Alternative for Mechanically Strong Polymer Aerogels, ACS Appl. Mater. Interfaces 2015, 7, 1240-1249; Pei et al., Preparation and Characterization of Highly Cross-Linked Polyimide Aerogels Based on Polyimide Containing Trimethoxysilane Side Groups, Langmuir 2014, 30, 13375-13383, each of which is incorporated herein by reference in its entirety. Triamines, tetramines, pentamines, hexamines, etc. can also be used instead of or in addition to diamines or a combination thereof in order to optimize the properties of the gel material. Trianhydrides, tetranhydrides, pentanhydrides, hexanhydrides, can also be used instead of or in addition to dianhydrides or a combination thereof in order to optimize the properties of the gel material. A dehydrating agent and a catalyst can be incorporated into the solution to initiate and drive imidization.

The solution can include additional co-gelling precursors, as well as filler materials and other additives. Filler materials and other additives may be dispensed in the solution at any point before or during the formation of a gel. Filler materials and other additives may also be incorporated into the gel material after gelation through various techniques known to those in the art. Preferably, the solution comprising the gelling precursors, solvents, catalysts, water, filler materials, and other additives is a homogenous solution, which is capable of effective gel formation under suitable conditions.

Once a solution has been formed and optimized, the gel-forming components in the solution can be transitioned into a gel material. The process of transitioning gel-forming components into a gel material comprises an initial gel formation step wherein the gel solidifies up to the gel point of the gel material. The gel point of a gel material may be viewed as the point where the gelling solution exhibits resistance to flow and/or forms a substantially continuous polymeric framework throughout its volume. A range of gel-forming techniques is known to those in the art. Examples include, but are not limited to: maintaining the mixture in a quiescent state for a sufficient period of time; adjusting the concentration of a catalyst; adjusting the temperature of the solution; directing a form of energy onto the mixture (ultraviolet, visible, infrared, microwave, ultrasound, particle radiation, electromagnetic); or a combination thereof.

The process of forming gel beads from the gel solution can include combining the solution with a medium, e.g., a dispersion medium, that is non-miscible with the solution. For example, silicone oil or mineral oil can be used as the dispersion medium. The gel solution can be added, e.g., by pouring, or otherwise combined with the non-miscible dispersion medium. Agitation, e.g., by mixing, of the combined dispersion medium and gel precursor solution can be used to promote droplet, e.g., bead, formation before or during the process of transitioning gel-forming components into a gel material. For example, the combination of dispersion medium and gel precursor can form an emulsion with the gel precursor solution as the dispersed phase. Exemplary methods of gel bead production can be found in U.S. Patent Application Publication No. 2006/0084707 of Ou et al., which is incorporated herein by reference in its entirety.

Spherical droplets of gel precursor form in the dispersion medium by virtue of the interface tension. The droplets gel and strengthen during the time in the dispersion medium, e.g., silicone oil. Agitation of the mixture is typically used to prevent the droplets from agglomerating. Heat or radiation may also be provided to the dispersion medium to induce or enhance gelation of the droplets or strengthen the gel beads so as to make them strong enough to resist collision. The production capacity of gel beads in a given space depends upon the precise control of the gelation process of the droplets.

The process further includes removing the gel beads from the dispersion medium, e.g., the silicone oil. The gel beads are filtered from the dispersion medium and then washed or rinsed with fluids, e.g., alcohols such as ethanol, methanol, isopropanol, or higher alcohols. A basic requirement for the rinsing liquid is that it can remove the oil (or other dispersing medium) while not reacting chemically with the gel. After removal of the excess amount of silicone oil, the gel beads can be placed into a solvent for aging, as discussed in more detail below. For example, the gel beads can be aged in ethanol. The gel beads are amenable to interstitial solvent removal using supercritical fluid drying methods as discussed herein. They may also be dried at ambient conditions to make xerogels. The dried gel beads, e.g., aerogel or xerogel beads, are amenable to heat treatment and carbonization, as discussed in more detail below. In exemplary embodiments, the gel beads are substantially spherical.

The process of transitioning gel-forming components into a gel material can also include an aging step (also referred to as curing) prior to liquid phase extraction. Aging a gel material after it reaches its gel point can further strengthen the gel framework by increasing the number of cross-linkages within the network. The duration of gel aging can be adjusted to control various properties within the resulting aerogel material. This aging procedure can be useful in preventing potential volume loss and shrinkage during liquid phase extraction. Aging can involve: maintaining the gel (prior to extraction) at a quiescent state for an extended period; maintaining the gel at elevated temperatures; adding cross-linkage promoting compounds; or any combination thereof. The preferred temperatures for aging are usually between about 10° C. and about 200° C. The aging of a gel material typically continues up to the liquid phase extraction of the wet-gel material.

The time period for transitioning gel-forming materials into a gel material includes both the duration of the initial gel formation (from initiation of gelation up to the gel point), as well as the duration of any subsequent curing and aging of the gel material prior to liquid phase extraction (from the gel point up to the initiation of liquid phase extraction). The total time period for transitioning gel-forming materials into a gel material is typically between about 1 minute and several days, preferably about 30 hours or less, about 24 hours or less, about 15 hours or less, about 10 hours or less, about 6 hours or less, about 4 hours or less, about 2 hours or less, about 1 hour or less, about 30 minutes or less, or about 15 minutes or less.

The resulting gel material may be washed in a suitable secondary solvent to replace the primary reaction solvent present in the wet-gel. Such secondary solvents may be linear monohydric alcohols with 1 or more aliphatic carbon atoms, dihydric alcohols with 2 or more carbon atoms, branched alcohols, cyclic alcohols, alicyclic alcohols, aromatic alcohols, polyhydric alcohols, ethers, ketones, cyclic ethers or their derivative.

Once a gel material has been formed and processed, the liquid phase of the gel can then be at least partially extracted from the wet-gel using extraction methods, including processing and extraction techniques, to form an aerogel material. Liquid phase extraction, among other factors, plays an important role in engineering the characteristics of aerogels, such as porosity and density, as well as related properties such as thermal conductivity. Generally, aerogels are obtained when a liquid phase is extracted from a gel in a manner that causes low shrinkage to the porous network and framework of the wet gel.

Aerogels are commonly formed by removing the liquid mobile phase from the gel material at a temperature and pressure near or above the critical point of the liquid mobile phase. Once the critical point is reached (near critical) or surpassed (supercritical) (i.e., pressure and temperature of the system is at or higher than the critical pressure and critical temperature respectively) a new supercritical phase appears in the fluid that is distinct from the liquid or vapor phase. The solvent can then be removed without introducing a liquid-vapor interface, capillary pressure, or any associated mass transfer limitations typically associated with liquid-vapor boundaries. Additionally, the supercritical phase is more miscible with organic solvents in general, thus having the capacity for better extraction. Co-solvents and solvent exchanges are also commonly used to optimize the supercritical fluid drying process.

If evaporation or extraction occurs below the supercritical point, capillary forces generated by liquid evaporation can cause shrinkage and pore collapse within the gel material. Maintaining the mobile phase near or above the critical pressure and temperature during the solvent extraction process reduces the negative effects of such capillary forces. In certain embodiments of the present disclosure, the use of near-critical conditions just below the critical point of the solvent system may allow production of aerogel materials or compositions with sufficiently low shrinkage, thus producing a commercially viable end-product.

Several additional aerogel extraction techniques are known in the art, including a range of different approaches in the use of supercritical fluids in drying aerogels, as well as ambient drying techniques. For example, Kistler (J. Phys. Chem. (1932) 36: 52-64) describes a simple supercritical extraction process where the gel solvent is maintained above its critical pressure and temperature, thereby reducing evaporative capillary forces and maintaining the structural integrity of the gel network. U.S. Pat. No. 4,610,863 describes an extraction process where the gel solvent is exchanged with liquid carbon dioxide and subsequently extracted at conditions where carbon dioxide is in a supercritical state. U.S. Pat. No. 6,670,402 teaches extracting a liquid phase from a gel via rapid solvent exchange by injecting supercritical (rather than liquid) carbon dioxide into an extractor that has been pre-heated and pre-pressurized to substantially supercritical conditions or above, thereby producing aerogels. U.S. Pat. No. 5,962,539 describes a process for obtaining an aerogel from a polymeric material that is in the form a sol-gel in an organic solvent, by exchanging the organic solvent for a fluid having a critical temperature below a temperature of polymer decomposition, and supercritically extracting the fluid/sol-gel. U.S. Pat. No. 6,315,971 discloses a process for producing gel compositions comprising: drying a wet gel comprising gel solids and a drying agent to remove the drying agent under drying conditions sufficient to reduce shrinkage of the gel during drying. U.S. Pat. No. 5,420,168 describes a process whereby Resorcinol/Formaldehyde aerogels can be manufactured using a simple air-drying procedure. U.S. Pat. No. 5,565,142 describes drying techniques in which the gel surface is modified to be stronger and more hydrophobic, such that the gel framework and pores can resist collapse during ambient drying or subcritical extraction. Other examples of extracting a liquid phase from aerogel materials can be found in U.S. Pat. Nos. 5,275,796 and 5,395,805.

One preferred embodiment of extracting a liquid phase from the wet-gel uses supercritical conditions of carbon dioxide, including, for example: first substantially exchanging the primary solvent present in the pore network of the gel with liquid carbon dioxide; and then heating the wet gel (typically in an autoclave) beyond the critical temperature of carbon dioxide (about 31.06° C.) and increasing the pressure of the system to a pressure greater than the critical pressure of carbon dioxide (about 1070 psig). The pressure around the gel material can be slightly fluctuated to facilitate removal of the supercritical carbon dioxide fluid from the gel. Carbon dioxide can be recirculated through the extraction system to facilitate the continual removal of the primary solvent from the wet gel. Finally, the temperature and pressure are slowly returned to ambient conditions to produce a dry aerogel material. Carbon dioxide can also be pre-processed into a supercritical state prior to being injected into an extraction chamber. In other embodiments, extraction can be performed using any suitable mechanism, for example altering the pressures, timings, and solvent discussed above.

In certain embodiments of the present disclosure, a dried polyimide aerogel composition can be subjected to one or more heat treatments for a duration of time of 3 hours or more, between 10 seconds and 3 hours, between 10 seconds and 2 hours, between 10 seconds and 1 hour, between 10 seconds and 45 minutes, between 10 seconds and 30 minutes, between 10 seconds and 15 minutes, between 10 seconds and 5 minutes, between 10 seconds and 1 minute, between 1 minute and 3 hours, between 1 minute and 1 hour, between 1 minute and 45 minutes, between 1 minute and 30 minutes, between 1 minute and 15 minutes, between 1 minute and 5 minutes, between 10 minutes and 3 hours, between 10 minutes and 1 hour, between 10 minutes and 45 minutes, between 10 minutes and 30 minutes, between 10 minutes and 15 minutes, between 30 minutes and 3 hours, between 30 minutes and 1 hour, between 30 minutes and 45 minutes, between 45 minutes and 3 hours, between 45 minutes and 90 minutes, between 45 minutes and 60 minutes, between 1 hour and 3 hours, between 1 hour and 2 hours, between 1 hour and 90 minutes, or in a range between any two of these values.

In certain embodiments, the current invention involves the formation and use of nanoporous carbon-based scaffolds or structures, such as carbon aerogels, as electrode materials within an energy storage device, for example as the primary anodic material in a LIB. The pores of the nanoporous scaffold are designed, organized, and structured to accommodate particles of silicon or other metalloid or metal, and expansion of such particles upon lithiation in a LIB, for example. Alternatively, the pores of the nanoporous scaffold may be filled with sulfide, hydride, any suitable polymer, or other additive where there is benefit to contacting the additive with an electrically conductive material (i.e., the scaffold/aerogel) to provide for a more effective electrode. A general process utilizing silicon-doped carbon aerogel in a battery application can be seen in FIG. 1.

To further expand on the exemplary application within LIBs, when carbon aerogel material is utilized as the primary anodic material as in certain embodiments of the current invention, the aerogel nanoporous structure has a narrow pore size distribution, and provides for high electrical conductivity, high mechanical strength, and a morphology and sufficient pore volume (at a final density) to accommodate a high percentage by weight of silicon particles and expansion thereof. Structurally, certain embodiments of the current invention have a fibrillar morphology with a strut size that produces the aforementioned narrow pore size distribution, high pore volume, and enhanced connectedness, among other properties.

In additional or alternative embodiments, the carbon aerogel itself functions as a current collector due to its electrical conductivity and mechanical strength, thus, in a preferred embodiment, eliminating the need for a distinct current collector on the anode side (when the anode is formed of the carbon aerogel). It is noted that in conventional LIBs, a copper foil is coupled to the anode as its current collector. However, removal of one or both of these components, depending on the application of the carbon aerogel, derives additional space for more electrode material, resulting in even greater capacity of the cell/individual electrode and overall greater energy density of the packaged battery system. However, in certain embodiments, existing current collectors may be integrated with the anode materials of various other embodiments to augment the copper or aluminum foils' current collection capabilities or capacities.

In certain embodiments, nanoporous carbon-based scaffolds or structures, and specifically the carbon aerogel can be used as the conductive network or current collector on the anode side of an energy storage device. The fully interconnected carbon aerogel network is filled with electrochemically active species, where the electrochemically active species are in direct contact or physically connected to the carbon network. Loading of electrochemically active species is tuned with respect to pore volume and porosity for high and stable capacity and improved energy storage device safety. When utilized on the anode side, the electrochemically active species may include, for example, silicon, graphite, lithium or other metalloids or metals. In yet another embodiment, the anode may comprise nanoporous carbon-based scaffolds or structures, and specifically carbon aerogels.

Within the context of the present disclosure, the term "collector-less" refers to the absence of a distinct current collector that is directly connected to an electrode. As noted, in conventional LIBs, a copper foil is typically coupled to the anode as its current collector. Electrodes formed from nanoporous carbon-based scaffolds or structures (e.g., carbon aerogels), according to embodiments of the current invention, can be a freestanding structure or otherwise have the capability of being collector-less since the scaffold or structure itself functions as the current collector, due to its high electrical conductivity. Within the electrochemical cell, a collector-less electrode can be connected to form a circuit by embedding solid, mesh, woven tabs during the solution step of making the continuous porous carbon; or by soldering, welding, or metal depositing leads onto a portion of the porous carbon surface. Other mechanisms of contacting the carbon to the remainder of the system are contemplated herein as well. In alternative embodiments, the nanoporous carbon-based scaffolds or structures, and specifically a carbon aerogel may be disposed on or otherwise in communication with a dedicated current-collecting substrate (e.g., copper foil, aluminum foil, etc.). In this scenario, the carbon aerogel can be attached to a solid current collector using a conductive adhesive and applied with varying amounts of pressure.

Figure 2:
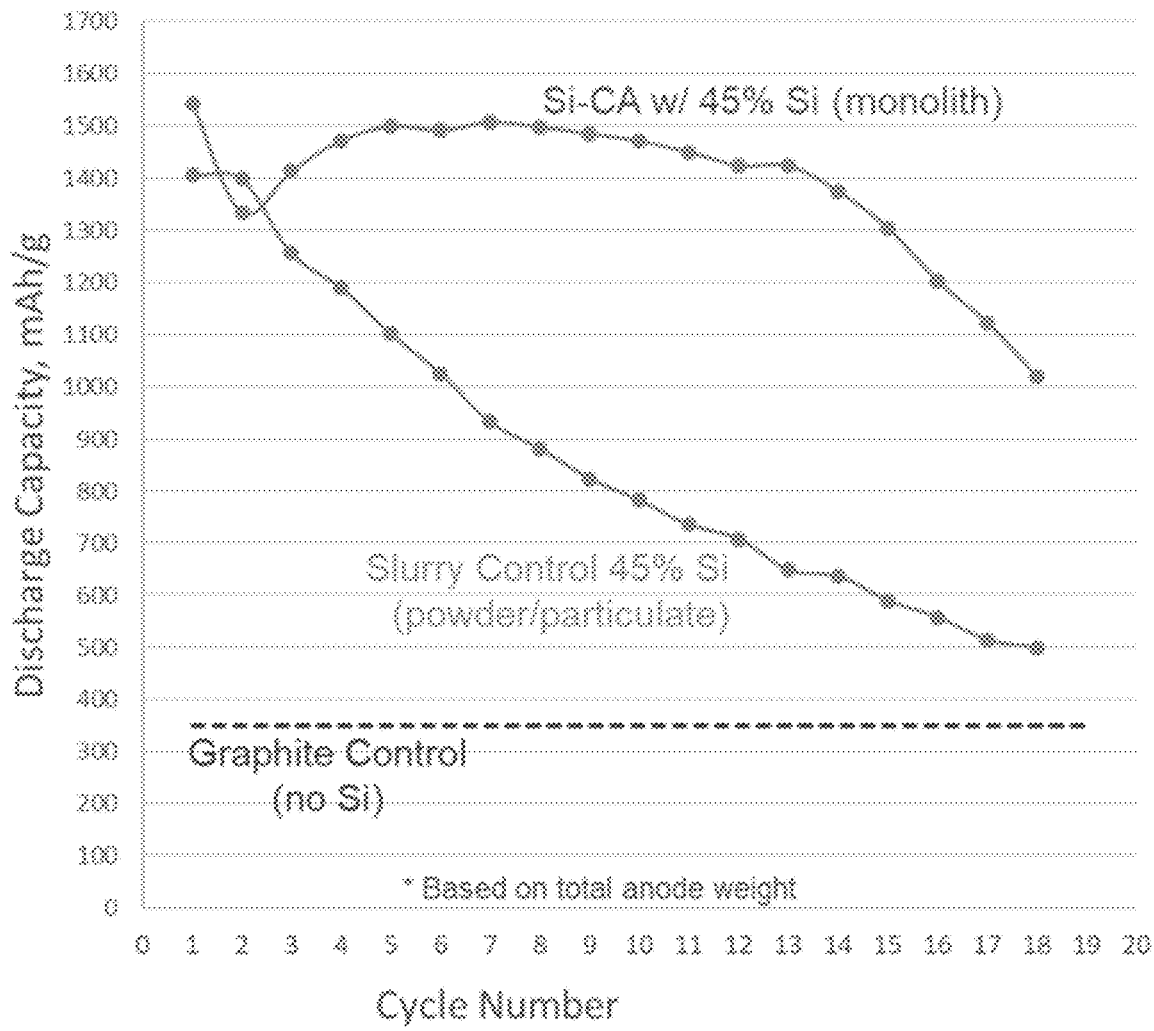
FIG. 2 depicts discharge capacity over several cycles, comparing silicon-doped monoliths and silicon particles incorporated by conventional slurry processing methods.

Furthermore, it is contemplated herein that the nanoporous carbon-based scaffolds or structures, and specifically carbon aerogels, can take the form of monolithic structures. When monolithic in nature, the carbon aerogel eliminates the need for any binders; in other words, the anode can be binder-less. As used herein, the term "monolithic" refers to aerogel materials in which a majority (by weight) of the aerogel included in the aerogel material or composition is in the form of a unitary, continuous, interconnected aerogel nanostructure. Monolithic aerogel materials include aerogel materials which are initially formed to have a unitary interconnected gel or aerogel nanostructure, but which can be subsequently cracked, fractured or segmented into non-unitary aerogel nanostructures. Monolithic aerogels may take the form of a freestanding structure or a reinforced (fiber or foam) material. In comparison, using silicon lithiation as an example, silicon incorporated into a monolithic aerogel can be utilized more effectively relative to theoretical capacity, as compared to the same amount of silicon incorporated into a slurry using conventional processes (see FIG. 2).

Monolithic aerogel materials are differentiated from particulate aerogel materials. The term "particulate aerogel material" refers to aerogel materials in which a majority (by weight) of the aerogel included in the aerogel material is in the form of particulates, particles, granules, beads, or powders, which can be combined together (i.e., via a binder, such as a polymer binder) or compressed together but which lack an interconnected aerogel nanostructure between individual particles. Collectively, aerogel materials of this form will be referred to as having a powder or particulate form (as opposed to a monolithic form). It should be noted that despite an individual particle of a powder having a unitary structure, the individual particle is not considered herein as a monolith. Integration of aerogel powder into an electrochemical cell typically preparation of a paste or slurry from the powder, casting and drying onto a substrate, and may optionally include calendaring.

Particulate aerogel materials, e.g., aerogel beads, provide certain advantages. For example, particulate materials according to embodiments disclosed herein can be used as a direct replacement for other materials such as graphite in LIB anodes and anode manufacturing processes. Particulate materials according to embodiments disclosed herein can also provide improved lithium ion diffusion rates due to shorter diffusion paths within the particulate material. Particulate materials according to embodiments disclosed herein can also allow for electrodes with optimized packing densities, e.g., by tuning the particle size and packing arrangement. Particulate materials according to embodiments disclosed herein can also provide improved access to silicon due to inter-particle and intra-particle porosity.

Within the context of the present disclosure, the terms "binder-less" or "binder-free" (or derivatives thereof) refer to a material being substantially free of binders or adhesives to hold that material together. For example, a monolithic nanoporous carbon material is free of binder since its framework is formed as a unitary, continuous interconnected structure. Advantages of being binder-less include avoiding any effects of binders, such as on electrical conductivity and pore volume. On the other hand, aerogel particles require a binder to hold together to form a larger, functional material; such larger material is not contemplated herein to be a monolith. In addition, this "binder-free" terminology does not exclude all uses of binders. For example, a monolithic aerogel, according to the current invention, may be secured to another monolithic aerogel or a non-aerogel material by disposing a binder or adhesive onto a major surface of the aerogel material. In this way, the binder is used to create a laminate composite, but the binder has no function to maintain the stability of the monolithic aerogel framework itself.

Furthermore, monolithic polymeric aerogel materials or compositions of the present disclosure may be compressed up to 95% strain without significant breaking or fracturing of the aerogel framework, while densifying the aerogel and minimally reducing porosity. In certain embodiments, the compressed polymeric aerogel materials or compositions are subsequently carbonized using varying methods described herein, to form nanoporous carbon materials. It can be understood that amount of compression affects thickness of the resulting carbon material, where the thickness has an effect on capacity, as will become clearer as this specification continues. The examples, described infra, will illustrate varying thicknesses that are formed and contemplated by the current invention, where thickness is adjustable based on compression. As such, thickness of a composite (typically compressed) can be about 10-1000 micrometers, or any narrower range therein based on benefits needed of the final composite. The current invention also contemplates a powder or particle form of the carbon aerogel, where a binder would be needed and particle size optimized. A range of particle sizes may be about 1-50 micrometers.

Nanoporous carbons, such as carbon aerogels, according to the current invention, can be formed from any suitable organic precursor materials. Examples of such materials include, but are not limited to, RF, PF, PI, polyamides, polyacrylate, polymethyl methacrylate, acrylate oligomers, polyoxyalkylene, polyurethane, polyphenol, polybutadiane, trialkoxysilyl-terminated polydimethylsiloxane, polystyrene, polyacrylonitrile, polyfurfural, melamine-formaldehyde, cresol formaldehyde, phenol-furfural, polyether, polyol, polyisocyanate, polyhydroxybenze, polyvinyl alcohol dialdehyde, polycyanurates, polyacrylamides, various epoxies, agar, agarose, chitosan, and combinations and derivatives thereof. Any precursors of these materials may be used to create and use the resulting materials. In an exemplary embodiment, the carbon aerogel is formed from a pyrolyzed/carbonized polyimide-based aerogel, i.e., the polymerization of polyimide. Even more specifically, the polyimide-based aerogel can be produced using one or more methodologies described in U.S. Pat. Nos. 7,071,287 and 7,074,880 to Rhine et al., e.g., by imidization of poly(amic) acid and drying the resulting gel using a supercritical fluid. Other adequate methods of producing polyimide aerogels (and carbon aerogels derived therefrom) are contemplated herein as well, for example as described in U.S. Pat. No. 6,399,669 to Suzuki et al.; U.S. Pat. No. 9,745,198 to Leventis et al.; Leventis et al., Polyimide Aerogels by Ring-Opening Metathesis Polymerization (ROMP), Chem. Mater. 2011, 23, 8, 2250-2261; Leventis et al., Isocyanate-Derived Organic Aerogels: Polyureas, Polyimides, Polyamides, MRS Proceedings, 1306 (2011), Mrsf10-1306-bb03-01. doi:10.1557/opl.2011.90; Chidambareswarapattar et al., One-step room-temperature synthesis of fibrous polyimide aerogels from anhydrides and isocyanates and conversion to isomorphic carbons, J. Mater. Chem., 2010, 20, 9666-9678; Guo et al., Polyimide Aerogels Cross-Linked through Amine Functionalized Polyoligomeric Silsesquioxane, ACS Appl. Mater. Interfaces 2011, 3, 546-552; Nguyen et al., Development of High Temperature, Flexible Polyimide Aerogels, American Chemical Society, proceedings published 2011; Meador et al., Mechanically Strong, Flexible Polyimide Aerogels Cross-Linked with Aromatic Triamine, ACS Appl. Mater. Interfaces, 2012, 4 (2), pp 536-544; Meador et al., Polyimide Aerogels with Amide Cross-Links: A Low Cost Alternative for Mechanically Strong Polymer Aerogels, ACS Appl. Mater. Interfaces 2015, 7, 1240-1249; Pei et al., Preparation and Characterization of Highly Cross-Linked Polyimide Aerogels Based on Polyimide Containing Trimethoxysilane Side Groups, Langmuir 2014, 30, 13375-13383. The resulting polyimide aerogel would then be pyrolyzed to form a polyimide-derived carbon aerogel.

Carbon aerogels according to exemplary embodiments of the present disclosure, e.g., polyimide-derived carbon aerogels, can have a residual nitrogen content of at least about 4 wt %. For example, carbon aerogels according to embodiments disclosed herein can have a residual nitrogen content of at least about 0.1 wt %, at least about 0.5 wt %, at least about 1 wt % at least about 2 wt %, at least about 3 wt %, at least about 4 wt %, at least about 5 wt %, at least about 6 wt %, at least about 7 wt %, at least about 8 wt %, at least about 9 wt %, at least about 10 wt %, or in a range between any two of these values.

In certain embodiments of the present disclosure, a dried polymeric aerogel composition can be subjected to a treatment temperature of 200° C. or above, 400° C. or above, 600° C. or above, 800° C. or above, 1000° C. or above, 1200° C. or above, 1400° C. or above, 1600° C. or above, 1800° C. or above, 2000° C. or above, 2200° C. or above, 2400° C. or above, 2600° C. or above, 2800° C. or above, or in a range between any two of these values, for carbonization of the organic (e.g., polyimide) aerogel. Without being bound by theory, it is contemplated herein that the electrical conductivity of the aerogel composition increases with carbonization temperature.

Within the context of the present disclosure, the term "electrical conductivity" refers to a measurement of the ability of a material to conduct an electric current or other allow the flow of electrons therethrough or therein. Electrical conductivity is specifically measured as the electric conductance/susceptance/admittance of a material per unit size of the material. It is typically recorded as S/m (Siemens/meter) or S/cm (Siemens/centimeter). The electrical conductivity or resistivity of a material may be determined by methods known in the art, for example including, but not limited to: In-line Four Point Resistivity (using the Dual Configuration test method of ASTM F84-99). Within the context of the present disclosure, measurements of electrical conductivity are acquired according to ASTM F84—resistivity (R) measurements obtained by measuring voltage (V) divided by current (I), unless otherwise stated. In certain embodiments, aerogel materials or compositions of the present disclosure have an electrical conductivity of about 10 S/cm or more, 20 S/cm or more, 30 S/cm or more, 40 S/cm or more, 50 S/cm or more, 60 S/cm or more, 70 S/cm or more, 80 S/cm or more, or in a range between any two of these values.

Within the context of the present disclosure, the term "electrochemically active species" refers to an additive that is capable of accepting and releasing ions within an energy storage device. Using LIBs as an example, an electrochemically active species within the anode accepts lithium ions during charge and releases lithium ions during discharge. The electrochemically active species can be stabilized within the anode by having a direct/physical connection with the nanoporous carbon. In certain embodiments, the nanoporous carbon network forms interconnected structures around the electrochemically active species. The electrochemically active species is connected to the nanoporous carbon at a plurality of points. An example of an electrochemically active species is silicon, which expands upon lithiation and can crack or break, as previously noted. However, because silicon has multiple connection points with the nanoporous carbon (aerogel), silicon can be retained and remain active within the nanoporous structure, e.g., within the pores or otherwise encased by the structure, even upon breaking or cracking.

Within the context of the present disclosure, the terms "compressive strength", "flexural strength", and "tensile strength" refer to the resistance of a material to breaking or fracture under compression forces, flexure or bending forces, and tension or pulling forces, respectively. These strengths are specifically measured as the amount of load/force per unit area resisting the load/force. It is typically recorded as pounds per square inch (psi), megapascals (MPa), or gigapascals (GPa). Among other factors, the compressive strength, flexural strength, and tensile strength of a material collectively contribute to the material's structural integrity, which is beneficial, for example, to withstand volumetric expansion of silicon particles during lithiation in a LIB. Referring specifically to Young's modulus, which is an indication of mechanical strength, the modulus may be determined by methods known in the art, for example including, but not limited to: Standard Test Practice for Instrumented Indentation Testing (ASTM E2546, ASTM International, West Conshocken, Pa.); or Standardized Nanoindentation (ISO 14577, International Organization for Standardization, Switzerland). Within the context of the present disclosure, measurements of Young's modulus are acquired according to ASTM E2546 and ISO 14577, unless otherwise stated. In certain embodiments, aerogel materials or compositions of the present disclosure have a Young's modulus of about 0.2 GPa or more, 0.4 GPa or more, 0.6 GPa or more, 1 GPa or more, 2 GPa or more, 4 GPa or more, 6 GPa or more, 8 GPa or more, or in a range between any two of these values.

Within the context of the present disclosure, the term "pore size distribution" refers to the statistical distribution or relative amount of each pore size within a sample volume of a porous material. A narrower pore size distribution refers to a relatively large proportion of pores at a narrow range of pore sizes, thus optimizing the amount of pores that can surround the electrochemically active species and maximizing use of the pore volume. Conversely, a broader pore size distribution refers to relatively small proportion of pores at a narrow range of pore sizes. As such, pore size distribution is typically measured as a function of pore volume and recorded as a unit size of a full width at half max of a predominant peak in a pore size distribution chart. The pore size distribution of a porous material may be determined by methods known in the art, for example including, but not limited to, surface area and porosity analyzer by nitrogen adsorption and desorption from which pore size distribution can be calculated. Within the context of the present disclosure, measurements of pore size distribution are acquired according to this method, unless otherwise stated. In certain embodiments, aerogel materials or compositions of the present disclosure have a relatively narrow pore size distribution (full width at half max) of about 50 nm or less, 45 nm or less, 40 nm or less, 35 nm or less, 30 nm or less, 25 nm or less, 20 nm or less, 15 nm or less, 10 nm or less, 5 nm or less, or in a range between any two of these values.

Within the context of the present disclosure, the term "pore volume" refers to the total volume of pores within a sample of porous material. Pore volume is specifically measured as the volume of void space within the porous material, where that void space may be measurable and/or may be accessible by another material, for example an electrochemically active species such as silicon particles. It is typically recorded as cubic centimeters per gram ($cm^3$/g or cc/g). The pore volume of a porous material may be determined by methods known in the art, for example including, but not limited to, surface area and porosity analyzer by nitrogen adsorption and desorption from which pore volume can be calculated. Within the context of the present disclosure, measurements of pore volume are acquired according to this method, unless otherwise stated. In certain embodiments, aerogel materials or compositions of the present disclosure (without incorporation of electrochemically active species, e.g., silicon) have a relatively large pore volume of about 1 cc/g or more, 1.5 cc/g or more, 2 cc/g or more, 2.5 cc/g or more, 3 cc/g or more, 3.5 cc/g or more, 4 cc/g or more, or in a range between any two of these values. In other embodiments, aerogel materials or compositions of the present disclosure (with incorporation of electrochemically active species, e.g., silicon) have a pore volume of about 0.3 cc/g or more, 0.6 cc/g or more, 0.9 cc/g or more, 1.2 cc/g or more, 1.5 cc/g or more, 1.8 cc/g or more, 2.1 cc/g or more, 2.4 cc/g or more, 2.7 cc/g or more, 3.0 cc/g or more, 3.3 cc/g or more, 3.6 cc/g or more, or in a range between any two of these values.

Within the context of the present disclosure, the term "porosity" refers to a volumetric ratio of pores that does not contain another material (e.g., an electrochemically active species such as silicon particles) bonded to the walls of the pores. For clarification and illustration purposes, it should be noted that within the specific implementation of silicon-doped carbon aerogel as the primary anodic material in a LIB, porosity refers to the void space after inclusion of silicon particles. As such, porosity may be, for example, about 10%-70% when the anode is in a pre-lithiated state (to accommodate for ion transport and silicon expansion) and about 1%-50% when the anode is in a post-lithiated state (to accommodate for ion transport). More generally, porosity may be determined by methods known in the art, for example including, but not limited to, the ratio of the pore volume of the aerogel material to its bulk density. Within the context of the present disclosure, measurements of porosity are acquired according to this method, unless otherwise stated. In certain embodiments, aerogel materials or compositions of the present disclosure have a porosity of about 80% or less, 70% or less, 60% or less, 50% or less, 40% or less, 30% or less, 20% or less, 10% or less, or in a range between any two of these values.

It should be noted that pore volume and porosity are different measures for the same property of the pore structure, namely the "empty space" within the pore structure. For example, when silicon is used as the electrochemically active species contained within the pores of the nanoporous carbon material, pore volume and porosity refer to the space that is "empty", namely the space not utilized by the silicon or the carbon. As will be seen, densification, e.g., by compression, of the pre-carbonized nanoporous material can also have an effect on pore volume and porosity, among other properties.

Within the context of the present disclosure, the term "pore size at max peak from distribution" refers to the value at the discernible peak on a graph illustrating pore size distribution. Pore size at max peak from distribution is specifically measured as the pore size at which the greatest percentage of pores is formed. It is typically recorded as any unit length of pore size, for example micrometers or nm. The pore size at max peak from distribution may be determined by methods known in the art, for example including, but not limited to, surface area and porosity analyzer by nitrogen adsorption and desorption from which pore size distribution can be calculated and pore size at max peak can be determined. Within the context of the present disclosure, measurements of pore size at max peak from distribution are acquired according to this method, unless otherwise stated. In certain embodiments, aerogel materials or compositions of the present disclosure have a pore size at max peak from distribution of about 150 nm or less, 140 nm or less, 130 nm or less, 120 nm or less, 110 nm or less, 100 nm or less, 90 nm or less, 80 nm or less, 70 nm or less, 60 nm or less, 50 nm or less, 40 nm or less, 30 nm or less, 20 nm or less, 10 nm or less, 5 nm or less, 2 nm or less, or in a range between any two of these values.

Within the context of the present disclosure, the term "strut width" refers to the average diameter of nanostruts, nanorods, nanofibers, or nanofilaments that form an aerogel having a fibrillar morphology. It is typically recorded as any unit length, for example micrometers or nm. The strut width may be determined by methods known in the art, for example including, but not limited to, scanning electron microscopy image analysis. Within the context of the present disclosure, measurements of strut width are acquired according to this method, unless otherwise stated. In certain embodiments, aerogel materials or compositions of the present disclosure have a strut width of about 10 nm or less, 9 nm or less, 8 nm or less, 7 nm or less, 6 nm or less, 5 nm or less, 4 nm or less, 3 nm or less, 2 nm or less, or in a range between any two of these values. An exemplary range of strut widths found in the following examples (and in particular seen in the SEM images in the figures) is about 2-5 nm. Smaller strut widths, such as these, permit a greater amount of struts to be present within the network and thus contact the electrochemically active species, in turn allowing more of the electrochemically active species to be present within the composite. This increases electrical conductivity and mechanical strength.

Within the context of the present disclosure, the term "fibrillar morphology" refers to the structural morphology of a nanoporous carbon (e.g., aerogel) being inclusive of struts, rods, fibers, or filaments. For example, in an embodiment, choice of solvent, such as dimethylacetamide (DMAC), can affect the production of such morphology. Further, in certain embodiments, when the carbon aerogel is derived from polyimides, a crystalline polyimide results from the polyimide forming a linear polymer. As will become clearer in the following examples, certain embodiments were observed surprisingly to include a fibrillar morphology as an interconnected polymeric structure, where a long linear structure was anticipated, based on the known behavior of the polyimide precursors. In comparison, the product form of the nanoporous carbon can alternatively be particulate in nature or powder wherein the fibrillar morphology of the carbon aerogel persists. As will become clearer as this specification continues, a fibrillar morphology can provide certain benefits over a particulate morphology, such as mechanical stability/strength and electrical conductivity, particularly when the nanoporous carbon is implemented in specific applications, for example as the anodic material in a LIB. It should be noted that this fibrillar morphology can be found in nanoporous carbons of both a monolithic form and a powder form; in other words, a monolithic carbon can have a fibrillar morphology, and aerogel powder/particles can have a fibrillar morphology. Furthermore, in certain embodiments, when the nanoporous carbon material contains additives, such as silicon or others, the fibrillar nanostructure inherent to the carbon material is preserved and serves as a bridge between additive particles.

Within the context of the present disclosure, the term "cycle life" refers to the number of complete charge/discharge cycles that an anode or a battery (e.g., LIB) is able to support before its capacity falls under about 80% of its original rated capacity. Cycle life may be affected by a variety of factors that are not significantly impacted over time, for example mechanical strength of the underlying substrate (e.g., carbon aerogel), connectivity of the silicon particles within the aerogel, and maintenance of interconnectivity of the aerogel. It is noted that these factors actually remaining relatively unchanged over time is a surprising aspect of certain embodiments of the current invention. Cycle life may be determined by methods known in the art, for example including, but not limited to, cycle testing, where battery cells are subject to repeated charge/discharge cycles at predetermined current rates and operating voltage. Within the context of the present disclosure, measurements of cycle life are acquired according to this method, unless otherwise stated. In certain embodiments of the present disclosure, energy storage devices, such as batteries, or electrode thereof, have a cycle life of about 25 cycles or more, 50 cycles or more, 75 cycles or more, 100 cycles or more, 200 cycles or more, 300 cycles or more, 500 cycles or more, 1000 cycles or more, or in a range between any two of these values.

Within the context of the present disclosure, the term "capacity" refers to the amount of specific energy or charge that a battery is able to store. Capacity is specifically measured as the discharge current that the battery can deliver over time, per unit mass. It is typically recorded as ampere-hours or milliampere-hours per gram of total electrode mass, Ah/g or mAh/g. The capacity of a battery (and an anode in particular) may be determined by methods known in the art, for example including, but not limited to: applying a fixed constant current load to a fully charged cell until the cell's voltage reaches the end of discharge voltage value; the time to reach end of discharge voltage multiplied by the constant current is the discharge capacity; by dividing the discharge capacity by the weight of electrode material or volume, specific and volumetric capacities can be determined. Within the context of the present disclosure, measurements of capacity are acquired according to this method, unless otherwise stated. In certain embodiments, aerogel materials or compositions of the present disclosure have a capacity of about 200 mAh/g or more, 300 mAh/g or more, 400 mAh/g or more, 500 mAh/g or more, 600 mAh/g or more, 700 mAh/g or more, 800 mAh/g or more, 900 mAh/g or more, 1000 mAh/g or more, 1200 mAh/g or more, 1400 mAh/g or more, 1600 mAh/g or more, 1800 mAh/g or more, 2000 mAh/g or more, 2400 mAh/g or more, 2800 mAh/g or more, 3200 mAh/g or more, or in a range between any two of these values. Unless otherwise noted, when the current nanoporous carbon material is used in a battery, capacity is reported at cycle 10 of the battery.

Within the context of the present disclosure, the term "silicon utilization" refers to the difference between the theoretical capacity of silicon to lithiate and the measured capacity of the electrode based on silicon weight. Silicon utilization is specifically measured as the efficiency of silicon use within an electrode. It is recorded herein as a percentage using the following equation:

$$\text{silicon utilization (\%)} = \frac{\text{measured capacity of the nanoporous carbon material per gram of silicon in the material}}{\text{theoretical capacity of silicon per gram } \left[4200\frac{mAh}{g}\right]} \times 100$$

To calculate silicon utilization, capacity of the electrode and capacity of silicon is measured as discussed previously. In certain embodiments, aerogel materials or compositions of the present disclosure have a silicon utilization of about 20% or more, 30% or more, 40% or more, 50% or more, 60% or more, 70% or more, 80% or more, 90% or more, or in a range between any two of these values, where a higher percentage indicates better or more efficient silicon utilization. Unless otherwise noted, when the current nanoporous carbon material is used in a battery, silicon utilization is reported at cycle 10 of the battery.

Figure 3:
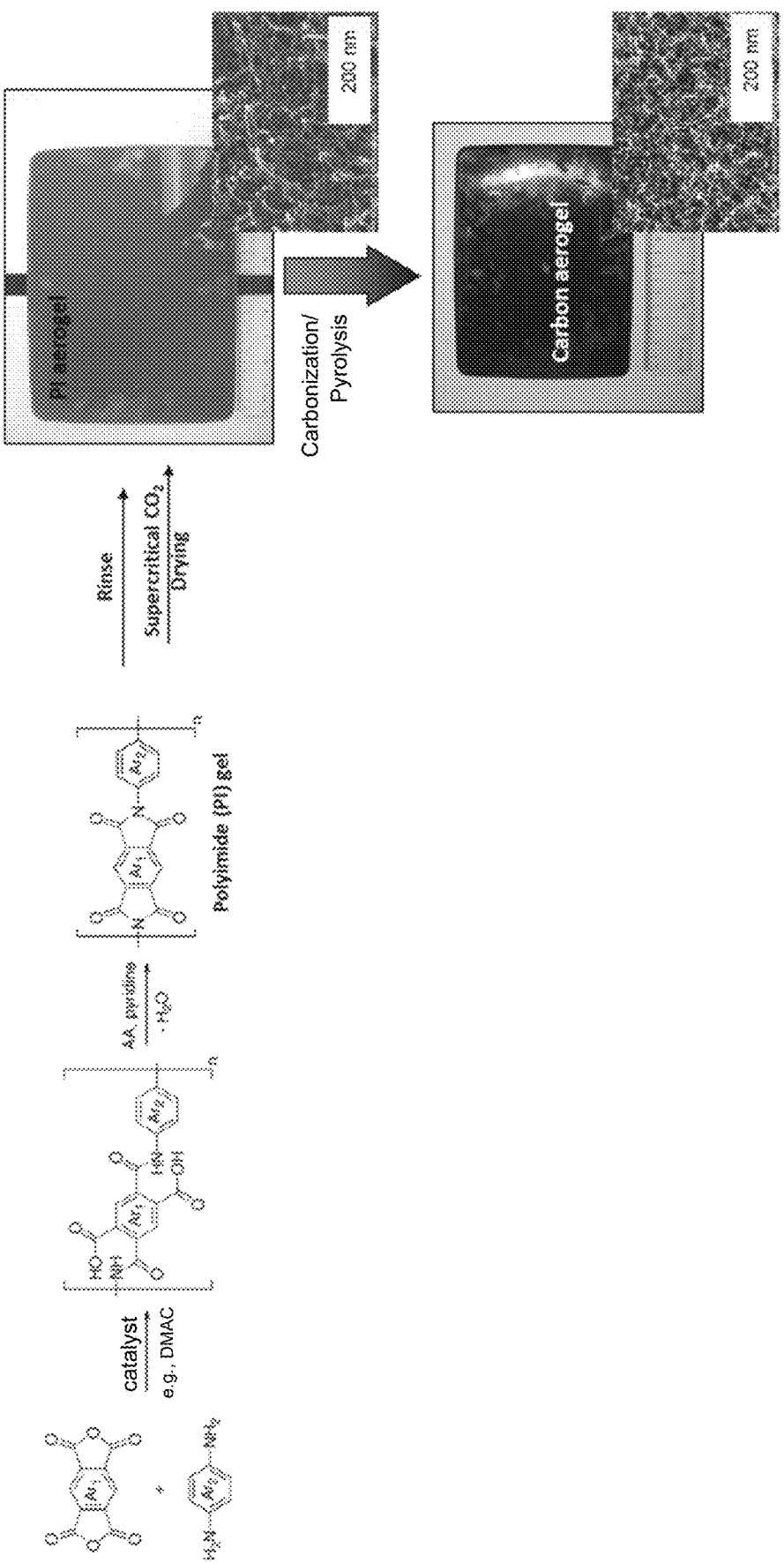
FIG. 3 is a flow diagram illustrating formation of a polyimide-derived carbon aerogel.

In an embodiment, the current invention is an anode of a LIB, comprising a silicon-doped, polyimide-derived carbon aerogel, where silicon particles are contained at least partially within the pores of the carbon aerogel. A general reaction and process of developing a polyimide-derived carbon aerogel (i.e., without silicon) can be seen in FIG. 3. As will be seen, the structure of the carbon aerogel pores is tunable to have different properties (e.g., pore volume, pore size distribution) based on need (e.g., size or capacity of electrode in LIB). In another embodiment, the current invention is an electrode in a LIB or electrochemical cell thereof comprising such an anode. In yet further embodiments, the current invention is a device or system that incorporates such an energy storage device. Examples include, but are not limited to, electric vehicles and electronic devices (e.g., mobile devices and drones).

In certain embodiments, the current invention is a method of forming or manufacturing a continuous porous carbon silicon composite, such as a carbon aerogel. Polyimide precursors, such as diamine and dianhydride that can each include an aromatic group and/or an aliphatic group, are mixed in a suitable solvent (e.g., polar, aprotic solvent). Prior to adding imidization gelation catalysts, silicon particles are mixed into the polyimide precursors in solvent. The imidization gelation catalyst is then added to initiate the mixture for gelation. In alternative embodiments, imidization can be accomplished via thermal imidization, where any suitable temperature and time range is contemplated (e.g., about 100° C.-200° C. for about 20 minutes to about 8 hours, followed by heating at about 300° C.-400° C. for about 20 minutes to about 1 hour). The gelled mixture is then dried to yield a continuous porous polyimide silicon composite, where the drying can be performed using subcritical and/or supercritical carbon dioxide. Optionally, the polyimide silicon composite can be compressed, preferably uniaxially (e.g., up to 95% strain), to increase density, adjustable up to about 1.5 g/cc based on the amount of compression. In exemplary embodiments, the polyimide silicon composite can be compressed to greater than about 80% strain prior to pyrolyzing the composite. Regardless of whether compression has taken place, the polyimide silicon composite is pyrolyzed to yield the continuous porous carbon silicon composite, where the resulting composite comprises greater than 0% and less than about 95% silicon by weight and comprises a porosity between about 5%-99%. In certain embodiments, pyrolysis can be performed at a maximum temperature of between about 750° C. and about 1600° C., optionally with graphitization from about 1600° C. up to about 3000° C.

In certain embodiments, the carbon silicon composite can be a monolith or a freestanding structure, can be prepared on or off a substrate, can be micronized to a powder form, or can be prepared as a particulate material, e.g., as beads. Furthermore, the composite may be reinforced with or without a non-woven or woven material (e.g., fiber, foam, etc.). Optionally, the composite may be pre-doped with a metal or metal oxides, for example including, but not limited to, tin, sulfur, phosphorus, nickel, cobalt, manganese, lithium, magnesium, iron, zinc, boron, titanium, aluminum oxide, titanium oxide, niobium oxide, molybdenum oxide, silica, and aluminosilicate. Further, the silicon particles may be pre-doped with a p-type acceptor (e.g., boron, aluminum, gallium, and indium) or an n-type donor (e.g., phosphorous, lithium, arsenic, antimony, bismuth)

In alternative embodiments, the above methodology may be utilized to form or manufacture the porous carbon silicon composite, with an exception that rather than silicon particles being mixed into the mixture of polyimide precursors in solvent, a silicate (e.g., silicon dioxide, aluminosilicate, and/or halloysite) and a reducing agent (e.g., magnesium, lithium, sodium, potassium, aluminum, calcium or a combination thereof) are mixed into the mixture of polyimide precursors in solvent. Upon drying, a continuous porous polyimide silicate and reducing agent composite is formed, which optionally can be compressed to adjust density. In this case (i.e., when using a silicate and reducing agent), the silicate and reducing agent react to form silicon in situ within the carbon composite under inert conditions with hydrogen gas at a temperature greater than about 700° C.

In further alternative embodiments, the above methodologies may be utilized, with an exception that rather than adding silicon or silicate+reducing agent to the polyimide precursors, a continuous porous carbon can be formed first (i.e., polyimide precursors, imidization using a catalyst or heat, drying, and pyrolysis), followed by depositing silicon onto or into the porous carbon. In this case, the silicon is deposited by dip coating the porous carbon into a silicon-forming silane precursor, followed by heating under inert conditions to decompose the silane to form a conformal silicon coating within the porous carbon. This dip processing can be performed multiple times to increase thickness and silicon content by weight up to about 95%. In other embodiments, the silicon can be deposited via atomic layer deposition or CVD.

Furthermore, it is contemplated herein that the pore size is tunable as needed. There are five primary methods of adjusting pore size taught herein. First, the amount of solids content, specifically the amount of polyimide precursor monomers (e.g., aromatic or aliphatic diamine and aromatic or aliphatic dianhydride), can adjust pore size. Smaller pore sizes result from a greater amount of solids per unit volume of fluid, due to less room being available such that interconnection takes place more closely. It should be noted that strut width does not change measurably, regardless of the amount of solids used. The amount of solids relates more so to how dense the network will be.

Another method of adjusting pore size is the use of radiation (e.g., radio wave, microwave, infrared, visible light, ultraviolet, X-ray, gamma ray) on the composite in either polyimide state or in carbon state. Radiation has an oxidizing effect, resulting in an increase in surface area, increase in pore size, and broadening of pore size distribution. Thirdly, pore size is affected by a macroscopic compression of the polyimide composite. As will be evidenced in the examples below, pore size reduces with compression.

Yet another method of adjusting pore size is ion bombardment of the composite in either polyimide state or carbon state. The effect of ion bombardment depends on the method designated. For example, there is additive ion bombardment (e.g., CVD), where something is added, resulting in a reduction of pore size. There is also destructive ion bombardment, where pore size would increase. Finally, pore size can be adjusted (increase or decrease) with heat treatment under different gas environments, for example presence of carbon dioxide or carbon monoxide, chemically active environments, hydrogen reducing environments, etc. A carbon dioxide environment, for example, is known to make activated carbon, where in instances of activation, mass is removed, pore size increases, and surface area increases.

Although each of the above methods of adjusting pore size is contemplated, the current disclosure will focus more on changing solids content (polyimide precursors) and compression of the polyimide composite prior to carbonization.

EXAMPLES

The following examples are described for illustrative purposes only and are not intended to be limiting the scope of the various embodiments of the current invention in any way.

Example 1: CPI Composites with Low Level of Doping

A. CPI with 9% Dopants Dispersed in the Polyimide

PI gels were prepared from pyromellitic dianhydride (PMDA) and 1,4-phenylene diamine (PDA) in a 1:1 molar ratio in DMAC solvent at 0.06 g/cc target density. The precursors were mixed at room temperature for 3 hours, and then acetic anhydride (AA) was added at 4.3 molar ratio to PMDA and mixed with the solution for 2 hours. Powder dopants such as graphite CNGT0112 with a thickness of ~40 nm and length of ~400-600 nm, as well as silicon BASIC005 with spherical particles of ~30-nm diameter were acquired from ACS MATERIALS. The solutions were doped with graphite or silicon (Si) at 4.5% per total solids. Graphite was mixed with the solution for 10 minutes using magnetic bar stirring, and the doped mixture and the imidization was catalyzed with pyridine (Py). The graphite dispersed well, based on a visual assessment. After stirring the silicon with the polyimide solution for 10 minutes, the dispersion was visually poor (i.e., evidence of settling and/or particle agglomeration in the solution state) and the mixture was further sonicated for 3 minutes. Once the quality of the dispersion improved, pyridine catalyst was added to the mixture. The molar ratio of Py to PMDA was 4.0.

To prepare PI composites, the solutions were cast between glass plates with spacers on the edges to control thickness. Other suitable methods of casting the solutions are contemplated herein as well. The spacers were made of 200-micrometer thick aluminum foil. Monoliths of ~2-inch diameter were also cast in Teflon containers. The gelation time at ambient temperature was ~11.5 minutes for the graphite-doped samples and ~15.5 minutes for the silicon-doped samples. The gels were cured at room temperature overnight followed by 3 ethanol exchanges at 68° C. prior to the supercritical $CO_2$ extraction. The PI aerogel composites were compressed from about 250 micrometers to various thicknesses and pyrolyzed under inert atmosphere for 2 hours at 1050° C. for carbonization to form CPI composites. The % dopant in CPI was calculated to be ~9%, based on the amount of dopant in the formulation and the weight of the composite retained after pyrolysis.

Figure 4:
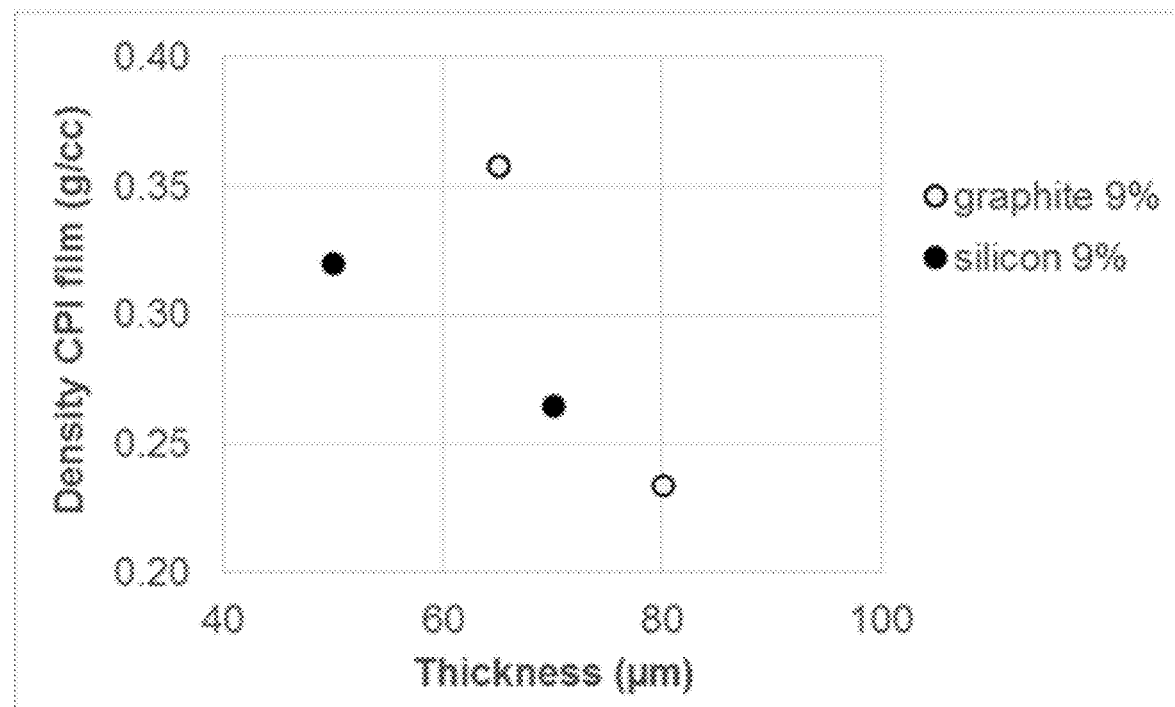
FIG. 4 depicts density of carbonized polyimide (CPI) composites as a function of the compressed thickness (initial thickness of about 250 micrometers).

The density of the compressed CPI composites of ~80-50 micrometer thickness ranged from ~0.24-0.36 g/cc (Table 1 and FIG. 4).

TABLE 1

Properties of low-density CPI composites doped with 9% graphite or Si.

| Dopant | Thickness CPI composite (μm) | Density (g/cc) | Porosity % |
|---|---|---|---|
| Graphite | 80 | 0.234 | 89.4 |
|  | 65 | 0.358 | 83.7 |
| Silicon | 70 | 0.265 | 88.0 |
|  | 50 | 0.320 | 85.5 |

The porosity was calculated based on the actual density of the CPI composite and the skeletal density. Since the density of amorphous carbon ranges from ~2.0-2.3 g/cc and that of silicon or graphite is ~2.3 g/cc, the skeletal density used in these calculations was ~2.2 g/cc for all composites. High porosities of 84-89% were calculated for these low density composites.

B. CPI with 9% Dopants Dispersed in the Solvent by Mixing

A similar experiment was performed using solutions of 0.10 g/cc polyimide target density. The dopants were mixed in this case with a portion of DMAC for 10 minutes, and added to the mixture prior to catalysis. Teflon spacers of 500-micrometer thickness were used for casting. The molar ratio of Py to PMDA was 2.0. The gelation time was ~2.5 minutes for the graphite-doped samples and ~4.0 minutes for the silicon-doped samples. The gels were extracted using supercritical $CO_2$. The PI aerogel composites were compressed from about 580 micrometers to various thicknesses and pyrolyzed for 2 hours at 1050° C. for carbonization to form CPI composites.

The properties of the CPI composites are shown in Table 2. As expected, the more compressed composites showed slightly lower porosity.

TABLE 2

Properties of high-density CPI composites doped with 9% graphite or Si.

| Dopant | Thickness CPI composite (μm) | Density (g/cc) | Porosity % |
|---|---|---|---|
| Graphite | 100 | 0.674 | 69.4 |
| | 80 | 0.848 | 61.5 |
| | 105 | 0.653 | 70.3 |
| | 90 | 0.800 | 63.6 |
| | 80 | 0.865 | 60.7 |
| | 90 | 0.822 | 62.6 |
| | 80 | 0.875 | 60.2 |
| Silicon | 90 | 0.622 | 71.7 |
| | 100 | 0.653 | 70.3 |
| | 115 | 0.579 | 73.7 |
| | 90 | 0.762 | 65.4 |
| | 105 | 0.622 | 71.7 |
| | 115 | 0.576 | 73.8 |
| | 90 | 0.725 | 67.0 |

Figure 5:
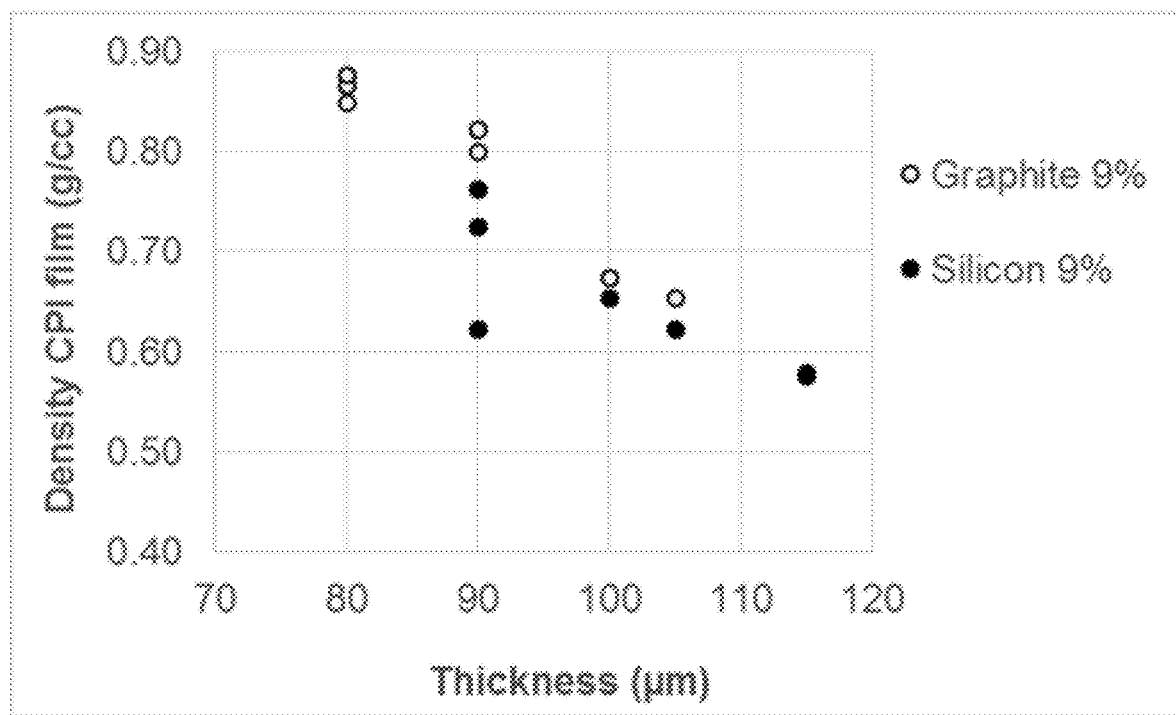
FIG. 5 depicts density of CPI composites as a function of the compressed thickness (initial thickness of about 580 micrometers).

The density of the compressed CPI composites (~115-80 micrometer thickness) ranged from ~0.57-0.87 g/cc. The silicon-doped CPI composites had slightly lower densities compared to the graphite-doped samples (FIG. 5).

The densities and shrinkages of the doped PI aerogel monoliths after pyrolysis are shown in Table 3. The densities of the non-compressed monoliths (LS1 & LG1) were lower compared to those of the compressed composites (LS2 & LG2).

TABLE 3

Density and shrinkage of doped CPI aerogel monoliths.

| ID | Dopant | % Dopant in CPI monolith | Target density (g/cc) | Density CPI monolith (g/cc) | % XY shrinkage | % Z shrinkage |
|---|---|---|---|---|---|---|
| LS1 | Si | 9 | 0.06 | 0.17 | 32.5 | 29.1 |
| LG1 | Graphite | 9 | 0.06 | 0.16 | 32.9 | 30.6 |
| LS2 | Si | 9 | 0.10 | 0.22 | 33.0 | 30.0 |
| LG2 | Graphite | 9 | 0.10 | 0.33 | 35.4 | 34.8 |

Figure 6A:
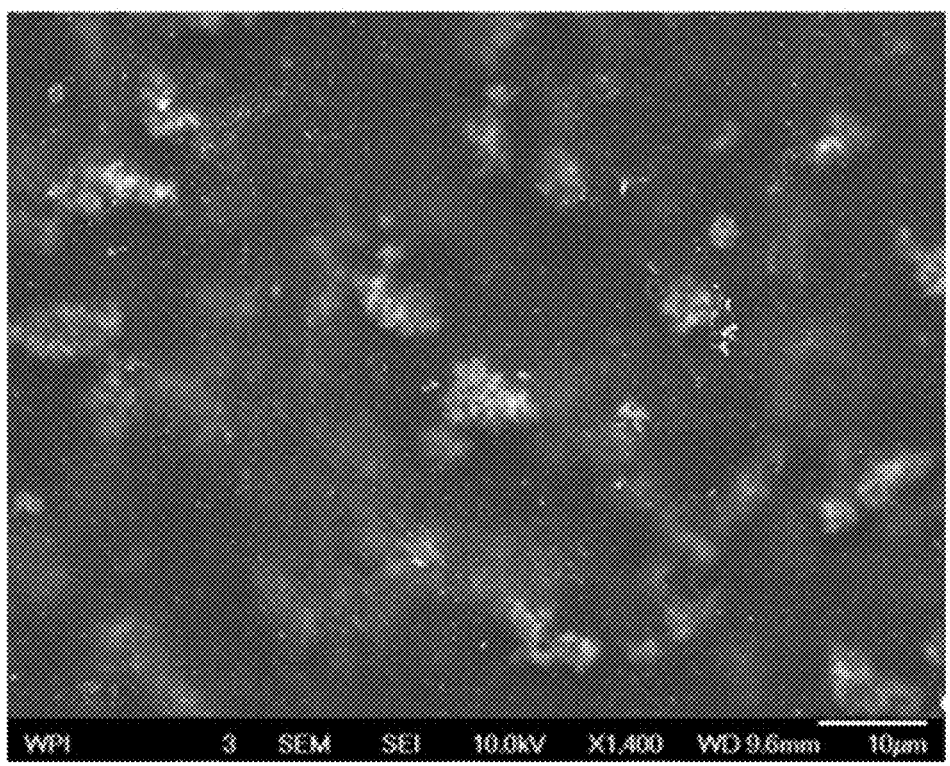
FIG. 6A is a scanning electron microscope (SEM) image of a silicon-doped, non-compressed PI aerogel (LS1)
Figure 6B:
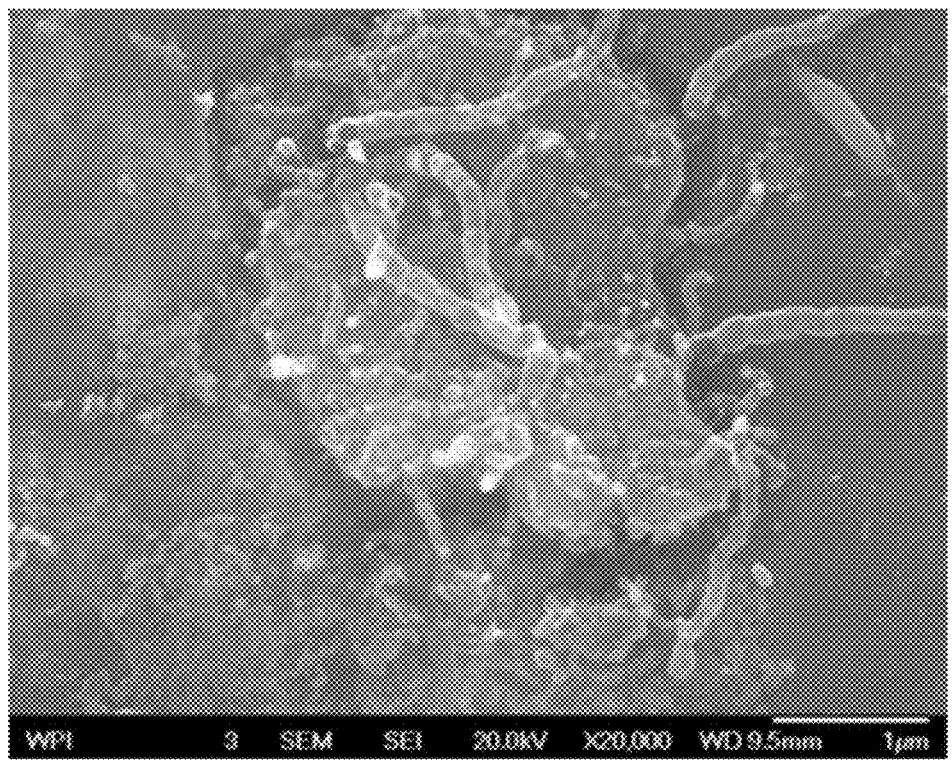
FIG. 6B is an SEM image of a silicon-doped, compressed PI aerogel (LS2).
Figure 7:
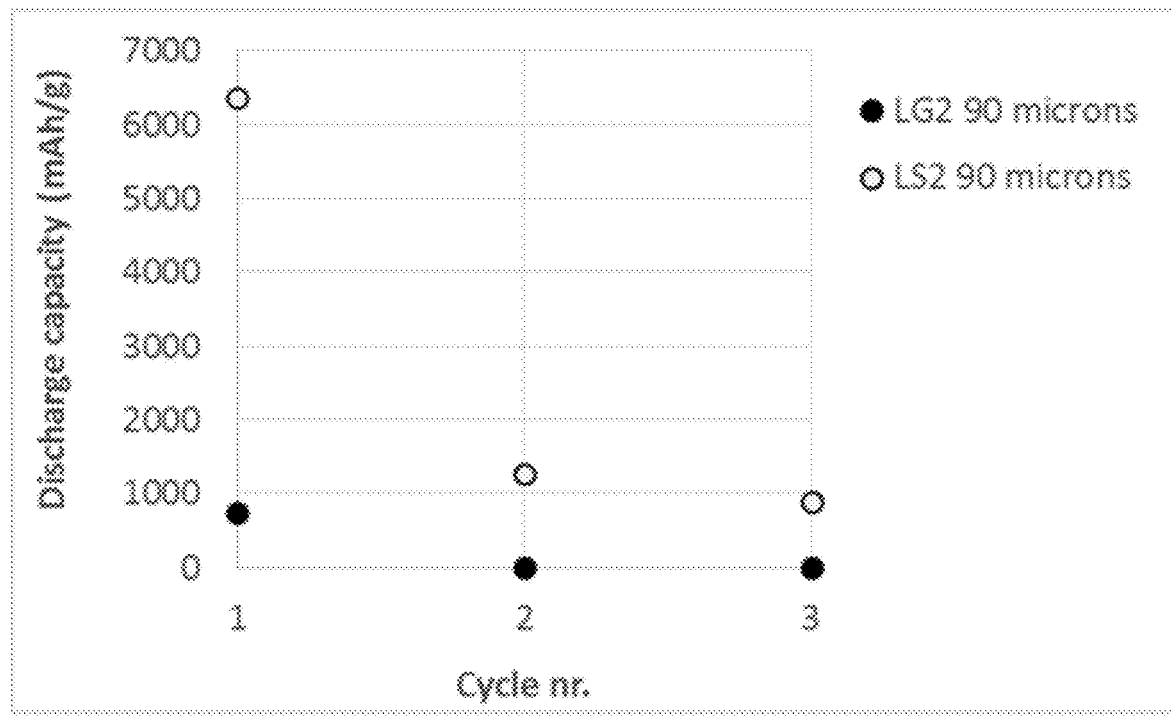
FIG. 7 depicts discharge capacities per dopant (silicon, LS2; graphite; LG2) compressed composites (half-cell battery test, 0.1° C. rate).

SEM images of the pyrolyzed composites doped with silicon are shown in FIGS. 6A-6B; note that FIG. 6B shows the fibrillar morphology of the silicon-doped CPI composite. Pockets of silicon agglomerates and silicon nanowires were embedded in the carbon matrix. The anode discharge capacities per dopant content from the half-cell battery tests are shown in FIG. 7. The silicon provided a significantly higher initial capacity compared to the graphite dopant. Though initial capacity decreased with cycling, its reversible capacity was still dramatically higher than graphite alone as in conventional anodes. Furthermore, the capacity fading likely is due to the foil electrode used in these half-cell battery tests, such that that electrode was incapable of operating at the high capacity of the silicon-containing electrode.

Example 2: CPI Composites of High PI Solid Contents and High Level of Silicon Doping A. CPI Doped with 27% Silicon Dispersed by Sonication in Solvent PI gels were prepared using 0.10 g/cc target density. The PMDA and PDA precursors were mixed at room temperature for 3 hours. Separately, silicon powder of 30 nm particle size was sonicated for 20 seconds in DMAC solvent, and added to the mixture at 15.0% per total solids and stirred for 15 minutes. AA was added to the doped mixture at 4.3 molar ratio to PMDA and mixed for 2 hours. Pyridine was used to catalyze the mixture at 2.0 molar ratio to PMDA. Composites were cast between glass plates using 500-micrometer thick Teflon spacers. Monoliths of 2-inch diameter were also cast in Teflon containers. The gelation time at ambient temperature was ~3.5 minutes. The gels were cured at room temperature overnight followed by three (3) ethanol exchanges at 68° C. prior to the supercritical C02 extraction. The PI aerogel composites were compressed, and pyrolyzed for 2 hours at 1050° C. for carbonization to form CPI composites.

B. CPI Doped with 46% and 64% Silicon Dispersed by Sonication in Solvent

PI gels were prepared at 0.08 g/cc target density. PMDA and PDA precursors were mixed at room temperature for 4 hours. Then AA was added and mixed with the solution for 2 hours. Separately, silicon powder of 30 nm particle size was sonicated for 1 minute in DMAC solvent, and added to the mixture 5 minutes prior to the addition of pyridine catalyst. Silicon was added at ~29.7% and ~49.6% per total solids. The doped mixture was catalyzed using 3.2 molar ratio of Py to PMDA. Composites were cast using spacers of 500-micrometer thickness. The gelation time at ambient temperature was ~6.5 minutes. After processing and extraction, the PI aerogel composites were compressed and pyrolyzed for 2 hours at 1050° C. for carbonization to form CPI composites.

Figure 8:
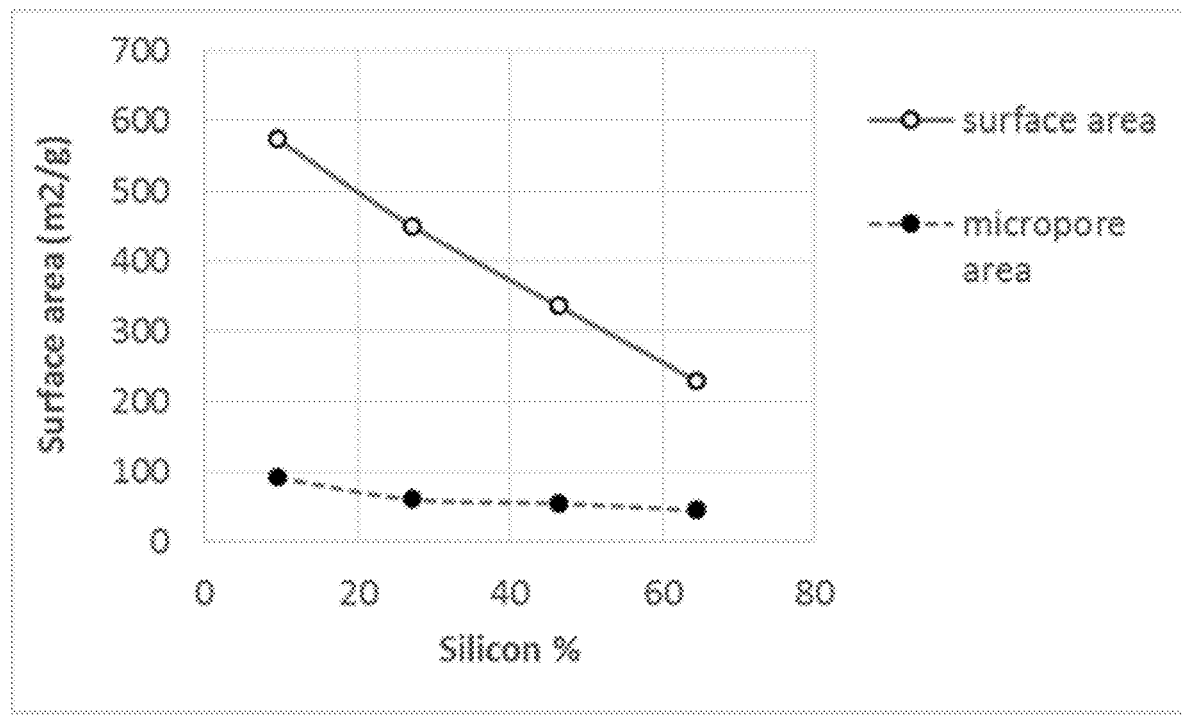
FIG. 8 depicts surface area and micropore area function of the silicon content in CPI monoliths.

A comparison of the surface area and porosimetry of the pyrolyzed, non-compressed monoliths doped with different amounts of silicon is given in Table 4 and FIG. 8. The surface area, micropore area, and the pore volume decreased with increasing silicon content in the CPI.

TABLE 4

Density and porosimetry of CPI monoliths doped with different Si amounts. In addition, pore volume can be seen to be at least about 1.5 cc/g.

| Td PI (g/cc) | Density CPI monolith (g/cc) | % Si per CPI | Surface Area (m²/g) | Micropore Area (m²/g) | Pore volume (cm³/g) |
|---|---|---|---|---|---|
| 0.10 | 0.221 | 9 | 574.7 | 91.8 | 3.6 |
| 0.10 | 0.339 | 27 | 450.9 | 61.5 | 2.4 |
| 0.08 | 0.295 | 46 | 336.2 | 55.7 | 2.3 |
| 0.08 | 0.270 | 64 | 230.9 | 46.0 | 1.5 |

Figure 9:
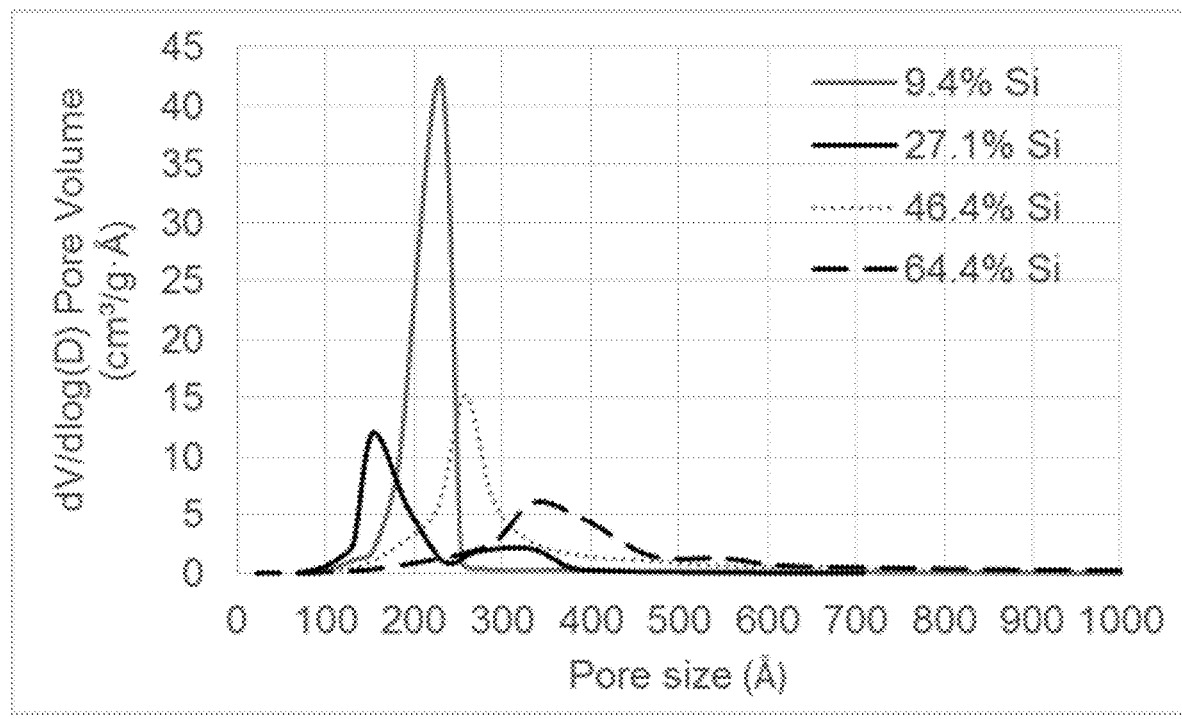
FIG. 9 depicts pore size distribution of Si-doped CPI monoliths.

Pore size distribution at maximum peak depended on the silicon content and the way the silicon was dispersed (FIG. 9). Generally, by increasing the silicon content, the pore size at max peak from distribution shifted to larger size. A shift of the main peak at maximum size distribution was observed from ~23 nm to 26 nm to 34 nm with increasing Si content from ~9% to ~46% to ~64%, respectively. The basal pore size distribution was broader with increasing silicon content as well.

However, comparing the Td 0.10 g/cc samples, the 27% Si monolith prepared by adding the silicon prior to AA and long mixing with solution showed a shift of the main peak to ~15 nm pore size vs. ~23 nm for the 9% Si monolith prepared by short Si mixing with solution. The sample doped with 27% Si content showed a bimodal pore size distribution, with another small broad band centered around 30 nm. This could be due to incomplete dispersion of silicon in a high target density, high viscosity mixture. This was also the case for the higher silicon content (64%) sample in this series, which also showed a bimodal pore size distribution.

The compressed, pyrolyzed composites had higher density, lower surface area, and pore volume compared to their non-compressed monolith counterparts (Table 5). The density was calculated as average of six (6) samples.

TABLE 5

Density and porosimetry of CPI compressed composites with variable Si doping. In addition, pore volume can be seen to be at least about 0.3 cc/g.

| % Si per CPI | Density (g/cc) | Surface area (m²/g) | Micropore area (m²/g) | Pore volume (cm³/g) |
|---|---|---|---|---|
| 9 | 0.648 | 255 | 62 | 0.47 |
| 27 | 0.860 | 137 | 38 | 0.35 |
| 46 | 0.733 | 147 | 40 | 0.43 |
| 64 | 0.755 | 126 | 34 | 0.53 |

Half-cell units (2032-coin cells) were built with the CPI composites as the electrode, lithium foil as the counter electrode, and CELGARD 2500 as the microporous separator between the electrodes. The electrolyte was 1.0M LiPF6 in EC:EMC (3:7) by weight. All the cells were tested with an ARBIN BT2043 tester and a charge/discharge rate of 0.1 C, unless otherwise stated. The discharge capacities of the compressed CPI composites at the 5$^{th}$ cycle are given in Table 6.

TABLE 6

Discharge capacities of Si doped compressed CPI composites (half-cell battery test).

| ID | % Si in CPI | Thickness (μm) | Density (g/cc) | Capacity per Si Cycle 5 (mAh/g) | Capacity per electrode Cycle 5 (mAh/g) | Silicon Utilization Cycle 5 |
|---|---|---|---|---|---|---|
| LS2 | 9 | 90 | 0.622 | 833 | — | 19.83% |
| S27 | 27 | 100 | 0.845 | 3085 | 836 | 73.45% |
| S46 | 46 | 90 | 0.751 | 2802 | 1300 | 66.71% |
| S64 | 64 | 143 | 0.775 | 856 | 551 | 20.38% |

Figure 10:
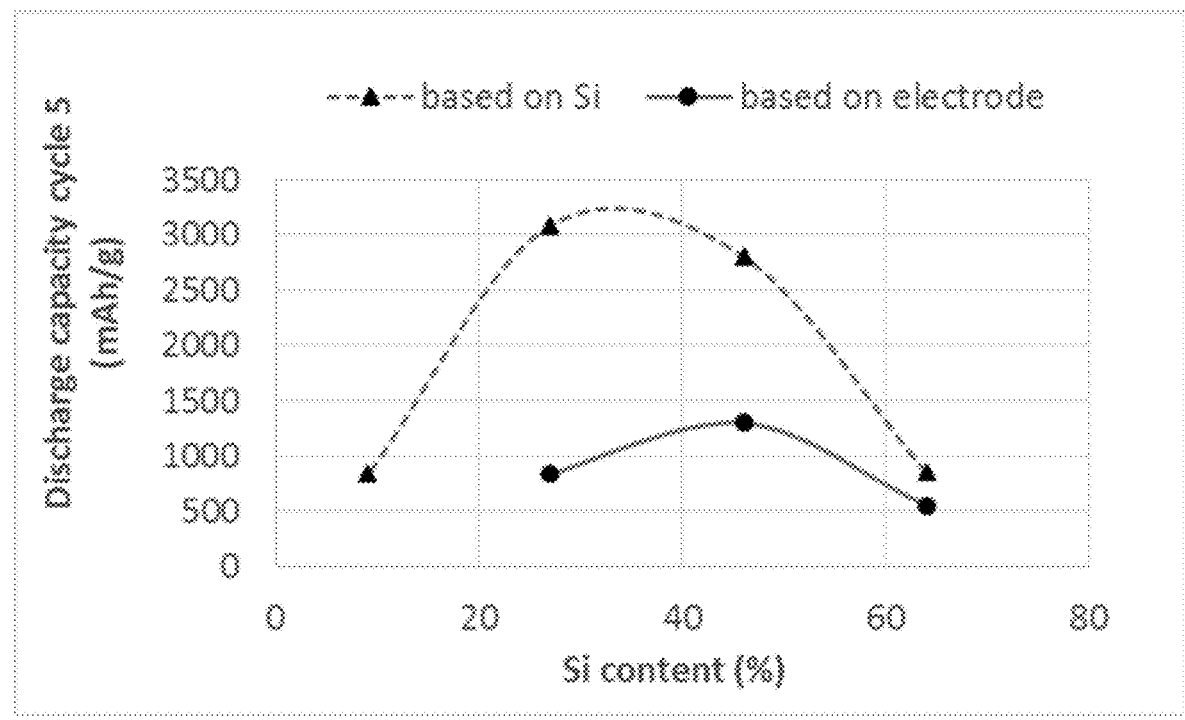
FIG. 10 depicts discharge capacities of CPI composites as a function of the Si content, at cycle 5.

The optimum performance for these samples was obtained at a Si content of 30-50% per CPI, as shown in FIG. 10.

Figure 11A:
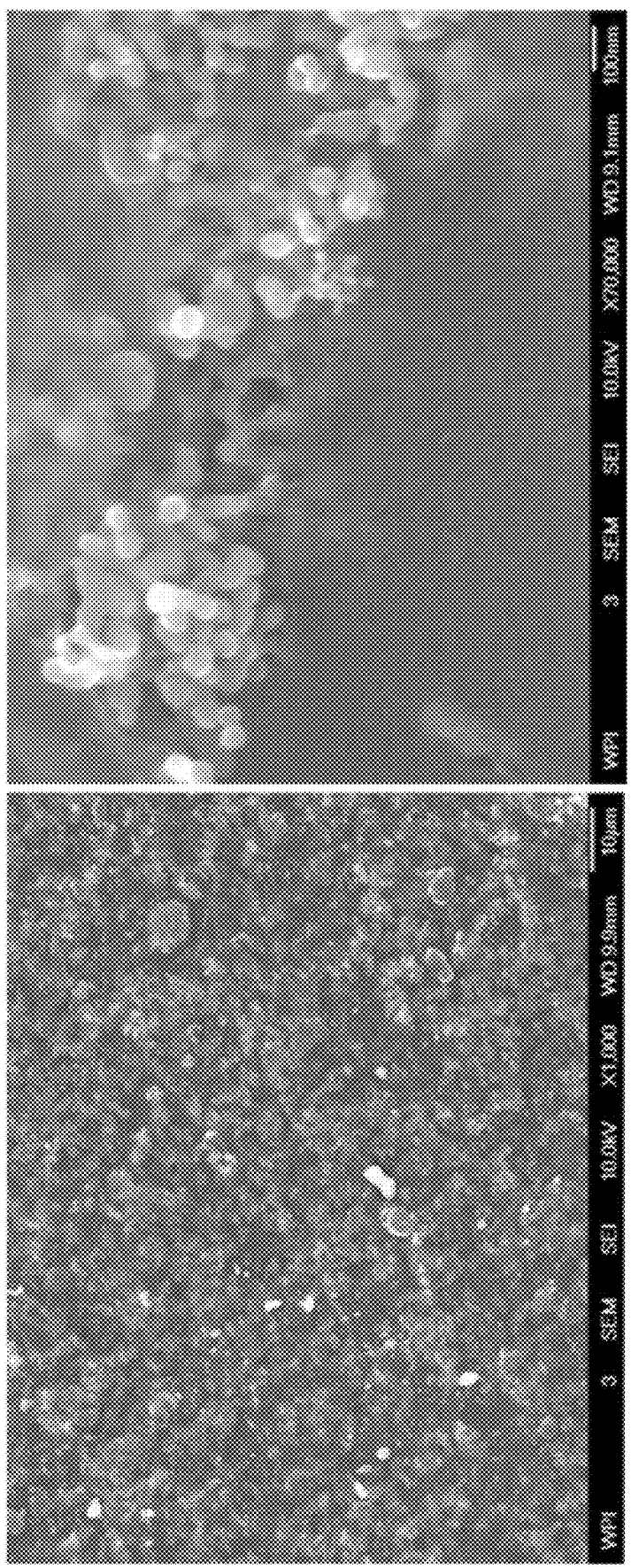
FIG. 11A is an SEM image of a CPI composite with Si loading of 27% Si in the composite.
Figure 11B:
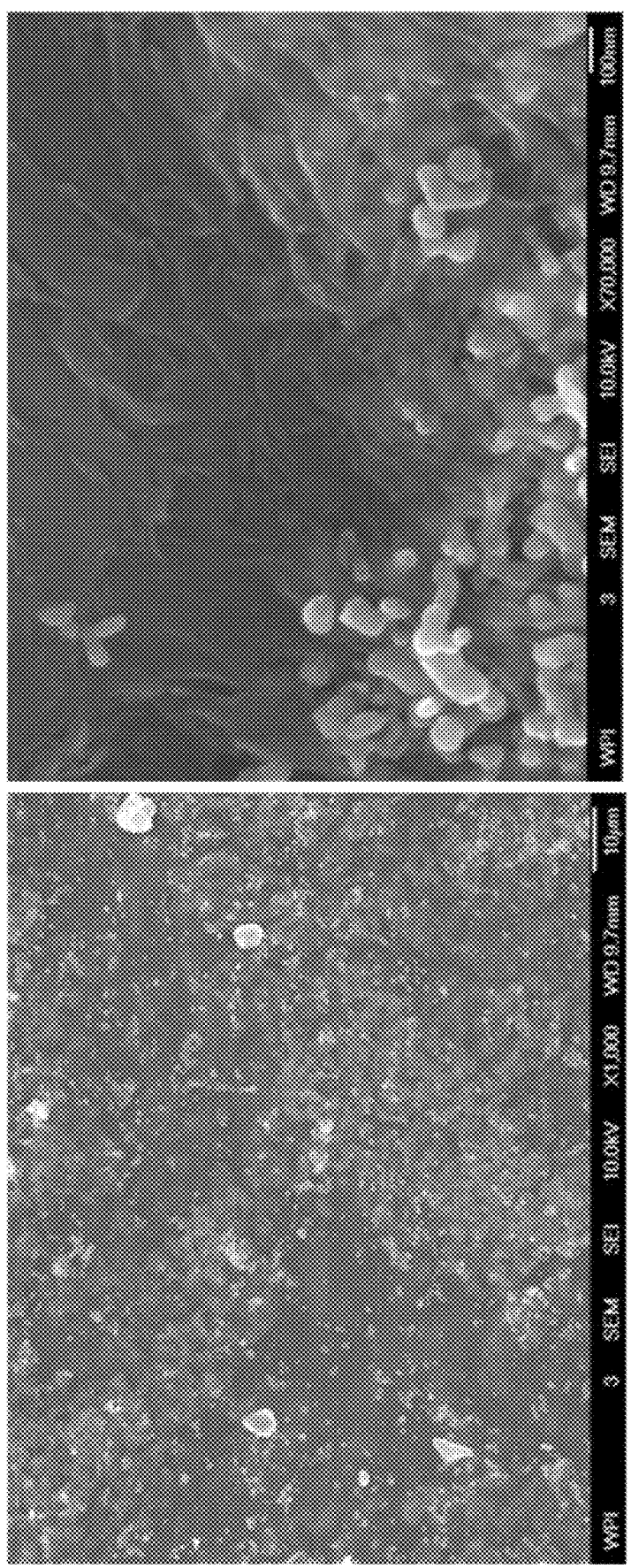
FIG. 11B is an SEM image of a CPI composite with Si loading of 46% Si in the composite.
Figure 11C:
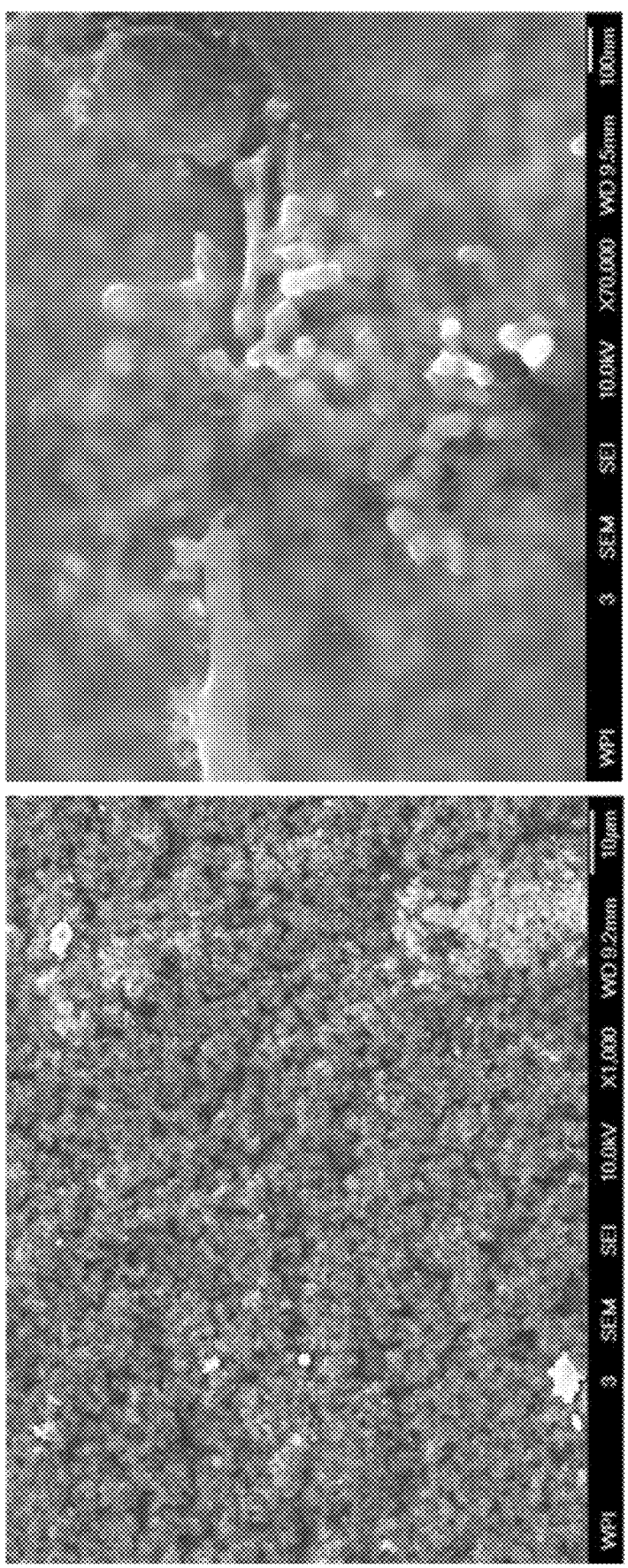
FIG. 11C is an SEM image of a CPI composite with Si loading of 64% Si in the composite.
Figure 12A:
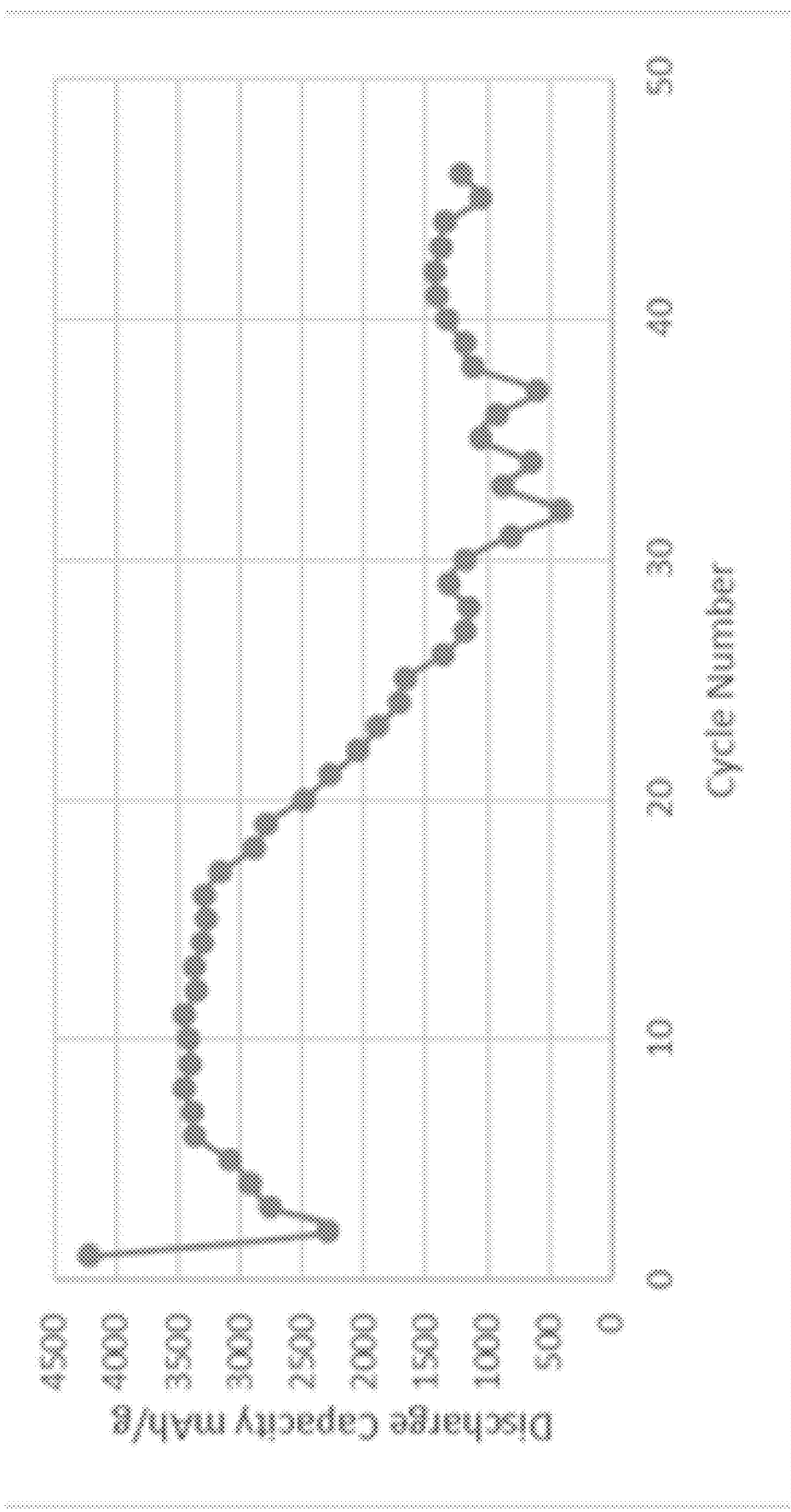
FIG. 12A depicts cycling capacities based on 27% Si content (S27).
Figure 12B:
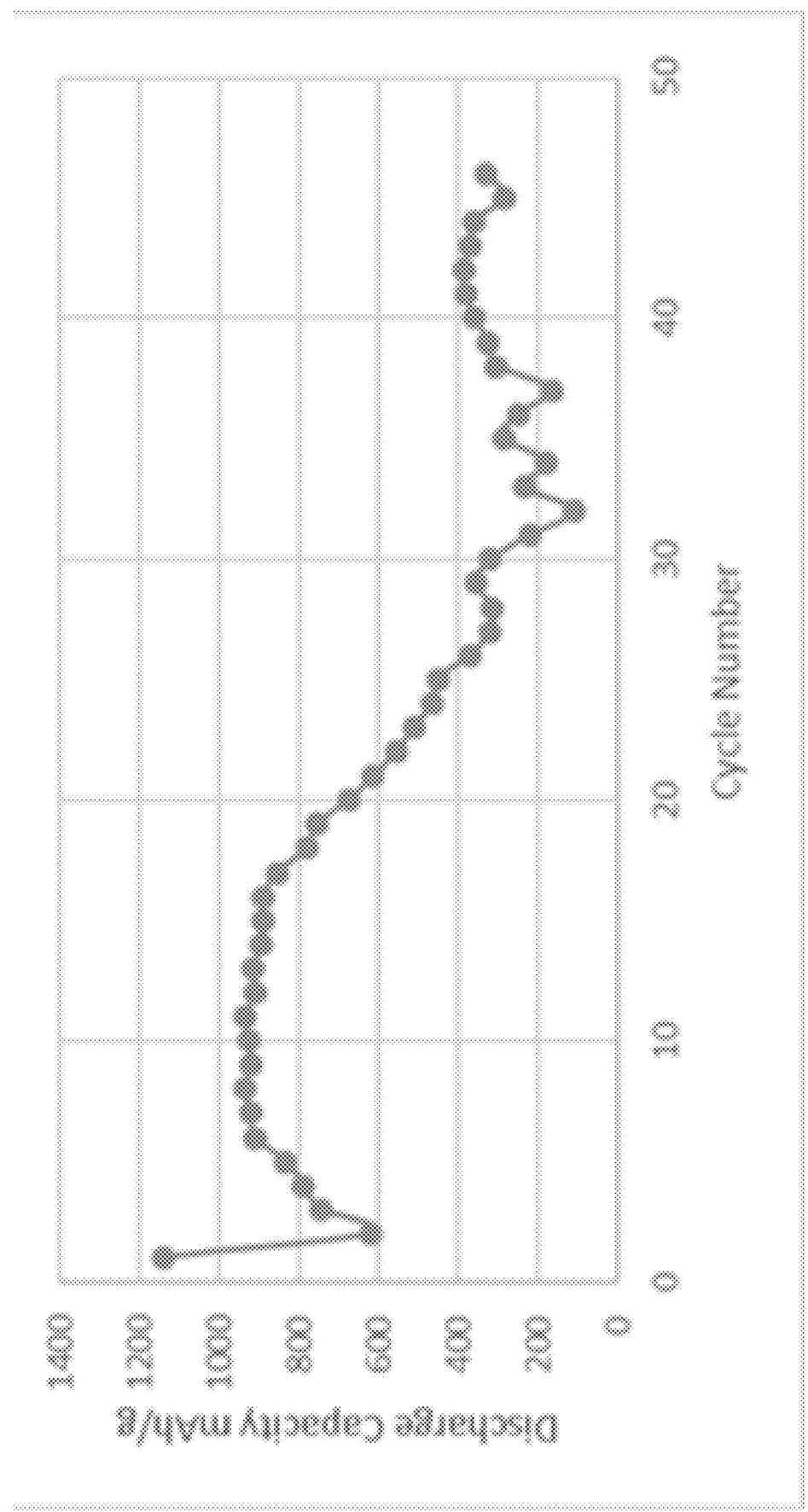
FIG. 12B depicts cycling capacities based on the electrode, as compared to FIG. 12A.
Figure 12C:
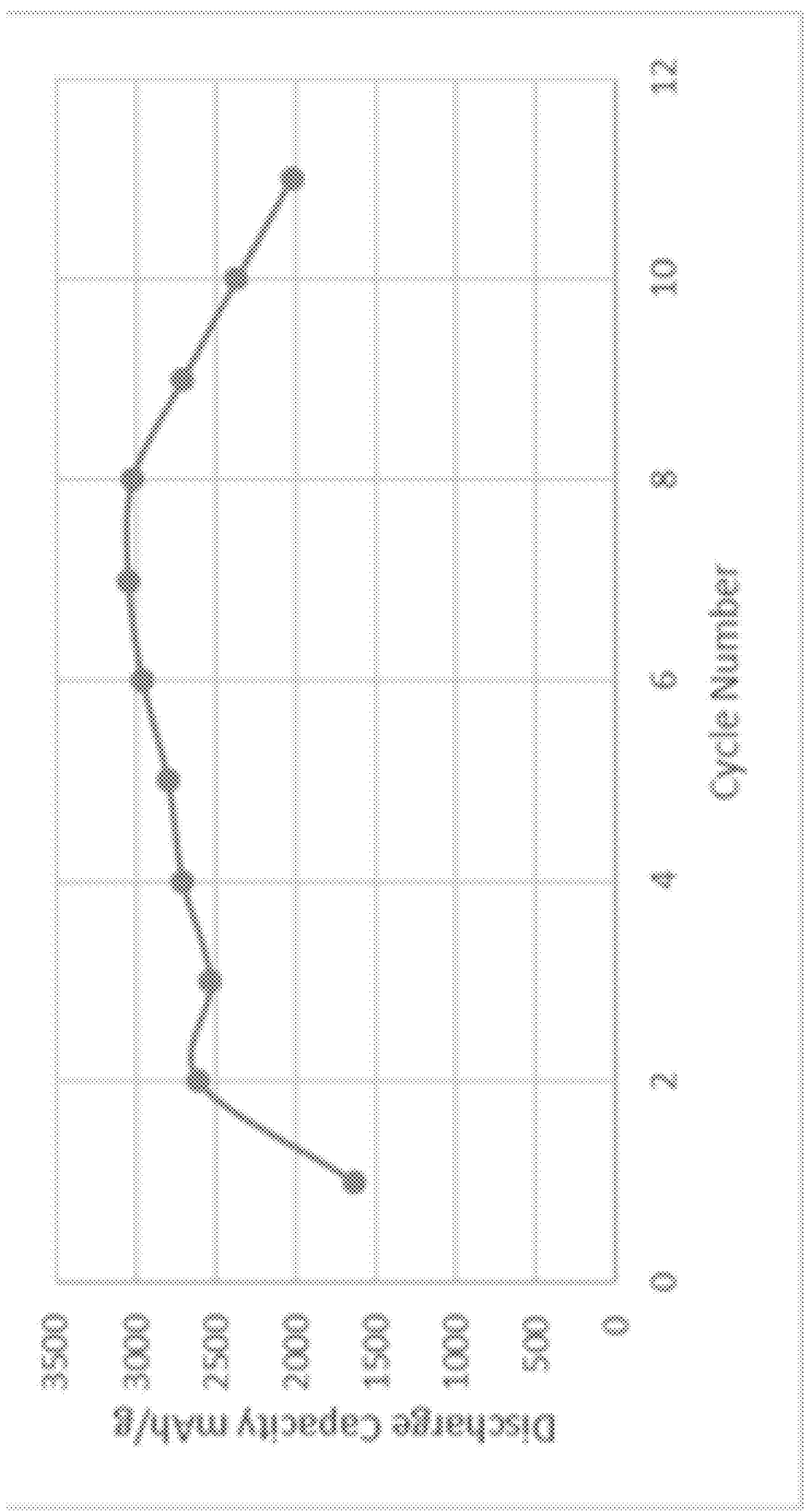
FIG. 12C depicts cycling capacities based on 46% Si content (S46).
Figure 12D:
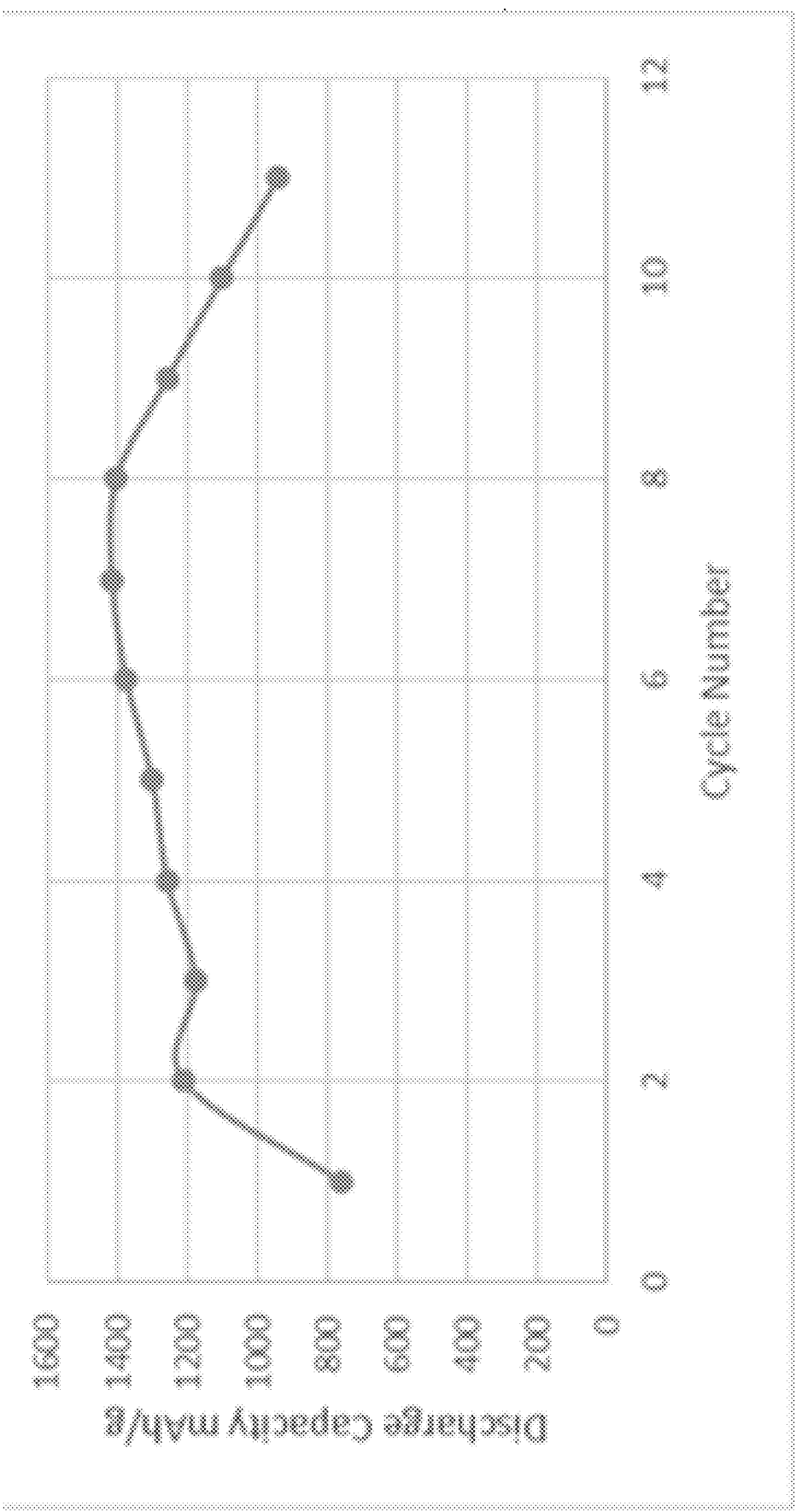
FIG. 12D depicts cycling capacities based on the electrode, as compared to FIG. 12C.
Figure 12E:
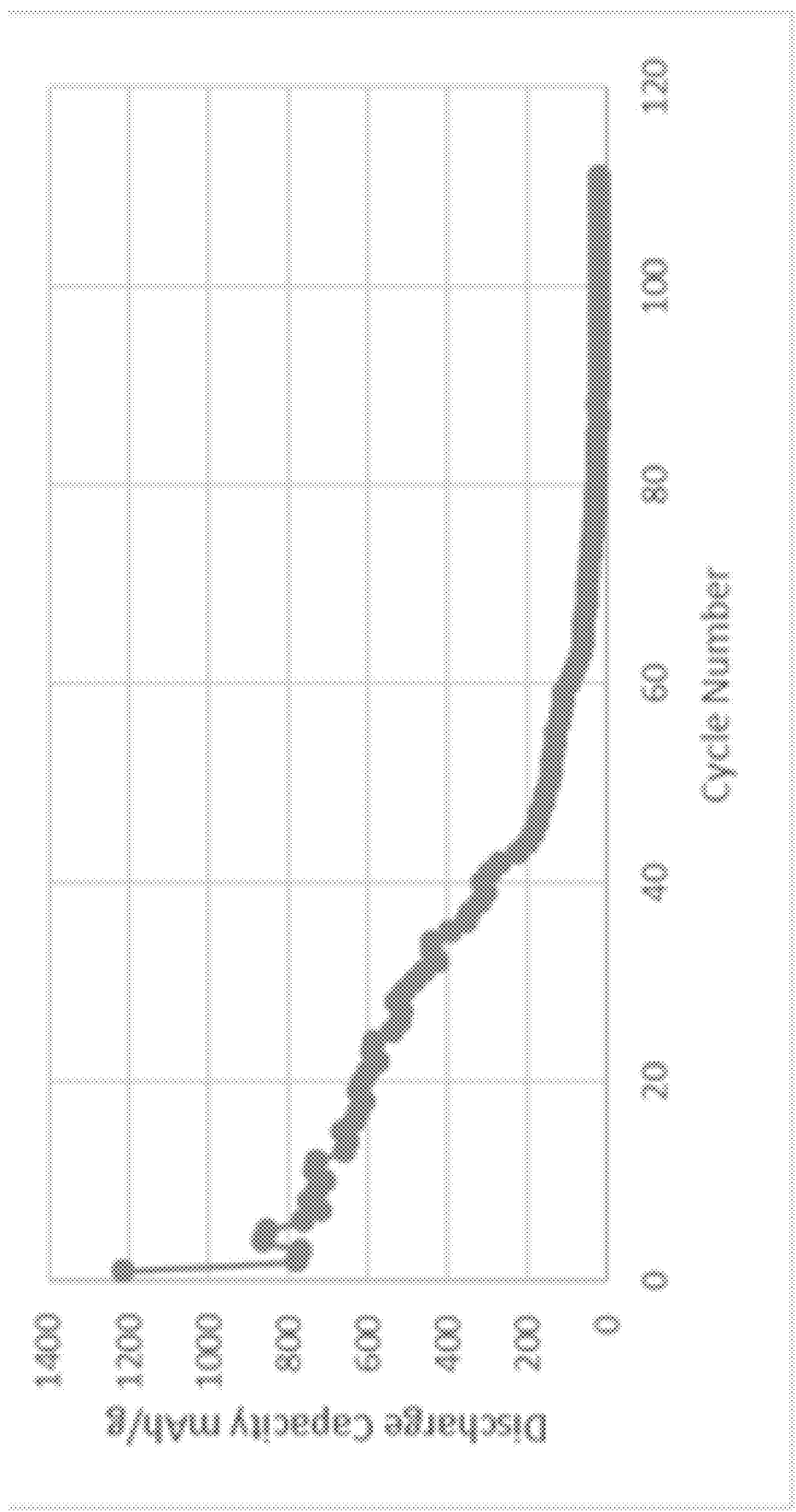
FIG. 12E depicts cycling capacities based on 64% Si content (S64).
Figure 12F:
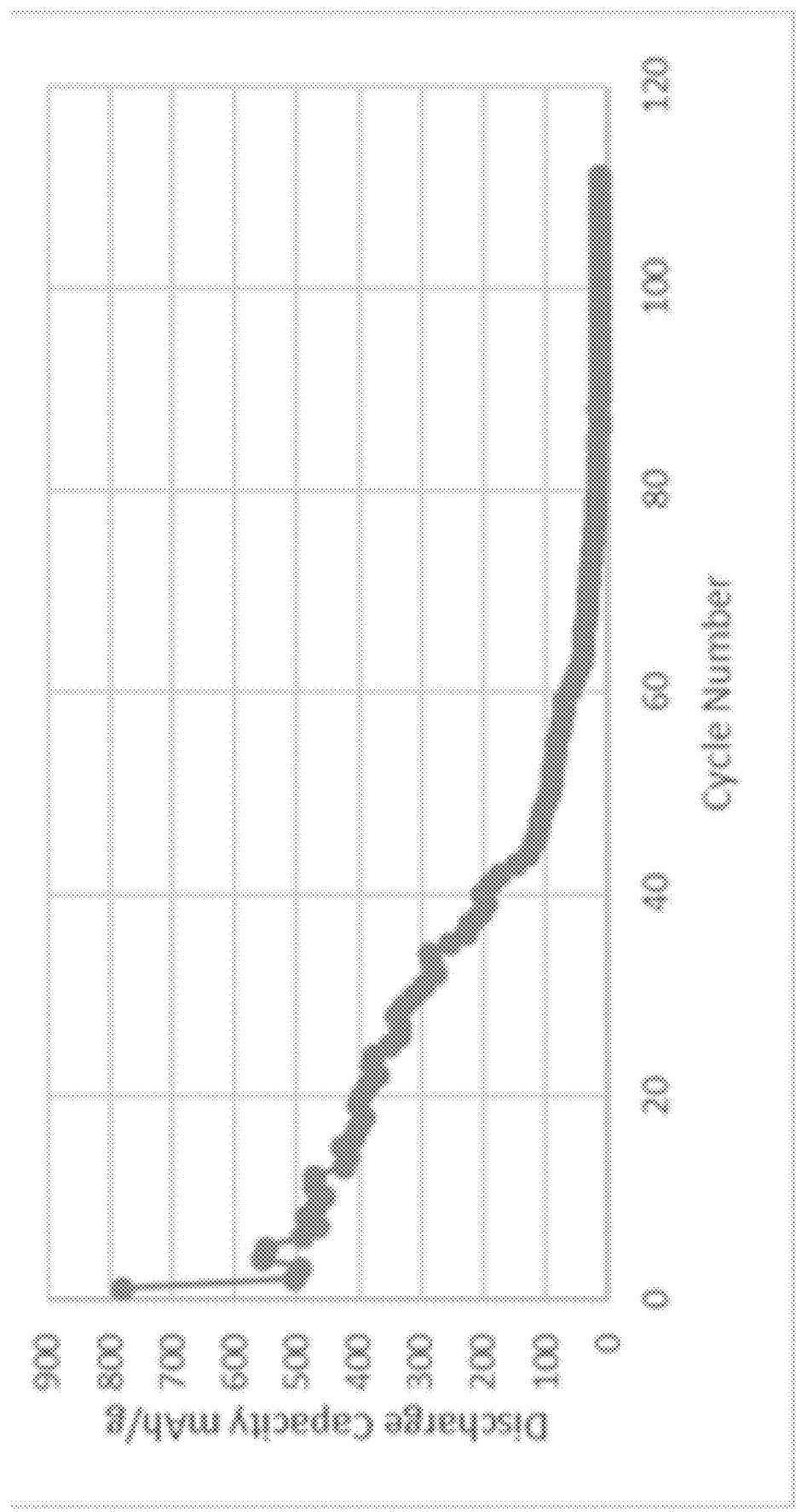
FIG. 12F depicts cycling capacities based on the electrode, as compared to FIG. 12E.
Figure 13A:
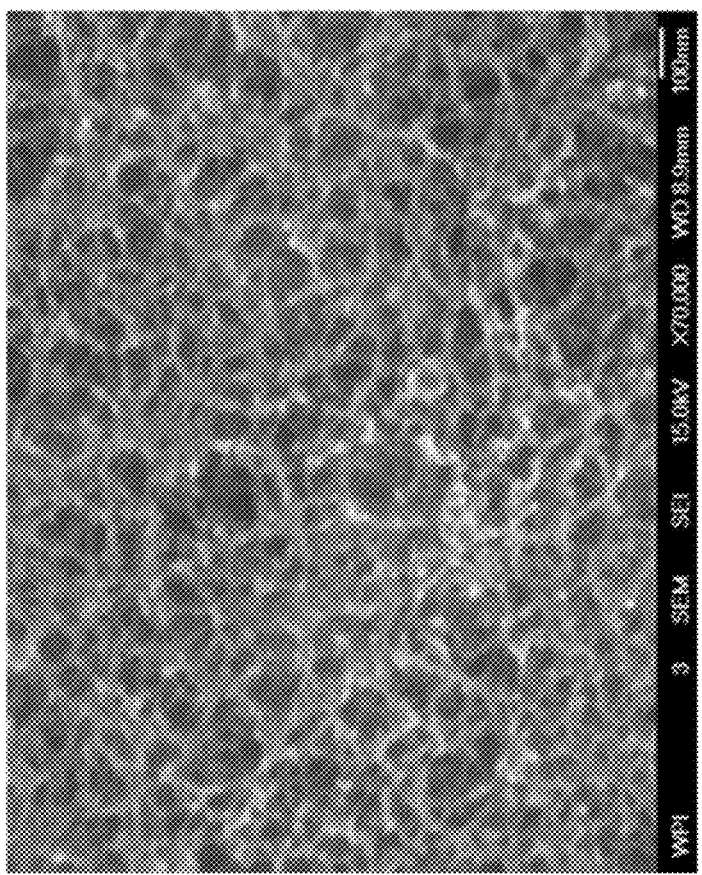
FIG. 13A is SEM images of CPI composites with a thickness of about 337 micrometers.
Figure 13A:
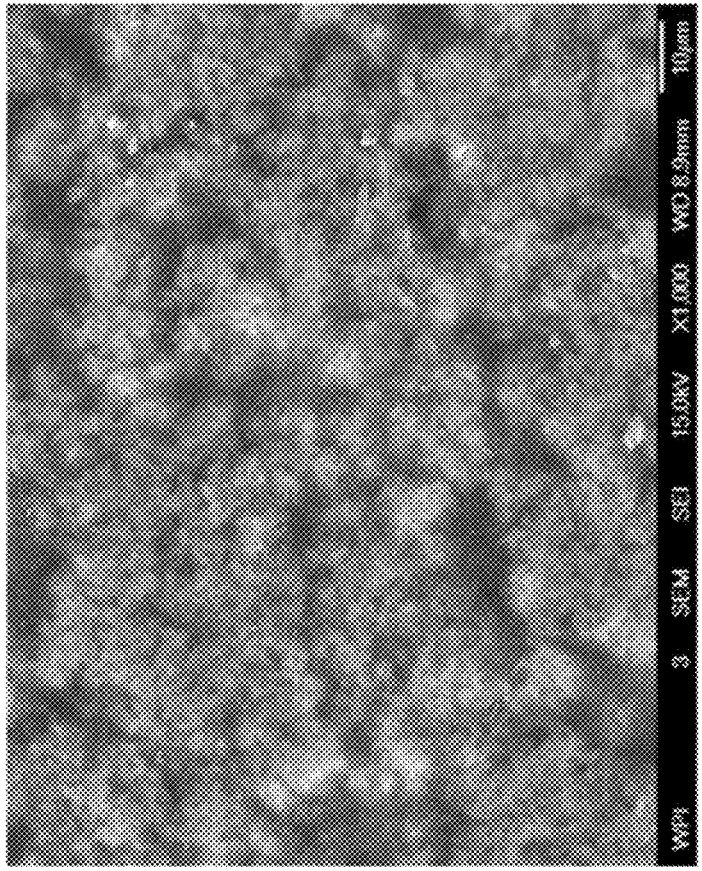
Figure 13B:
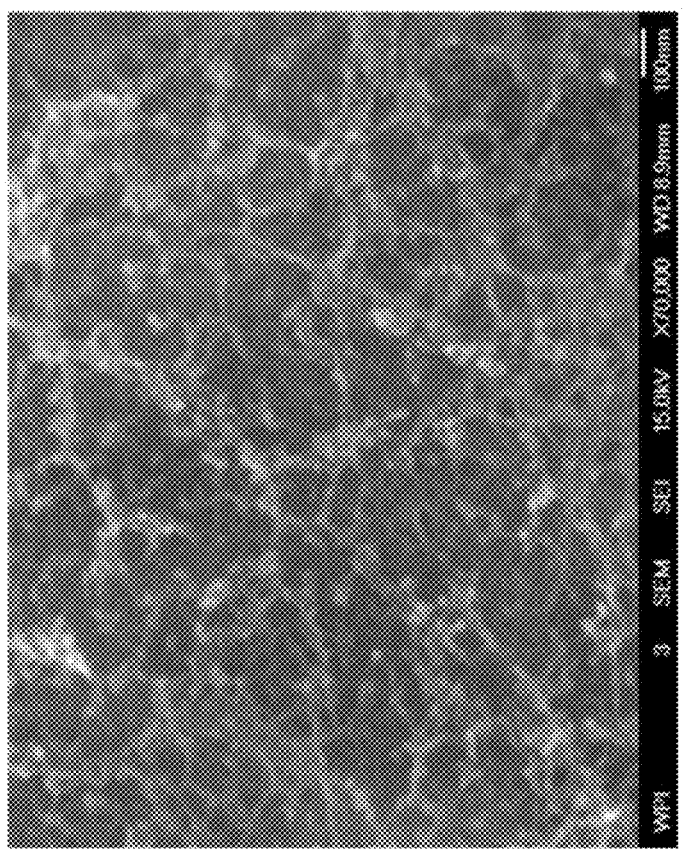
FIG. 13B is SEM images of CPI composites with a thickness of about 180 micrometers.
Figure 13B:
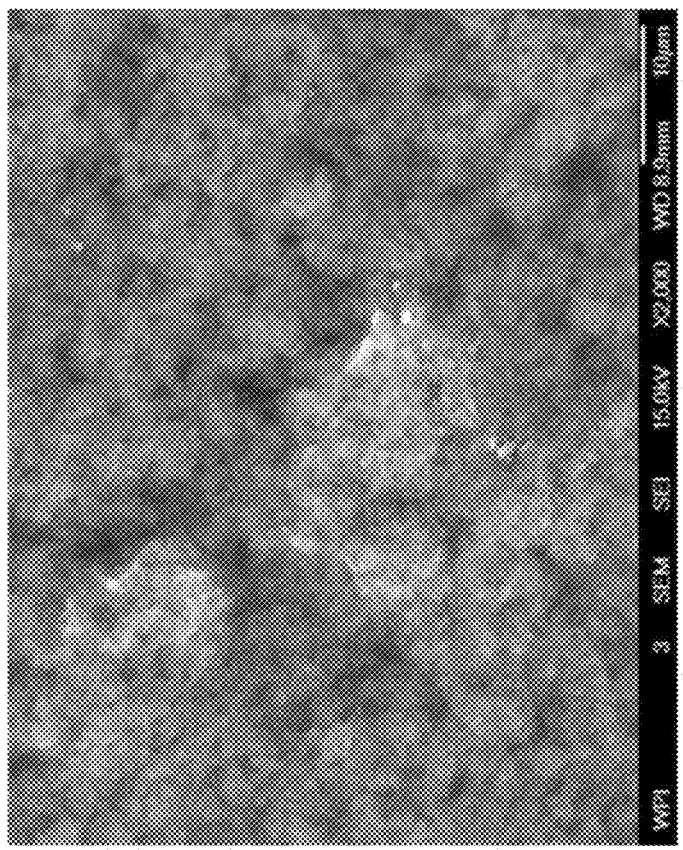

SEM images of the composites doped with high Si content are given in FIGS. 11A-11C, which also show the fibrillar morphology of the composites. The silicon (lighter areas) is more compacted in the samples with higher doping levels. Si nanowires can be observed in all samples at high magnification. As can be seen, there is direct contact and interpenetration of the silicon with the carbon porous structure (darker areas).

The cycling capacities based on the Si and electrode content are shown in FIGS. 12A-12F with the raw data seen in Table 7. Increasing the Si loading of the CPI composites resulted faster decreases of capacity with cycling. With that said, the capacity fading likely is due to the foil electrode used in these half-cell battery tests, such that that electrode was incapable of operating at the high capacity of the silicon-containing electrode.

TABLE 7

Data comparing discharge capacities of silicon (at different concentrations) and the overall electrode.

| Sample | Cycle | Discharge capacity based on Si (mAh/g) | Discharge capacity based on electrode (mAh/g) | Silicon Utilization |
|---|---|---|---|---|
| S27 | 2 | 2296.67 | 622.40 | 54.96% |
| | 10 | 3414.54 | 925.34 | 81.30% |
| | 25 | 1669.11 | 452.33 | 39.74% |
| | 50 | 838.88 | 243.60 | 21.40% |
| S46 | 2 | 2610.44 | 1211.24 | 62.15% |
| | 10 | 2371.09 | 1100.19 | 56.45% |
| | 25 | 876.95 | 406.91 | 20.88% |
| | 50 | 46.36 | 21.51 | 1.10% |
| S64 | 2 | 782.22 | 503.75 | 18.62% |
| | 10 | 710.71 | 457.70 | 16.92% |
| | 25 | 541.96 | 349.02 | 12.90% |
| | 50 | 146.08 | 94.07 | 3.48% |

As can be seen in Table 7, silicon utilization can be calculated to be between about 20% and about 90%, depending on amount of silicon incorporated into the electrode, or even more optimally between about 50% and about 90%. A narrower range is contemplated herein as well, based on benefits needed of the final composite (e.g., amount of silicon desired). In total, this broader range is significantly higher than that seen in the conventional art. In addition, capacity at cycle 10 can be seen to vary based on concentration of silicon, though beneficially can be around 800 mAh/g or more.

Example 3: Silicon Doped CPI Composites of Low PI Solid Contents

A. CPI Doped with 66% Silicon Dispersed in Solvent by Sonication

PI gels were prepared at 0.05 g/cc target density. The PMDA and PDA precursors were mixed at room temperature for 3 hours. Then AA was added and mixed with the solution for 2 hours. Separately, silicon powder of ~30-nm particle size was sonicated for 2 minutes in DMAC solvent, and added to the mixture 30 minutes prior to the addition of pyridine catalyst. Silicon was added at ~60.5% per total solids. Py/PMDA molar ratio was 7.5. The gelation time at ambient temperature was ~5.5 minutes. Composites were cast using spacers of 500-micrometer thickness. After processing and extraction, the PI aerogel composites were compressed and pyrolyzed for 2 hours at 1050° C. for carbonization to form CPI composites. The Si content per CPI was 66%.

Figure 16A:
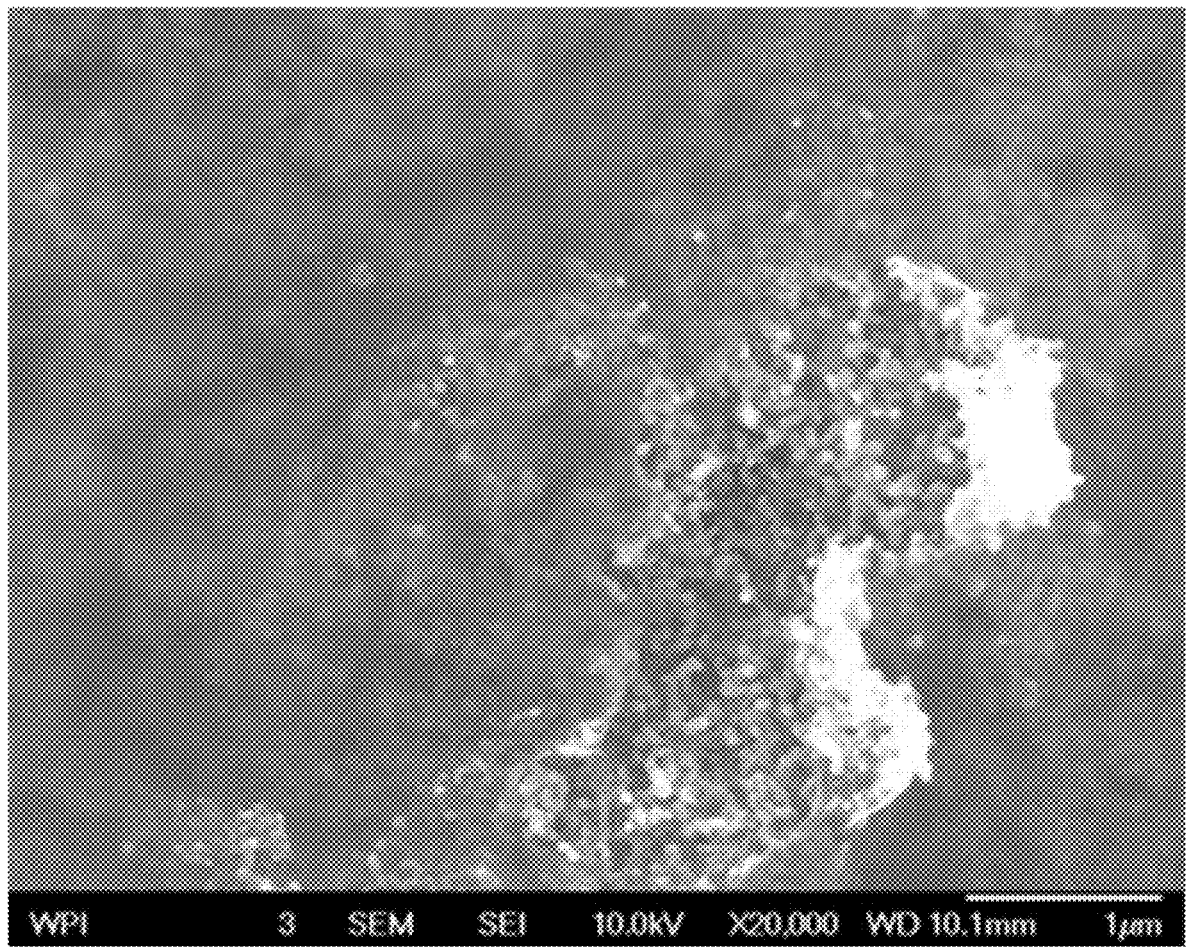
FIG. 16A is an SEM image of a CPI composite prepared without dispersing agent (C45-control).
Figure 16B:
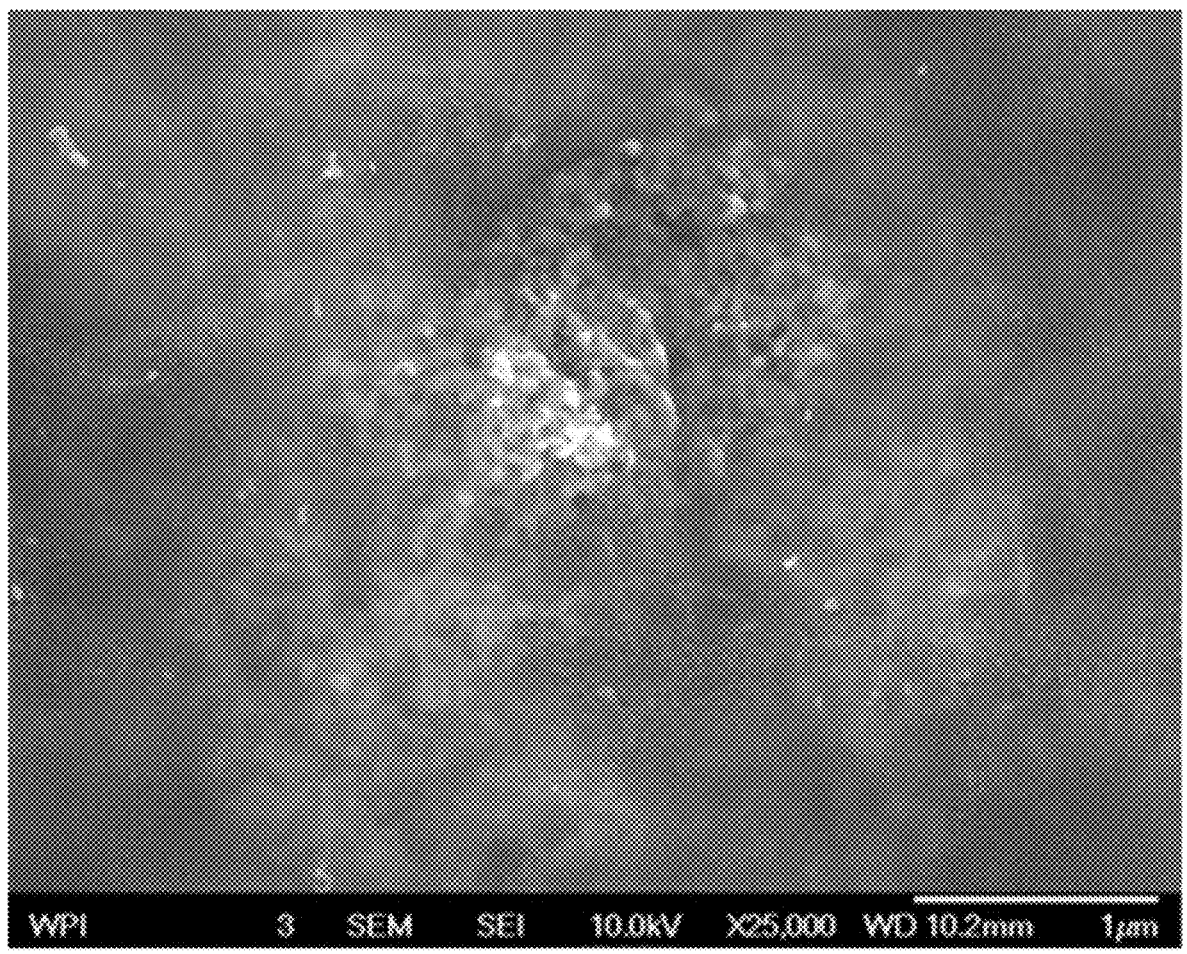
FIG. 16B is an SEM image of a CPI composite prepared with BYK 384 dispersing agent (B45).

CPI composites compressed to different thicknesses were examined by SEM, as shown in FIGS. 16A-16B, which depict the fibrillar morphology of the CPI composites. No silicon nanowires were observed in these images. The properties of the less compressed (LC) and more compressed (MC) composites tested in half-cell batteries are shown in Table 8.

TABLE 8

Properties of CPI composites doped with 66% Si.

| ID | Thickness (μm) | Density (g/cc) | Weight (g) | Length (diameter) (cm) | Width (cm) |
|---|---|---|---|---|---|
| LC | 323 | 0.366 | 0.0202 | 1.340 | 1.275 |
| MC | 170 | 0.628 | 0.0194 | 1.431 | 1.269 |

Figure 14A:
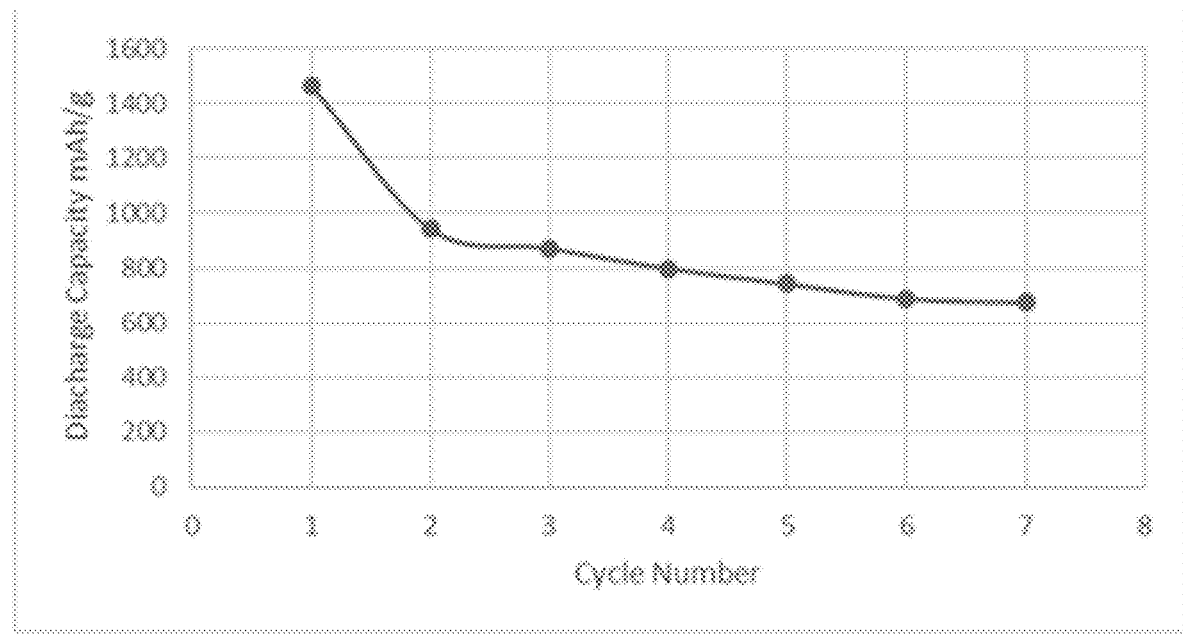
FIG. 14A depicts discharge capacity based on electrode weight (thickness of about 323 m).
Figure 14B:
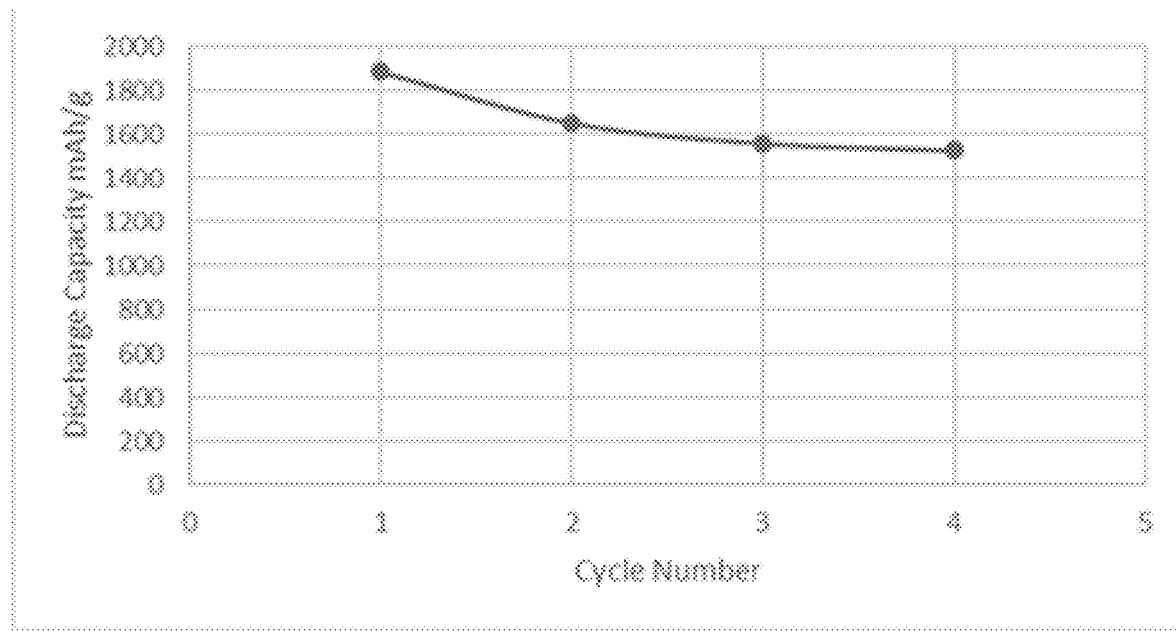
FIG. 14B depicts discharge capacity based on electrode weight (thickness of about 170 m).

FIGS. 14A-14B show that thickness played a role on the performance of the anode. By reducing the thickness by about half, the electrode capacity essentially doubled, and the 170-micrometer thick electrode showed a discharge capacity of over 1500 mAh/g after the 4th cycle. Though these high capacity CPI composites loaded with high amounts of silicon (66%) were not stable over multiple cycles, the capacity fading likely is due to the foil electrode used in these half-cell battery tests, such that that electrode was incapable of operating at the high capacity of the silicon-containing electrode.

B. CPI Doped with 45% Silicon Dispersed by Mixing in Solvent with and without Dispersing Agents PI gels were prepared at 0.05 g/cc target density. The PMDA and PDA precursors were mixed at room temperature for 17 hours. Then AA was added and mixed with the solution for 3 hours. Separately, silicon powder of 30 nm particle size was mixed for 20 hours in DMAC solvent with or without dispersing agents. The control C45 sample was prepared in the absence of dispersing agents. BYK 384 was used as dispersing agent in sample B45 at 20% weight per weight of Si. Pluronic F87 was used as nonionic surfactant in sample P45 at 20% weight per weight of Si. The dispersions were added to the mixture 30 minutes prior to the addition of pyridine catalyst. Silicon was added at 27.3% per total solids. Py/PMDA molar ratio was 7.0. The gelation time at ambient temperature was about 11 minutes. Composites were cast using spacers of 500-micrometer thickness. After processing and extraction, the PI aerogel composites were compressed, and pyrolyzed for 2 hours at 1050° C. for carbonization to form CPI composites. The Si content per CPI was about 45%.

Figure 15A:
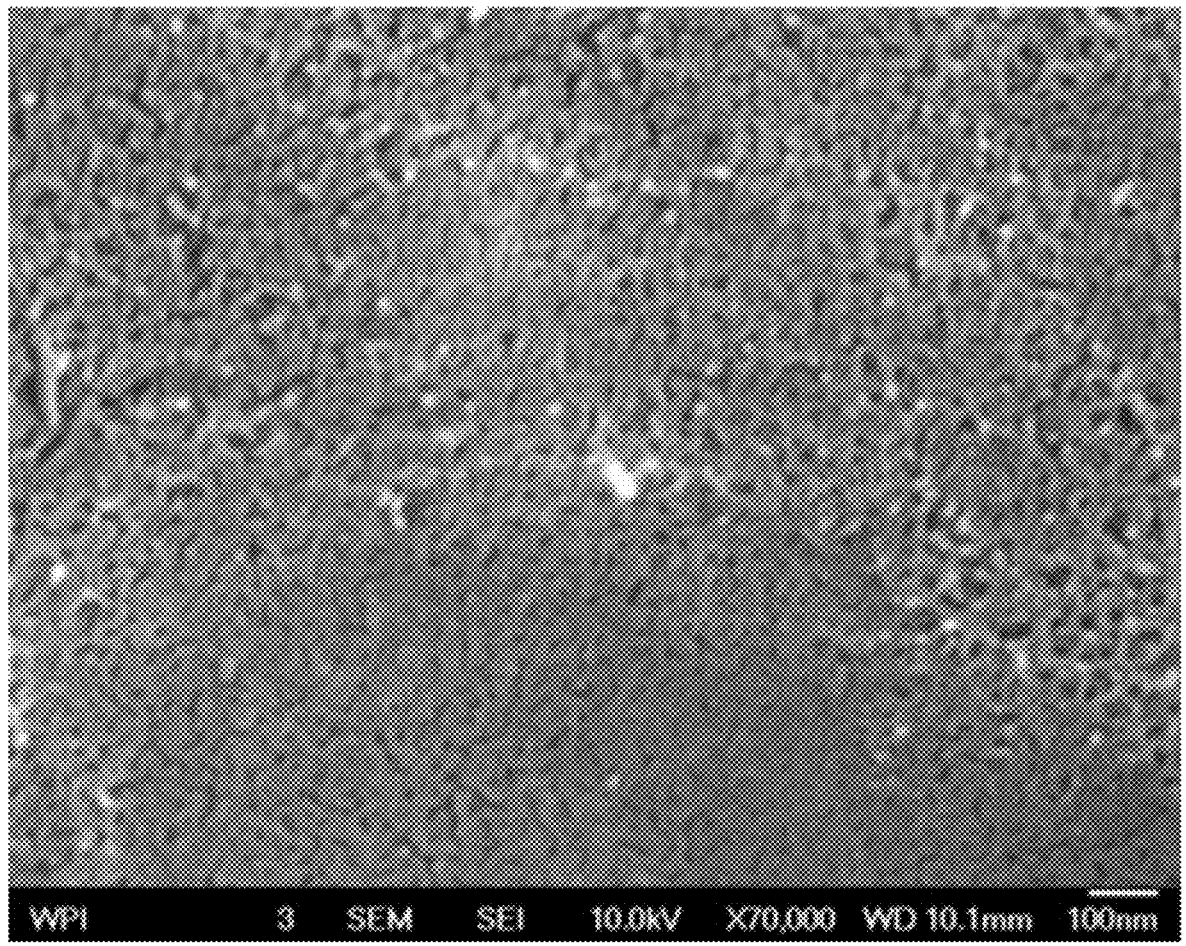
FIG. 15A is a pre-pyrolysis SEM image of a CPI composite prepared without dispersing agent (C45).
Figure 15B:
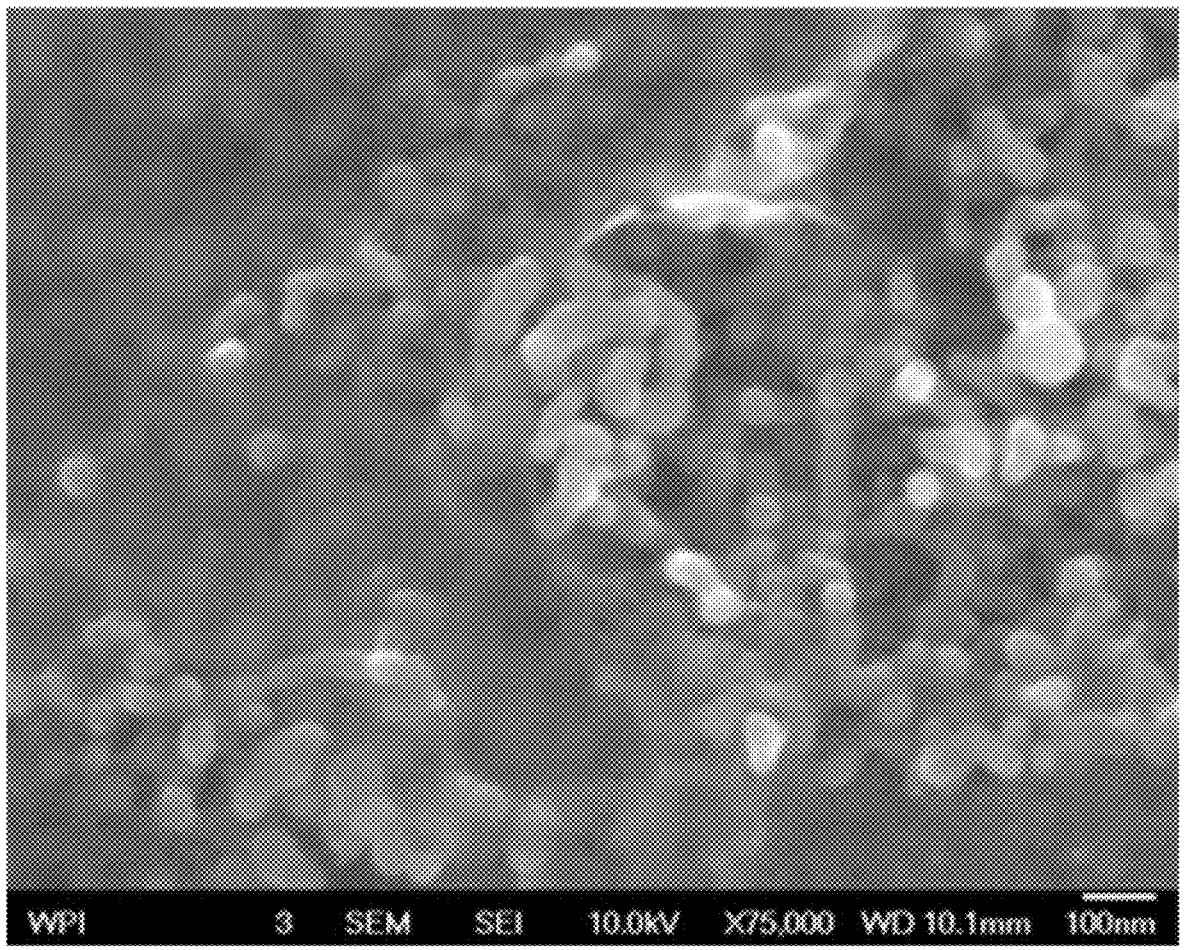
FIG. 15B is an SEM image of the composite of FIG. 15A after pyrolysis.
Figure 16C:
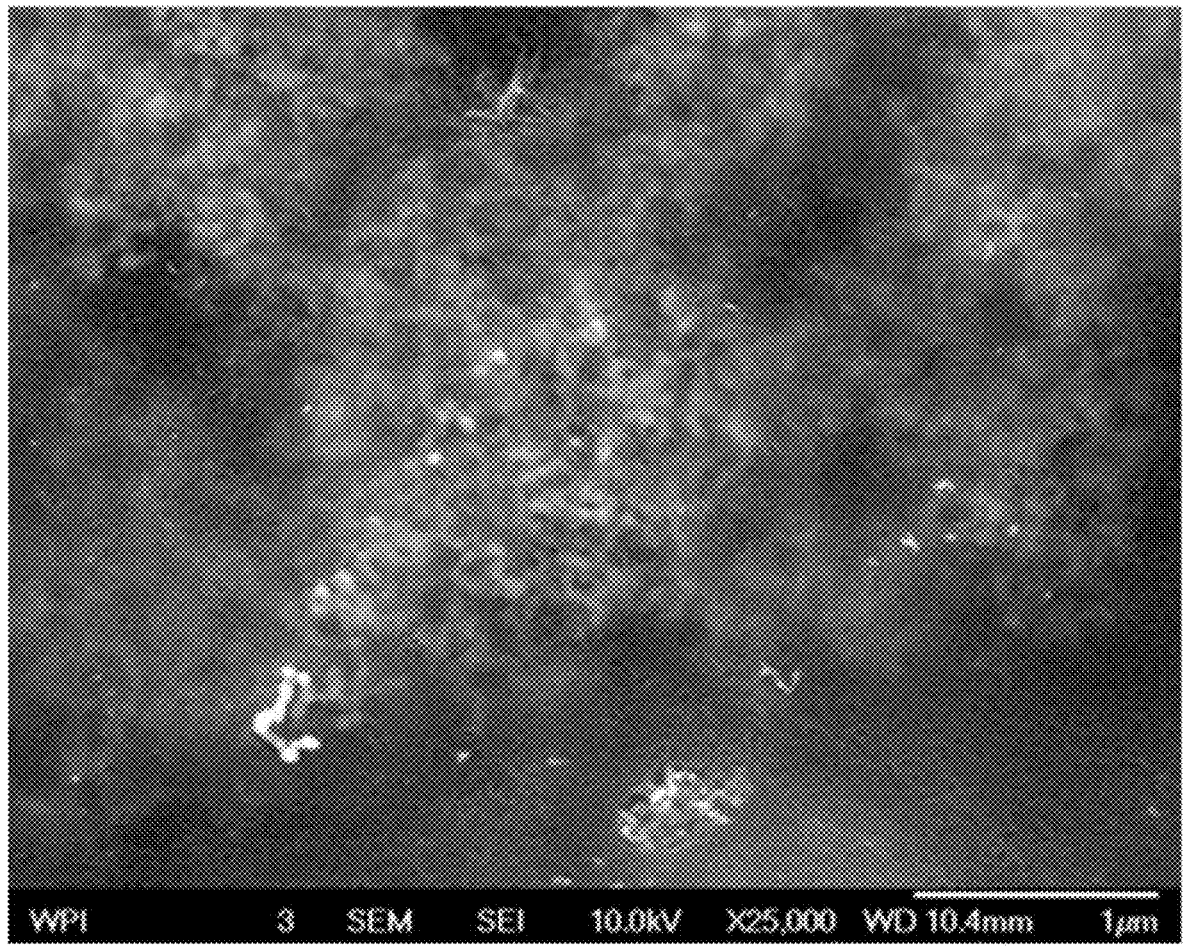
FIG. 16C is an SEM image of a CPI composite prepared with Pluronic F87 dispersing agent (P45).

SEM images of the compressed C45 polyimide composite before and after pyrolysis are shown in FIGS. 15A-15B, where FIG. 15B also shows the fibrillar morphology of the CPI composite. Si nanowires were not visible in the non-pyrolyzed composite, only in the CPI. SEM images of the CPI composites with and without dispersing agents are shown in FIGS. 16A-16C. The properties of the CPI composites submitted for battery testing are shown in Table 9. Conductivities of ~26-27 S/cm were obtained for these samples.

TABLE 9

CPI composites prepared with and without dispersing agent for battery testing.

| ID | Thickness (μm) | Density (g/cc) | Conductivity (S/cm) | Silicon Utilization Cycle 10 |
|---|---|---|---|---|
| C45 | 75 | 0.597 | 27.0 ± 0.2 | — |
| B45 | 95 | 0.584 | 26.8 ± 1.0 | 69.66% |
| P45 | 90 | 0.512 | 26.0 ± 7.1 | 78.71% |

Figure 17A:
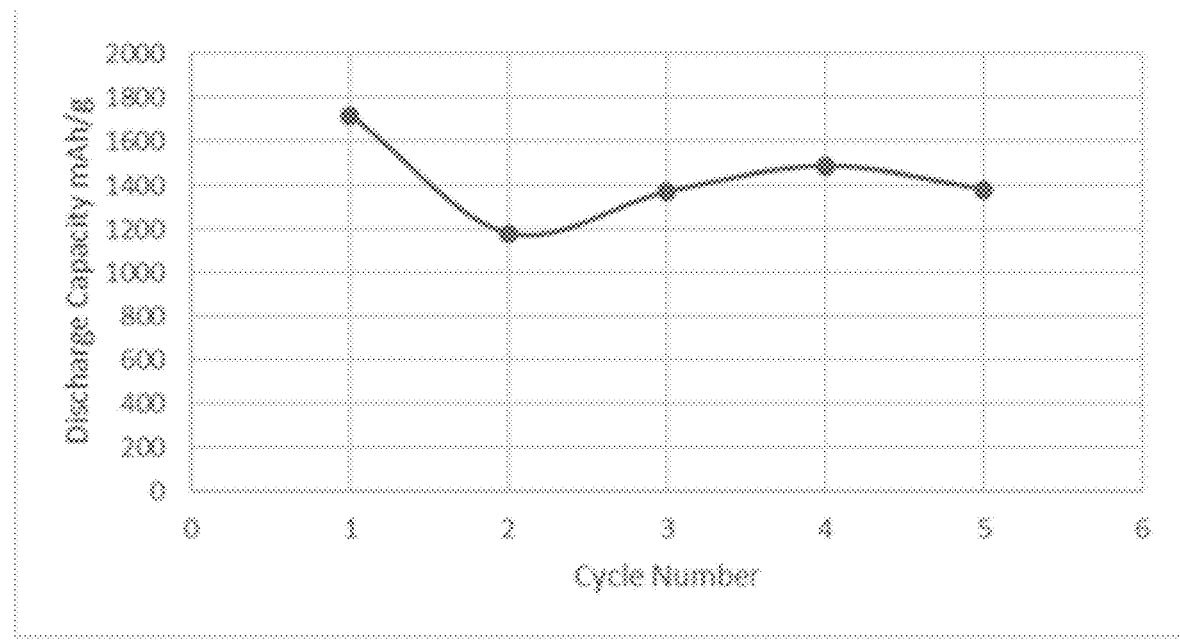
FIG. 17A depicts discharge capacity of C45 composite of FIG. 16A.
Figure 17B:
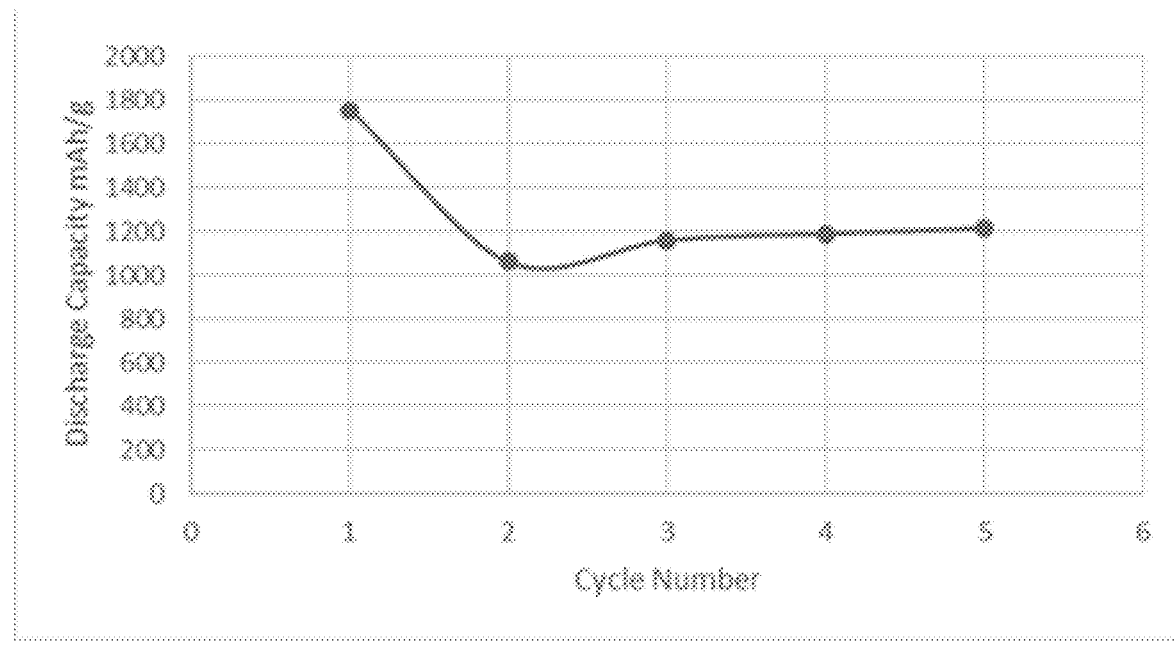
FIG. 17B depicts discharge capacity of B45 composite of FIG. 16B.
Figure 17C:
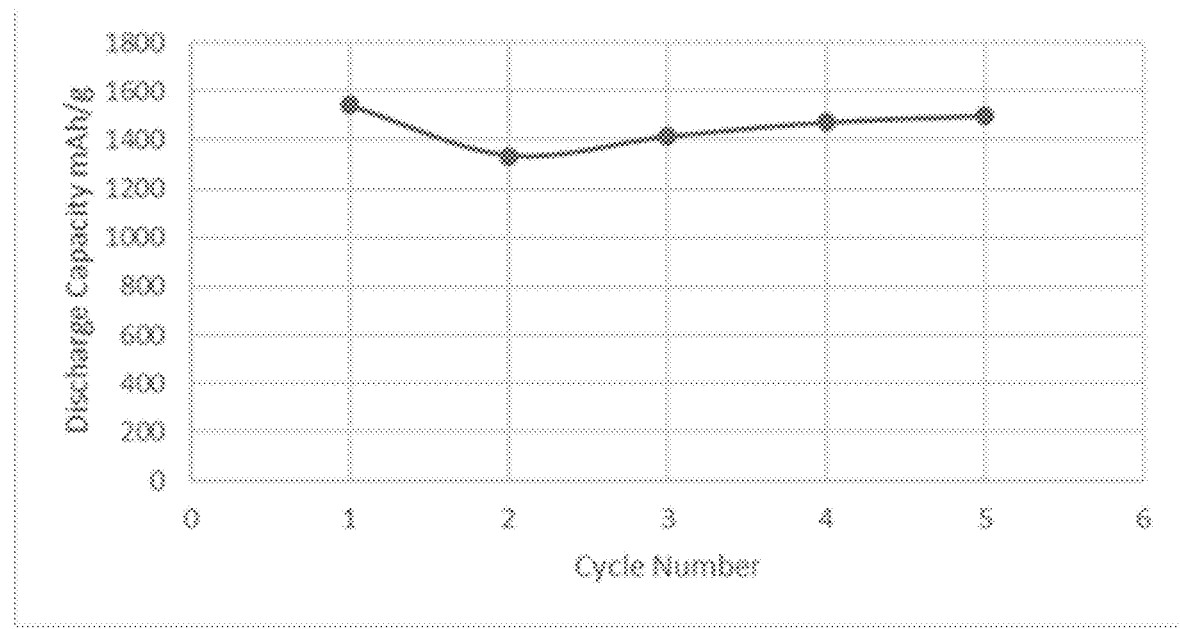
FIG. 17C depicts discharge capacity of P45 composite of FIG. 16C.

The half-cell battery test results showed that the P45 composite had higher discharge capacity and lower irreversible capacity loss compared to the other two samples (FIGS. 17A-17C). Also, the capacity fading likely is due to the foil electrode used in these half-cell battery tests, such that that electrode was incapable of operating at the high capacity of the silicon-containing electrode.

Composites of P45 formulation were cast at three (3) thicknesses: 780, 580, and 370 microns. Each of these PI batches was sectioned in pieces of about 0.5×0.5 square inch composites, which were compressed at three (3) different levels using a hydraulic press and then pyrolyzed. The results are shown in Table 10 and FIG. 18.

TABLE 10

Properties of the P45 CPI composites compressed at different levels.

| Initial PI thickness (μm) | Final CPI thickness (μm) | Density CPI composite (g/cc) | Porosity (%) |
|---|---|---|---|
| 780 | 70 | 0.960 | 56.4 |
| 780 | 100 | 0.625 | 71.6 |
| 780 | 115 | 0.596 | 72.9 |
| 580 | 70 | 0.740 | 66.4 |
| 580 | 80 | 0.660 | 70.0 |
| 580 | 120 | 0.479 | 78.2 |
| 370 | 50 | 0.664 | 69.8 |
| 370 | 100 | 0.400 | 81.8 |
| 370 | 130 | 0.315 | 85.7 |

Figure 18:
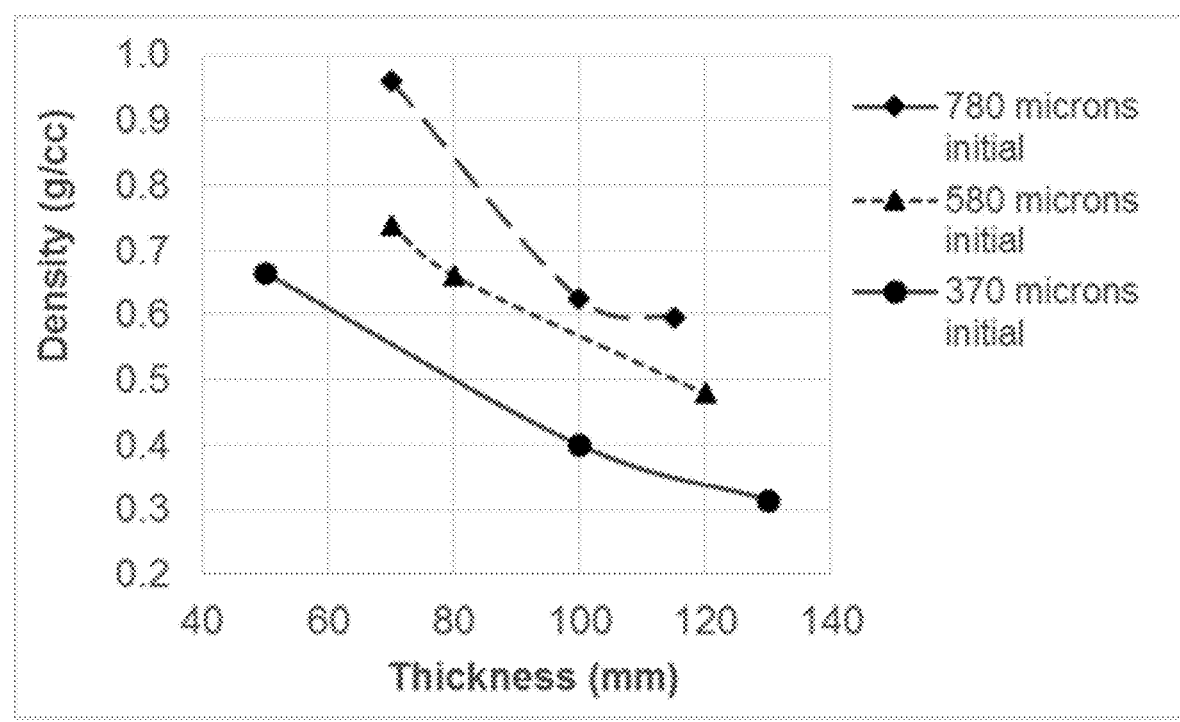
FIG. 18 depicts density as a function of thickness for the P45 CPI composites.
Figure 19:
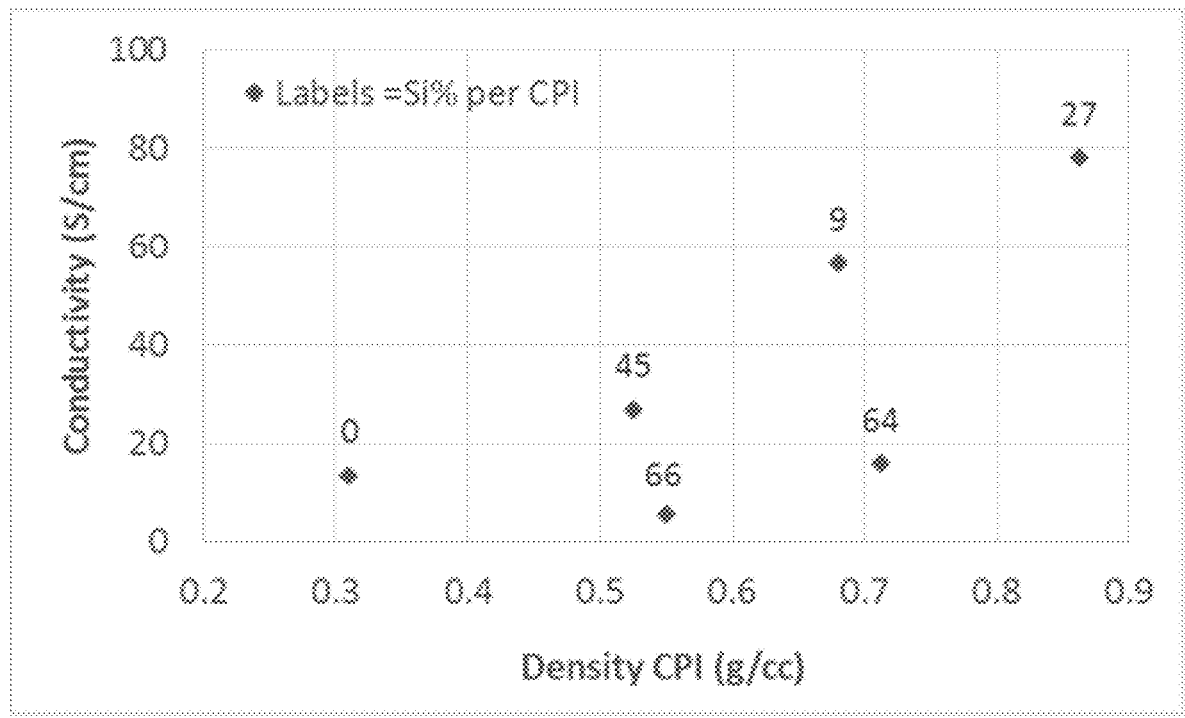
FIG. 19 depicts conductivities of CPI composites doped with various Si levels, as a function of the densities.

The densities of the Si doped CPI composites varied between 0.3 and 1.0 g/cc at thicknesses between ~50-130 micrometers (FIG. 18). The densities increased with increasing initial thickness of the PI composite. Porosities ranged between ~50-90%.

Electrical conductivities of silicon doped CPI composites. The conductivities of CPI composites pyrolyzed at 1050° C. doped with various levels of silicon were determined using a Keithley 4-point probe apparatus. The conductivities of the samples varied in the ~5-80 S/cm range (Table 11). The electrical conductivity of the non-doped carbon composite was about to be ~13.6 S/cm, which is in the expected range for amorphous carbon, as is known in the art. While the reported electrical conductivity of silicon is $1.6 \times 10^{-5}$ S/cm, silicon nanowires can exhibit conductivities three (3) orders of magnitude higher (0.03 S/cm) (Sabar D. Hutagalung, Mohammed M. Fadhali, Raed A. Areshi and Fui D. Tan, Optical and Electrical Characteristics of Silicon Nanowires Prepared by Electroless Etching, Nanoscale Research Letters, 2017, 12:425).

TABLE 11

Densities and electrical conductivities of CPI composites with various Si concentrations.

| Si per CPI % | Target density (g/cc) | Density (g/cc) | Conductivity (S/cm) |
|---|---|---|---|
| 0 | 0.075 | 0.310 | 13.6 |
| 9 | 0.100 | 0.680 | 56.8 |
| 27 | 0.100 | 0.862 | 78.1 |
| 45 | 0.050 | 0.525 | 26.9 |
| 64 | 0.080 | 0.550 | 15.9 |
| 66 | 0.050 | 0.712 | 5.5 |

Generally, the electrical conductivities increased with increasing densities. At silicon concentrations over 60%, however, the conductivities were lower than expected (FIG.

19). At this high silicon content, the connectivity of the carbon network was disrupted, which resulted in a decrease of the conductivity. The sample doped with 27% wt Si per CPI showed the highest conductivity, suggesting an optimum dispersion of silicon for purposes of high electrical conductivity. A broader optimal range can be seen to be between about 5% and about 80% wt Si per CPI, or more particularly between about 5% and 50% wt Si per CPI. It can be seen in Table 9 and Table 11 that changing the silicon content can adjust electrical conductivity up to about 80 S/cm. It is thus contemplated that electrical conductivity can be above about 5 S/cm, 10 S/cm, 15 S/cm, 25 S/cm, 50 S/cm, and 75 S/cm, where the broader range and a more precise conductivity is adjustable based on silicon content.

Figure 20:
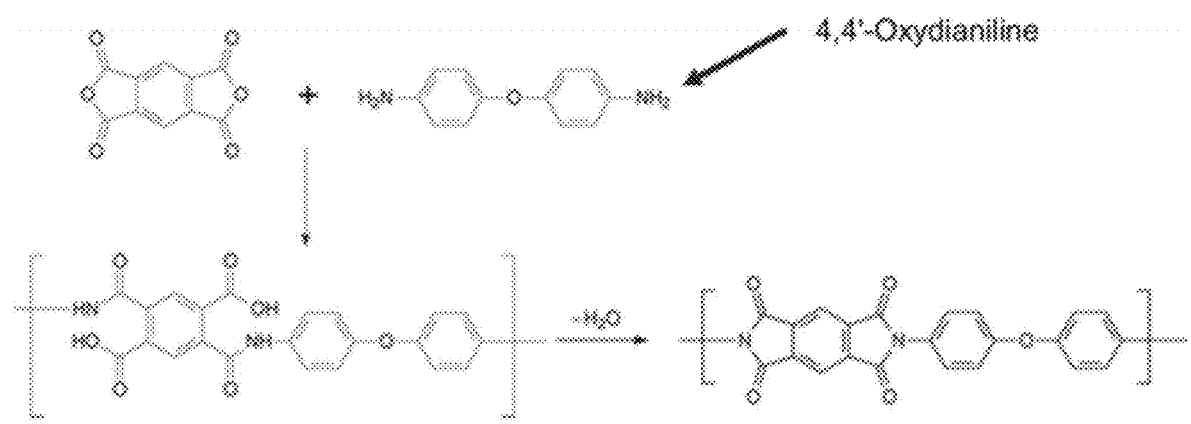
FIG. 20 is a schematic depicting polyamic acid formation.
Figure 21:
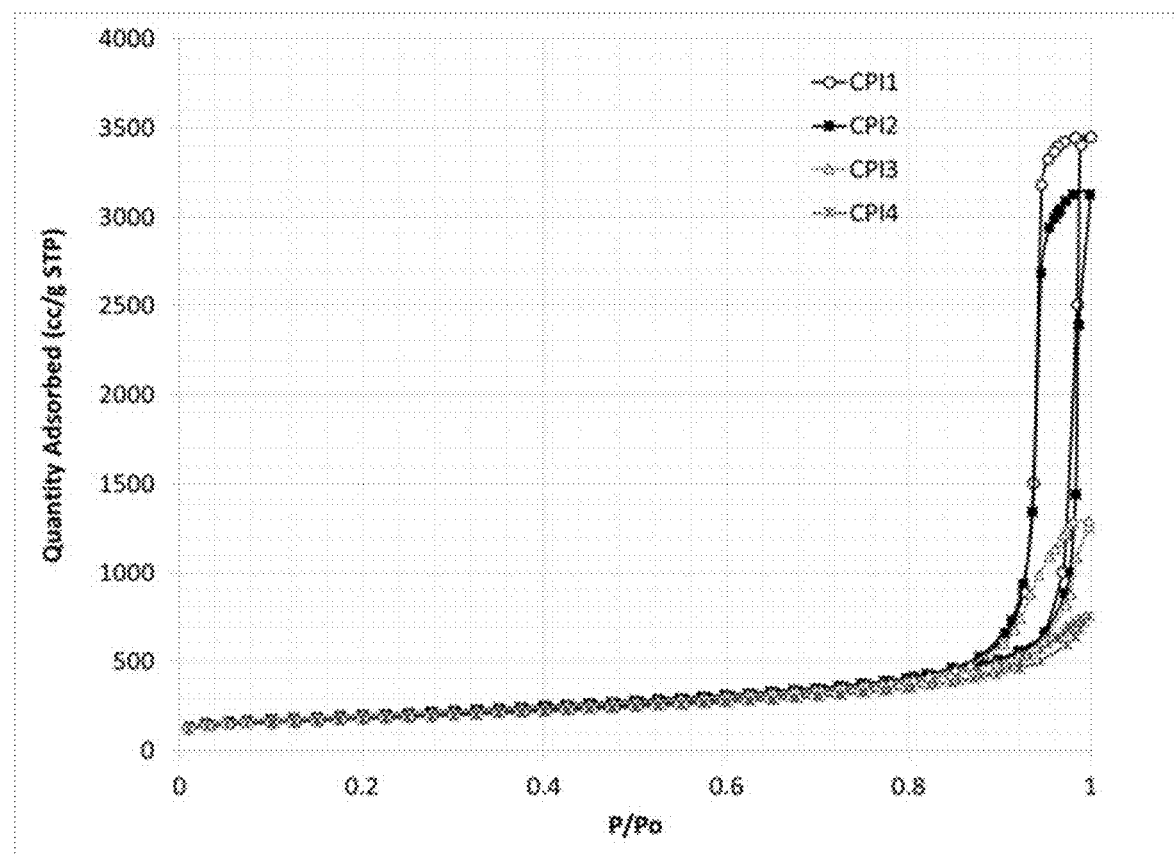
FIG. 21 depicts isotherms of four (4) CPI samples.
Figure 22:
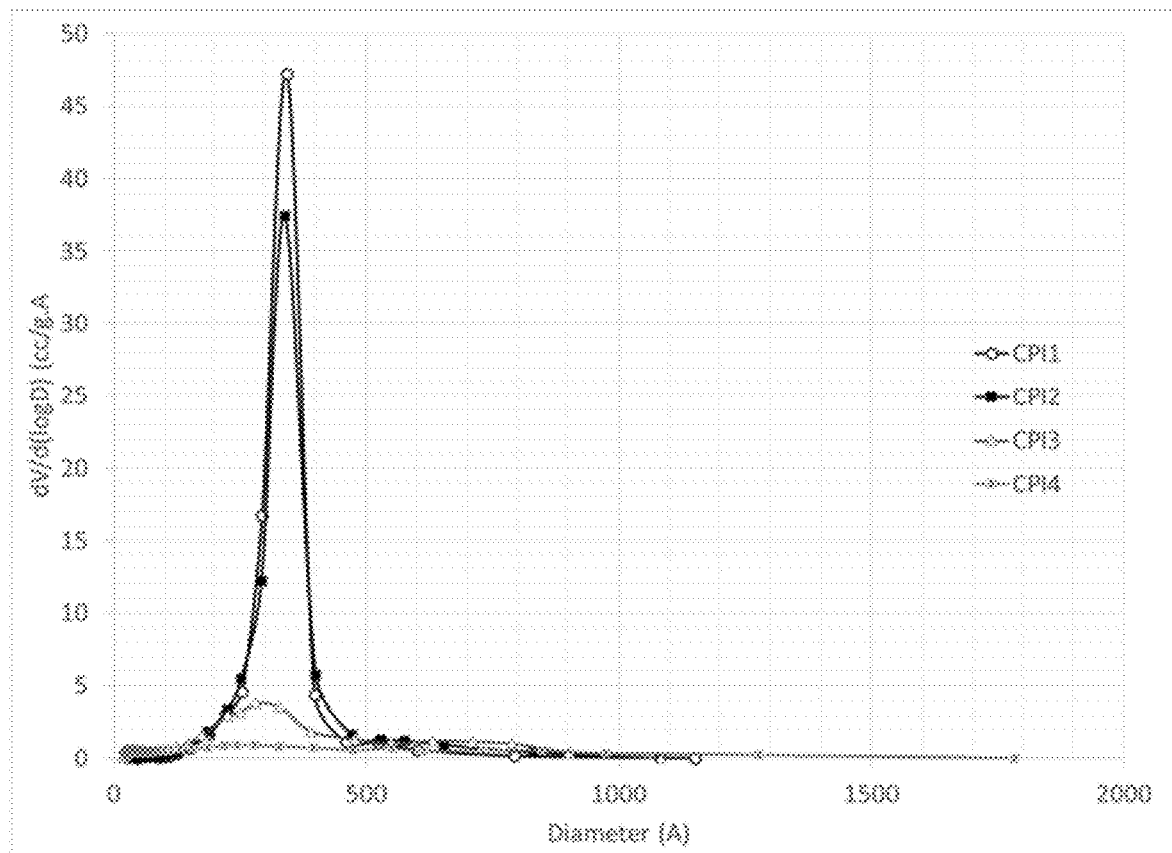
FIG. 22 depicts pore size distributions of the CPI samples of FIG. 21.

Example 4: Carbonized Polyimide Aerogel with High Pore Volume and Narrow Pore Size Distribution PI gels are prepared by reacting 6 g of PMDA with 3 g of PDA to form polyamic acid in 100 mL of DMAC at room temperature for 2-24 hrs. Subsequently, 8.86 g of AA is added as chemical imidization reagent to the polyamic acid solution (see FIG. 20). The acidified polyamic solution is mixed vigorously for at least 2 hrs. The obtained mixture is diluted with DMAC to the desired target density of the PI aerogel. 1-4 g of Py per 100 mL of mixture is added to the final solution to promote gelation, which occurs in 4-25 min. Prior to gelation, the mixture is casted in desired form (e.g., film, monolith, in reinforced fiber, etc.). The gels obtained are then aged in the oven at 65-70° C. and washed/rinsed with ethanol several times prior supercritical drying. The PI aerogel is converted into carbon aerogel by pyrolysis at 1050° C. for 2 hrs in inert environment (nitrogen gas flow). Without being bound by theory, the physical and structural properties of the carbonized PI aerogel depend on the precursors mixing time and the amount of Py.

Structural properties of four CPI aerogels tested by nitrogen adsorption desorption technique are reported in Table 12. The four samples differ by time mixing and amount of Py. Target density was fixed at 0.05 g/cc. Interestingly, all the samples show relatively similar surface BET, but pore size distribution and pore volume appear to be affected by the parameters of synthesis.

TABLE 12

Physical and structural properties of different CPI aerogels.

| Sample ID | Final density (g/cc) | Mixing time [1] (hrs) | Pyridine concentration [2] | Surface area ($m^2/g$) | Micropore area ($m^2/g$) | Pore volume ($cm^3/g$) |
|---|---|---|---|---|---|---|
| CPI1 | 0.09 | 24 | 1 | 655 | 105 | 5.34 |
| CPI2 | 0.09 | 24 | 2 | 696 | 122 | 4.84 |
| CPI3 | 0.09 | 2 | 1 | 682 | 134 | 1.99 |
| CPI4 | 0.09 | 2 | 2 | 612 | 114 | 1.15 |

[1] mixing time of the two precursors.
[2] amount of pyridine added for gelation (g/100 mL of solution)

Example 5: Carbonized Polyimide Aerogel Loaded with Si

Si particles (30 nm) were added to the polyamic acid solution at different concentrations. Synthesis of the solution is the same as the one described in Example 4. However, in the present composite system (PI/Si), silicon particles were first dispersed in DMAC, for at least 2 hrs, prior to admixing them with polyamic acid solution. To avoid Si settlement, gel time of Si/polyamic acid solution remained relatively short (4-6 min). For that, 4 g of pyridine/100 mL mixture was used to meet the targeted gel time. Prior to gelation, the mixture was casted in desired form (e.g., film, monolith, or reinforced fiber, etc.). The gels obtained were then aged in the oven at 65-70° C. and washed/rinsed with ethanol several times prior supercritical drying.

A. 22-25 wt % Silicon in Polyimide Carbon Aerogel Composite

Target density of the composite was fixed at 0.06 g/cc, and Si loading was around 11.88 wt %, at polymerization step. Silicon content was adjusted after pyrolysis of the polyimide aerogel at 1050° C. for 2 hrs, since no less than 50% wt loss was recorded on all samples. Composites with four different thickness were produced:
- MT (medium thick composite ~0.3-0.4 mm)
- T (thick composite ~0.6-0.8 mm)
- MTC (medium thick compressed composite ~0.07-0.09 mm)
- TC (thick compressed composite ~0.12-0.16 mm)

The different PI/Si samples were pyrolyzed at 1050° C. for 2 hrs and battery tested. The physical properties of the samples are listed in Table 13.

TABLE 13

Physical characteristics of different C/Si composites.

| ID samples | Material Description | weight (g) | 1 (cm) | L (cm) | Thickness (mm) | Density (g/cc) |
|---|---|---|---|---|---|---|
| MT1 | Medium thick | 0.0058 | 1.050 | 1.000 | 0.29 | 0.190 |
| MT2 | composite (Si | 0.0064 | 1.100 | 1.100 | 0.28 | 0.189 |
| MT3 | content ~25.05 | 0.0056 | 1.100 | 1.100 | 0.32 | 0.145 |
| MT4 | wt %) | 0.0069 | 1.150 | 1.150 | 0.29 | 0.180 |
| MT5 |  | 0.0070 | 1.100 | 1.100 | 0.29 | 0.199 |
| MTC1 | Medium thick | 0.0073 | 1.100 | 1.300 | 0.06 | 0.851 |
| MTC2 | compressed | 0.0070 | 1.200 | 1.200 | 0.08 | 0.608 |
| MTC3 | composite (Si | 0.0053 | 1.000 | 1.150 | 0.07 | 0.658 |
| MTC4 | content ~22.29 | 0.0070 | 1.200 | 1.300 | 0.08 | 0.561 |
| MTC5 | wt %) | 0.0074 | 1.200 | 1.250 | 0.06 | 0.822 |
| 1T | Thick | 0.0131 | 1.000 | 1.000 | 0.55 | 0.238 |
| 2T | composite (Si | 0.0125 | 1.100 | 1.000 | 0.51 | 0.223 |
| 3T | content ~23.45 | 0.0129 | 1.000 | 1.100 | 0.46 | 0.255 |
| 4T | wt %) | 0.0125 | 1.100 | 1.100 | 0.46 | 0.225 |
| 5T |  | 0.0111 | 1.100 | 1.000 | 0.46 | 0.219 |
| 2TC | Thick compressed | 0.0159 | 1.400 | 1.200 | 0.21 | 0.451 |
| 3TC | composite (Si | 0.0139 | 1.300 | 1.300 | 0.34 | 0.242 |
| 4TC | content ~21.89 wt %) | 0.0123 | 1.200 | 1.200 | 0.28 | 0.305 |

Figure 23:
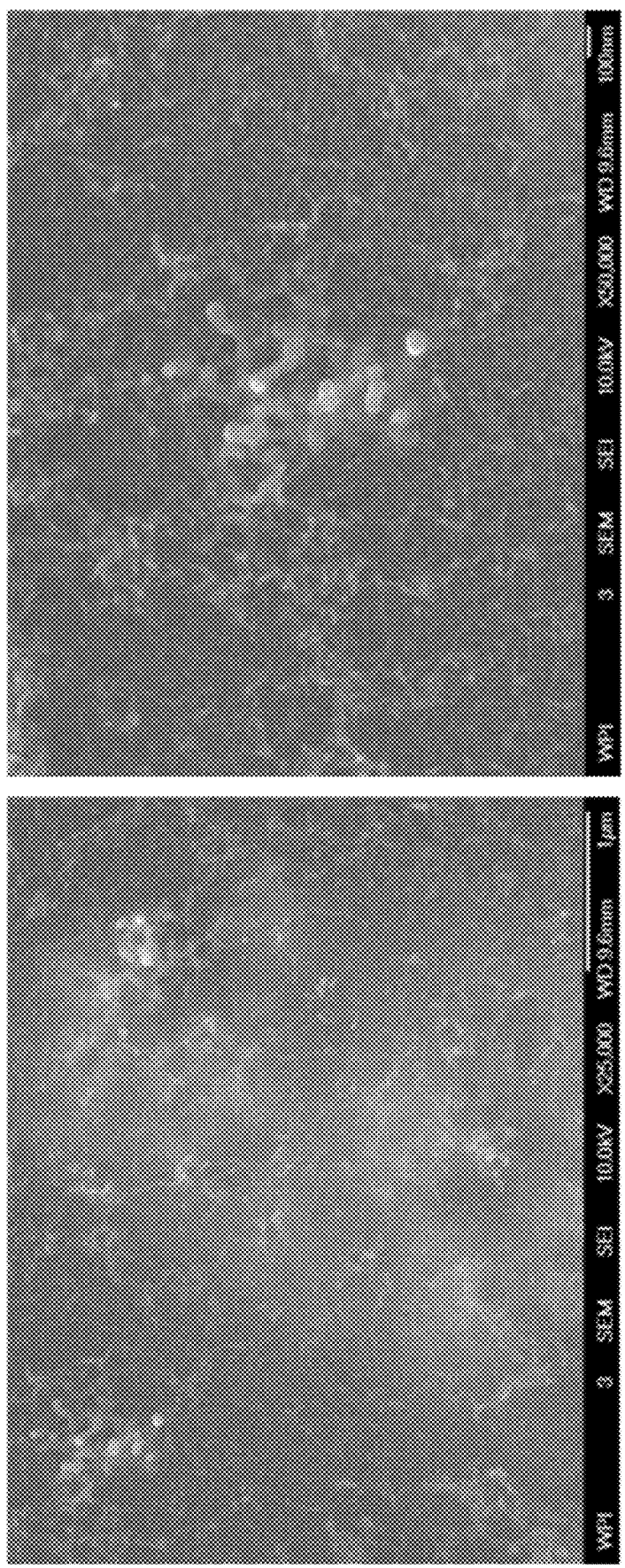
FIG. 23 is SEM images of the MT materials (non-compressed).
Figure 24:
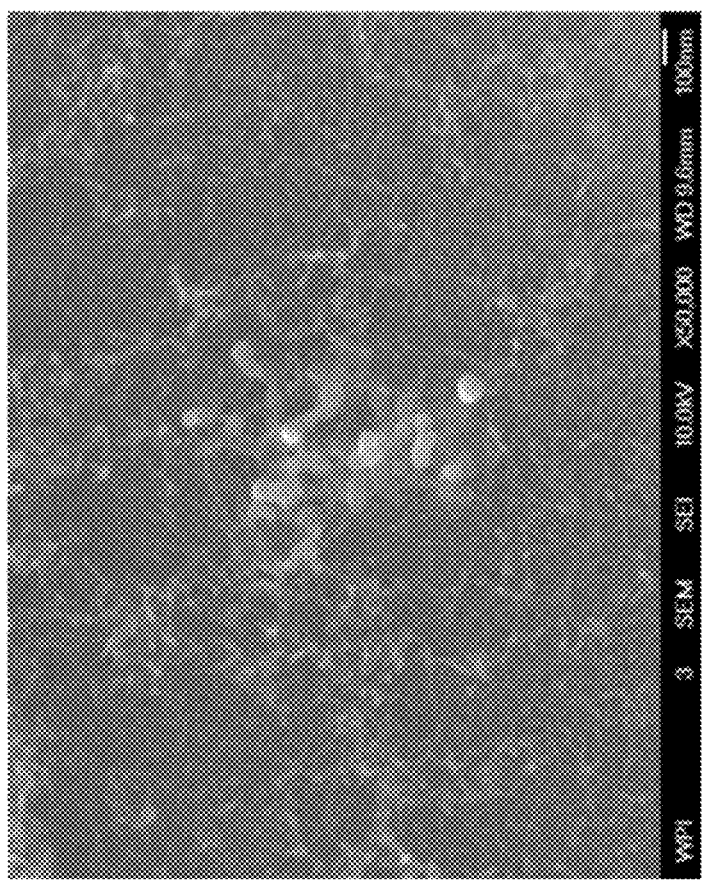
FIG. 24 is SEM images of the MTC materials (compressed).
Figure 24:
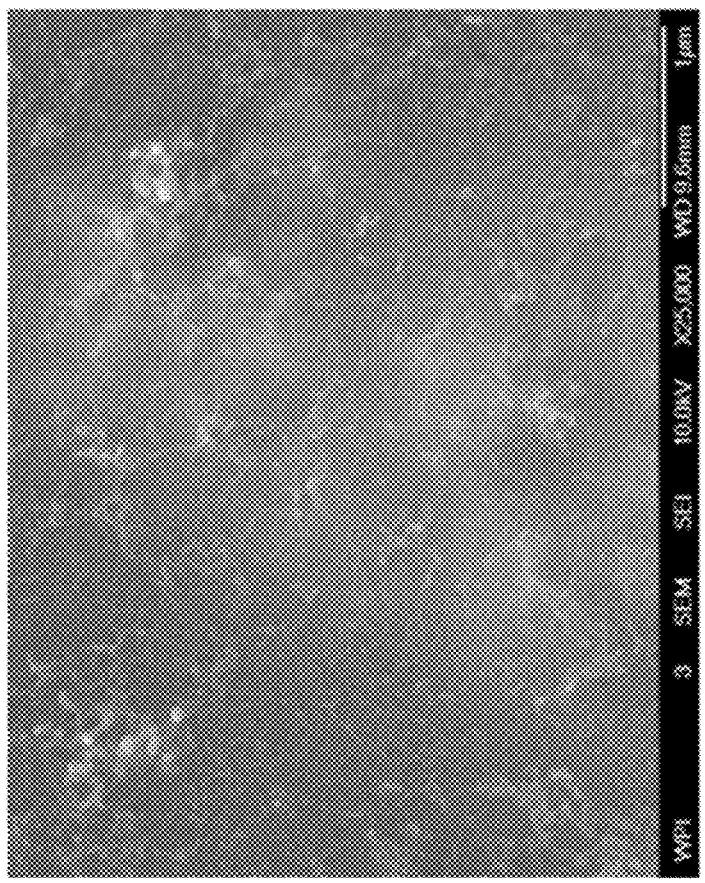

SEM images of the pyrolyzed composites (MT material) doped with ~25% Si can be seen in FIG. 23. The SEM images show some agglomeration of Si and silicon nanowires, at high magnification, embedded in the carbon matrix.

Figure 25A:
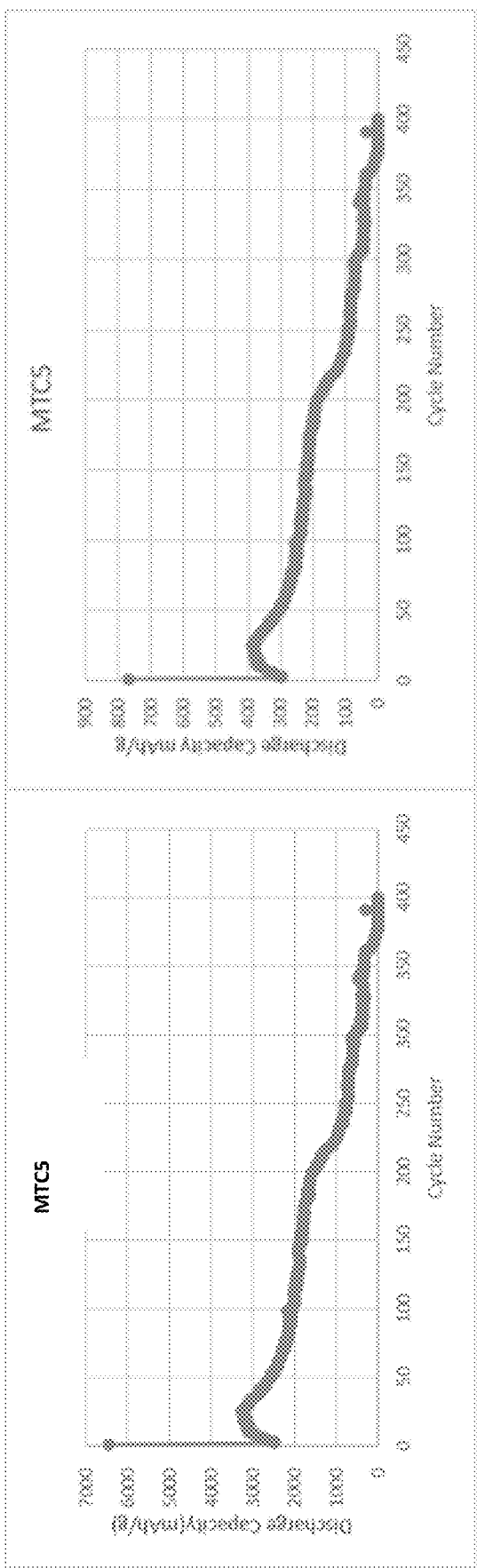
FIG. 25A depicts cycling capacities based on Si content (left) and on the electrode (right), for compressed CPI samples.
Figure 25B:
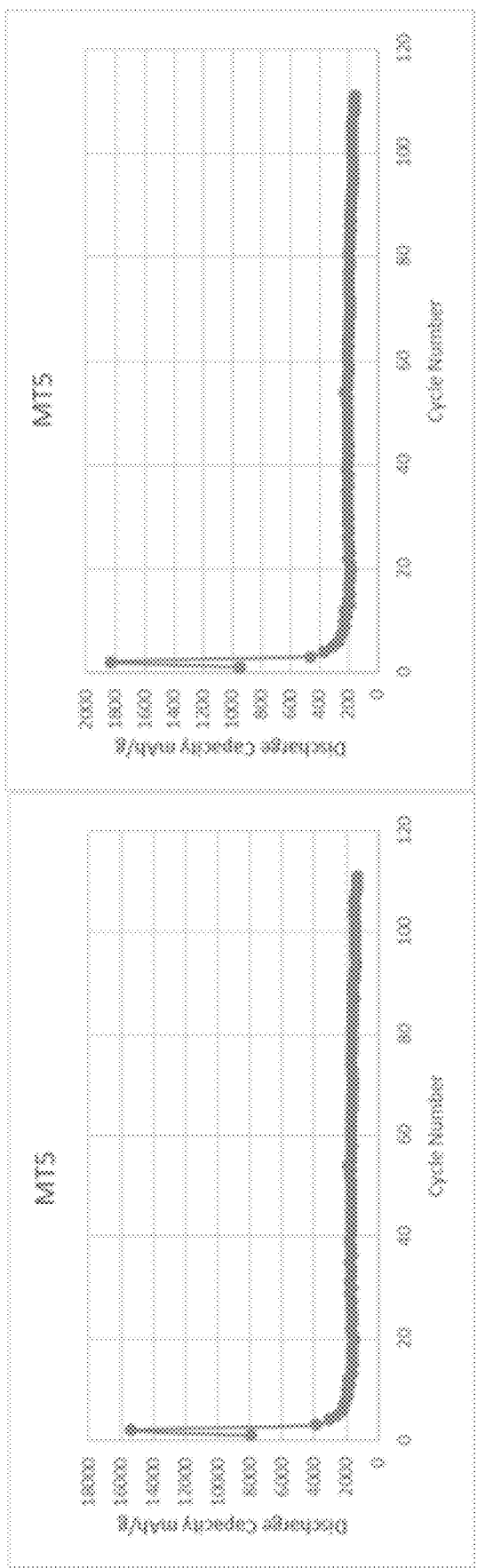
FIG. 25B depicts cycling capacities based on Si content (left) and on the electrode (right), for non-compressed CPI samples.

The cycling capacities of MTC5 and MT5 samples, based on the Si and electrode content, are shown in FIGS. 25A-25B. Cycling was performed up to 400 cycles for MTC5 (compressed CPI aerogel) and up to 150 for MT5 (non-compressed CPI aerogel). The two samples showed different behavior. MTC5 demonstrated relatively stable capacity discharge up to 200 cycles, followed by capacity decrease, likely due to the foil electrode in the half-cell battery test, as previously discussed.

B. 39 wt % Silicon in Polyimide Carbon Aerogel Composite

In the next round of synthesis, Si content was increased to 39 wt %, expecting to decrease the capacity loss during the first discharges. Polyimide gels were prepared at 0.05 g/cc target density. Polyamic acid solution was prepared over 16 hours by mixing PMDA and PDA precursors, in DMAC. Separately, silicon powder was dispersed in DMAC for 2 hours, and then added to the polyamic acid solution prior the addition of pyridine. After addition of pyridine, composites were prepared between Teflon plates using 500 microns spacer. The aerogel composites were compressed and then pyrolyzed for 2 hours at 1050° C. Silicon content was 39 wt % per total solids.

The properties of the compressed (PISi1NC(C)) and non-compressed (PISi7NC) composites tested in half-cell batteries are shown in Table 14.

TABLE 14

Physical characteristics of C/Si (Si ~39 wt %) composites.

| ID samples | Material Description | Weight (g) | l (cm) | L (cm) | Thickness (mm) | Density (g/cc) |
|---|---|---|---|---|---|---|
| PISi1NC(C) | Compressed CPI/Si aerogel (Si ~39 wt %) | 0.0086 | 1.216 | 1.311 | 0.14 | 0.385 |
| PISi7NC | Compressed CPI/Si aerogel (Si ~39 wt %) | 0.0082 | 1.058 | 1.071 | 0.43 | 0.168 |

Figure 26A:
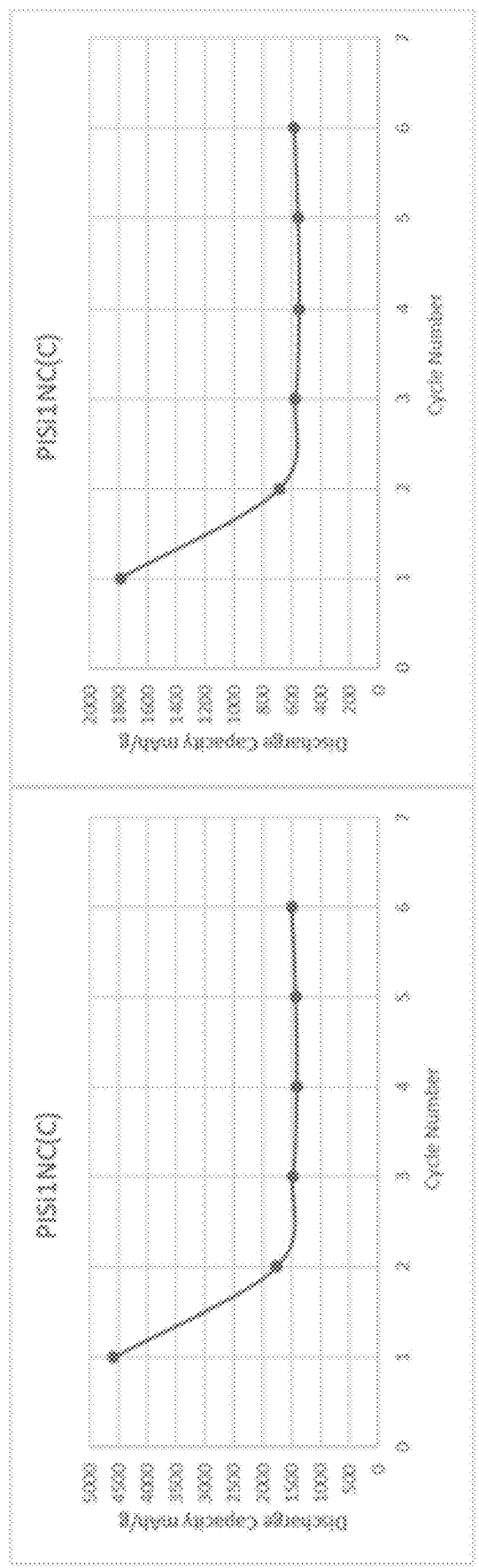
FIG. 26A depicts cycling capacities based on Si content (left) and on the electrode (right), for compressed CPI samples with 29 wt % silicon per total solids.
Figure 26B:
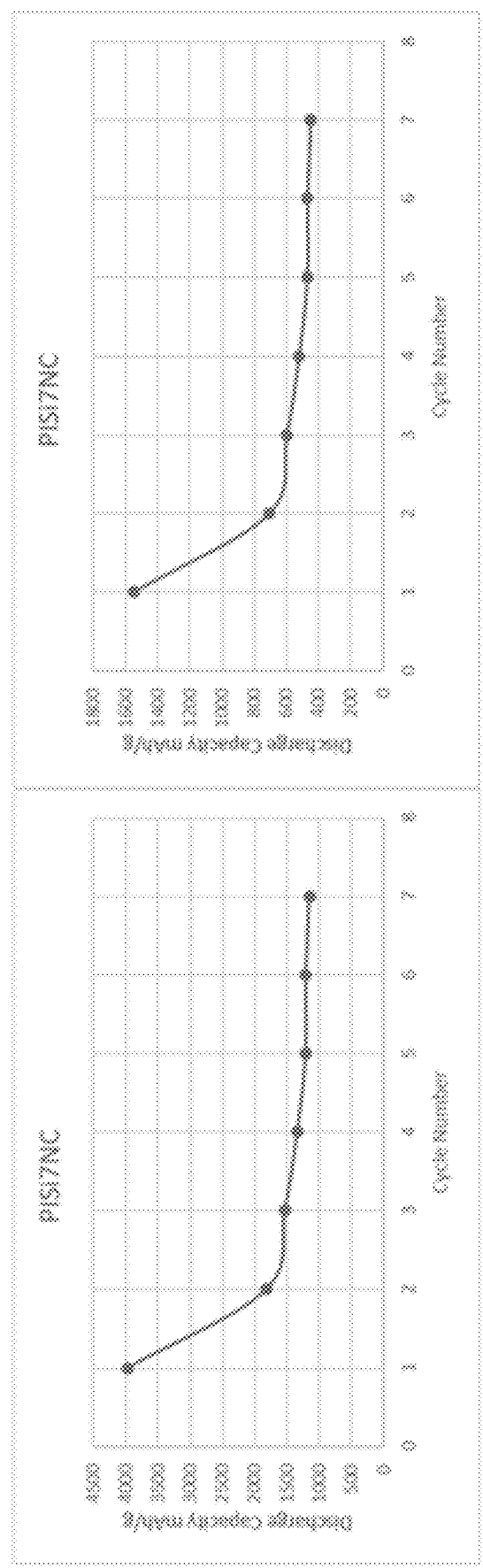
FIG. 26B depicts cycling capacities based on Si content (left) and on the electrode (right), for non-compressed CPI samples with 29 wt % silicon per total solids.

FIGS. 26A-26B illustrate the discharge capacities as a function of cycling the anodes made with the two materials reported in Table 14. A clear improvement of the discharge capacity based on the anode is noticeable when silicon content was increased from 25 wt % (previous materials, i.e., MT5 and MTC5) to 39 wt %.

Example 6: Fiber Reinforced C/Si Aerogel

Figure 27:
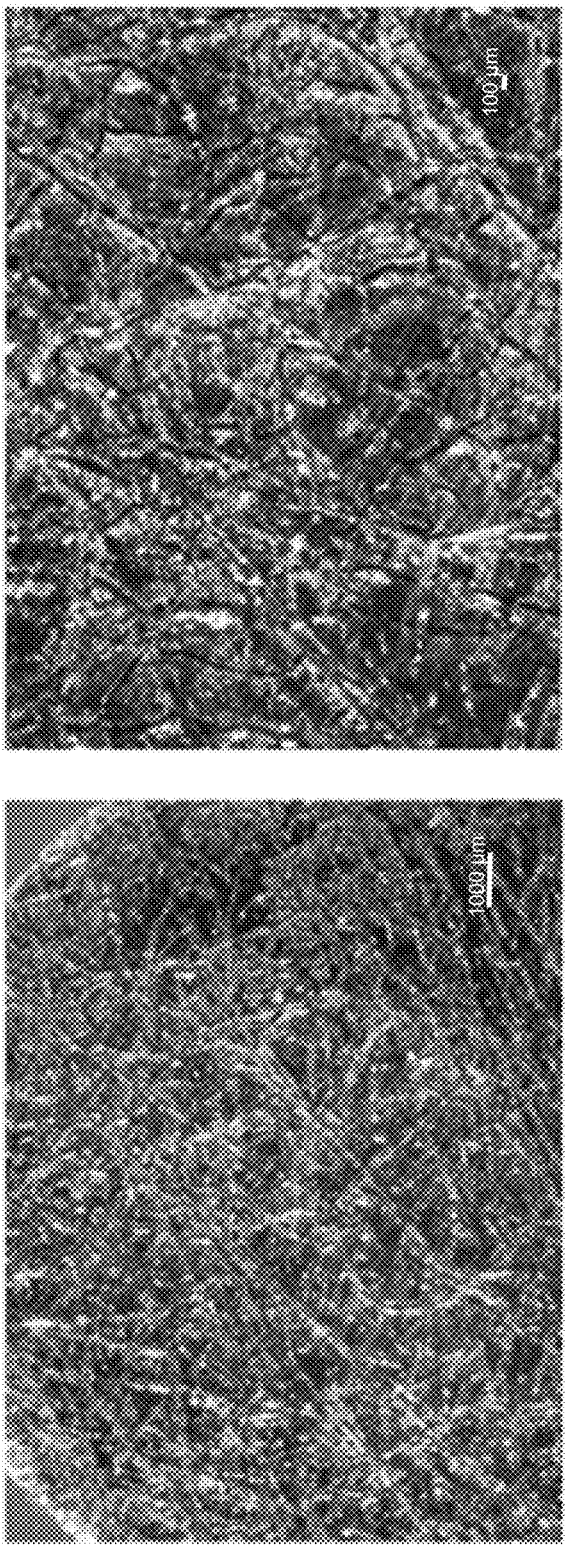
FIG. 27 depicts properties and microscopy pictures of carbon/Si infiltrated in carbon fiber (10 g/m$^2$).
Figure 28:
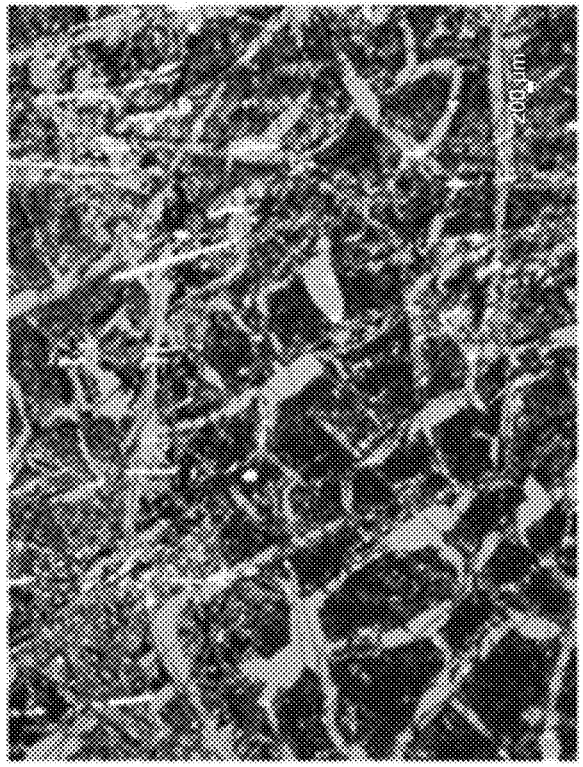
FIG. 28 depicts properties and microscopy pictures of carbon/Si infiltrated in carbon fiber (4 g/m$^2$).
Figure 28:
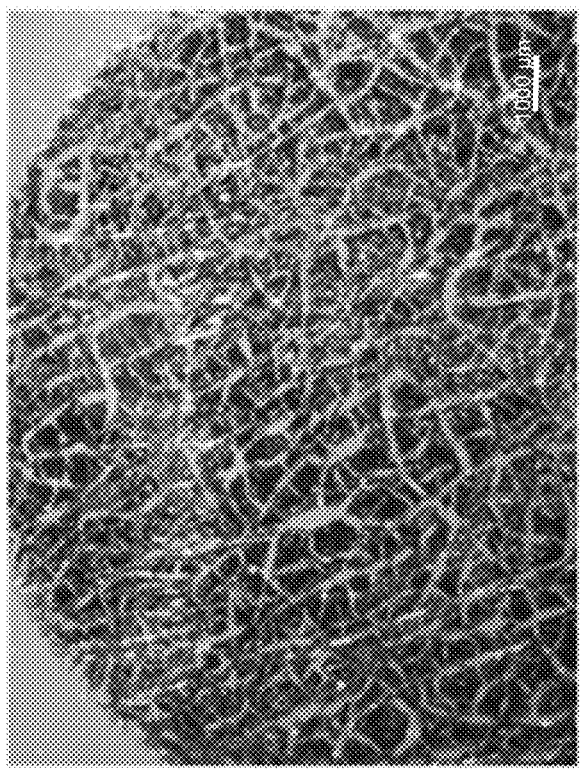
Figure 29:
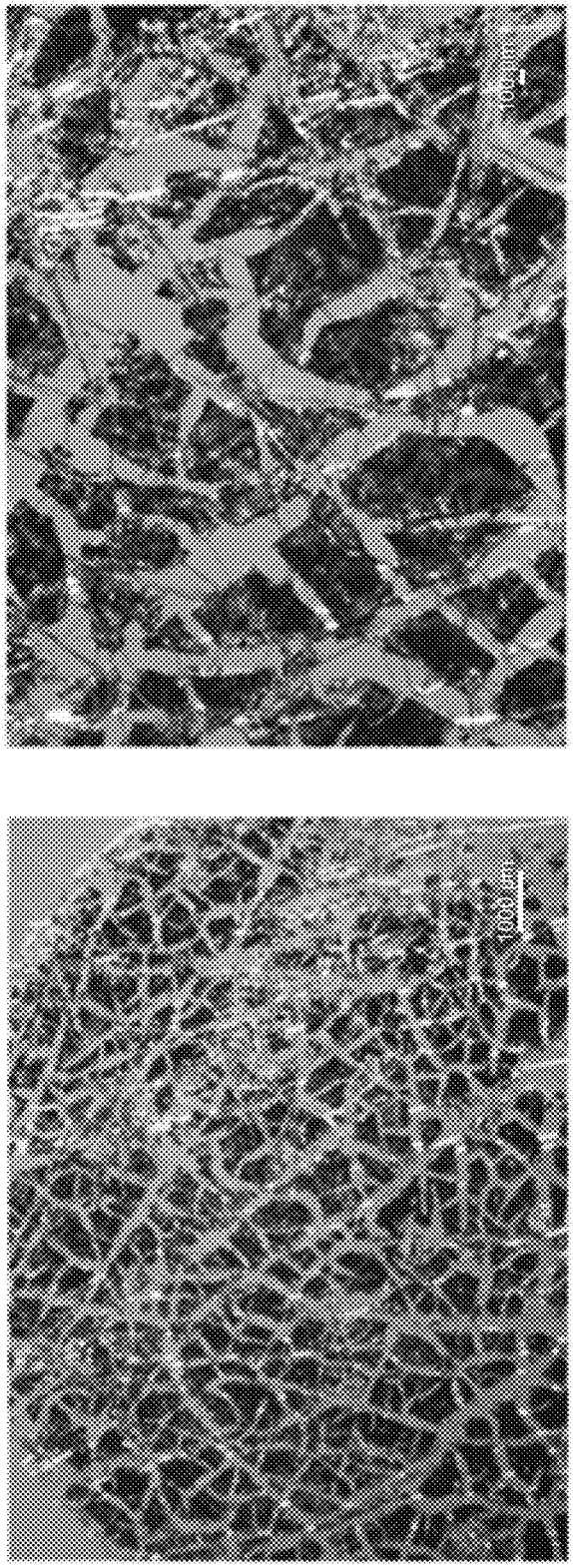
FIG. 29 depicts properties and microscopy pictures of carbon/Si infiltrated in carbon fiber (2 g/m$^2$).

Three different carbon fiber reinforcements with different areal density (2, 4, and 10 g/m²) were tested as reinforcement for C/Si aerogels. The synthesis and processing of the PI/Si aerogels are the same as described previously, with one exception. During the gelation step, the mixture is casted into the fiber. After supercritical drying, the PI/Si composite reinforced with carbon fiber is cut into 15-mm (inner diameter (ID)) circular samples using dye cutter, and pyrolyzed at 1050° C. for 2 hrs. FIGS. 27-29 show the properties and microscopy pictures of the carbonized PI/Si/carbon fiber samples.

Figure 30:
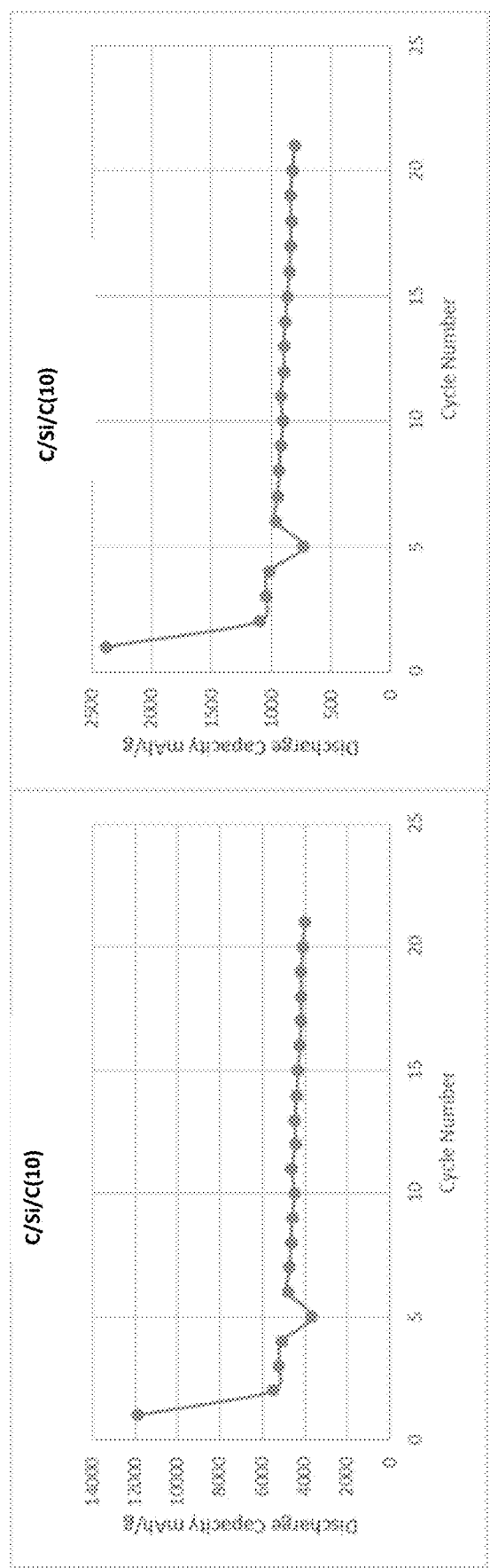
FIG. 30 depicts cycling capacities of C/Si reinforced with carbon fiber based on the Si content (left) and on the electrode (right).

After pyrolysis, the samples reinforced with 2- and 4-g/m² carbon fibers experienced high shrinkage of the carbon aerogel and reinforcement. FIGS. 28-29 show the high voids that characterize these two materials as not particularly suitable for battery testing. In FIG. 27, C/Si reinforced with 10-g/m² carbon fiber showed a better microstructure and no evidence of voids. However, the Si content was low (~21%) and fiber density was high (>30 wt %). This composite was tested for charge and discharge capacities within such a system. The cycling capacities of the sample shown in FIG. 27, based on the Si and electrode content, are reported in FIG. 30.

In another experiment, cellulose fiber was also tested as reinforcement for C/Si. The synthesis route is the same as the one used for the carbon fiber. Cellulose fiber constitutes 68% (by weight) of C/Si composite, though much of this fiber is decomposed after pyrolysis, since the % Si increased from 6% to 24% after pyrolysis. The physical characteristics of C/Si reinforced with cellulose fiber are reported in Table 15.

TABLE 15

Physical characteristics and composition of C/Si reinforced with cellulose fiber.

| Si (%) in PI | PI + Si (%) | Cellulose fiber (%) | Si (%) in system | density (g/cc) |
|---|---|---|---|---|
| 19% | 32% | 68% | 6% | 0.103 |
|  |  | After 2 hrs at 1050° C. | 24% | 0.206 |

Figure 31:
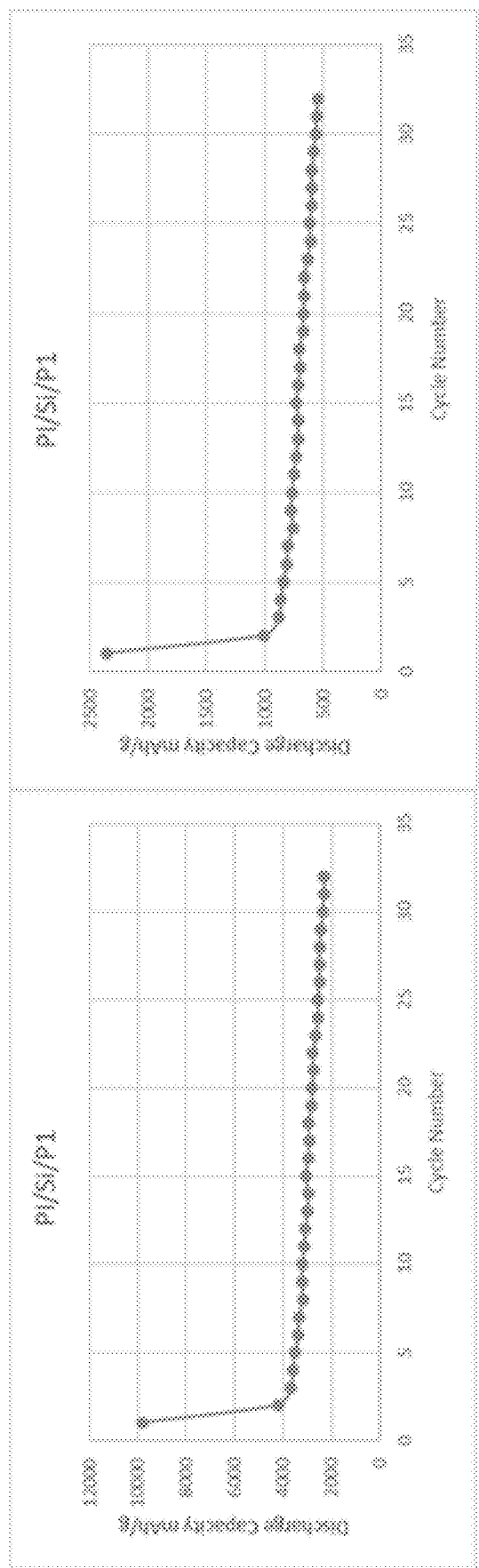
FIG. 31 depicts cycling capacities of C/Si reinforced with cellulose fiber, based on the Si content (left) and on the electrode (right).

The cycling capacities of C/Si reinforced with cellulose fiber, based on the Si and electrode content are reported in FIG. 31. The performance of this material is similar to that seen with the C/Si reinforced with carbon fiber.

Example 7: Silicon Dispersion Improvement within PI Aerogel

PI composites and monolith gels loaded with 47% silicon, with target density of 0.05 g/cc, were prepared. A route for a better dispersion of silicon within the polyimide matrix was performed, to avoid agglomeration. Silicon was dispersed and mixed with PMDA and PDA, from the beginning of synthesis of the solution. Polyamic acid solution+silicon were mixed for 16 hrs. Acetic acid was added and mixed with the solution for 4 hours. Fast gelation (~4 min) was assured by adding the appropriate amount of Py to the acidified polyamic/Si mixture. Composites with thickness of ~200-300 microns, and thick monoliths were casted. After supercritical drying, PI/Si aerogel composites were compressed and then pyrolyzed for 2 hours at 1050° C.

Figure 32:
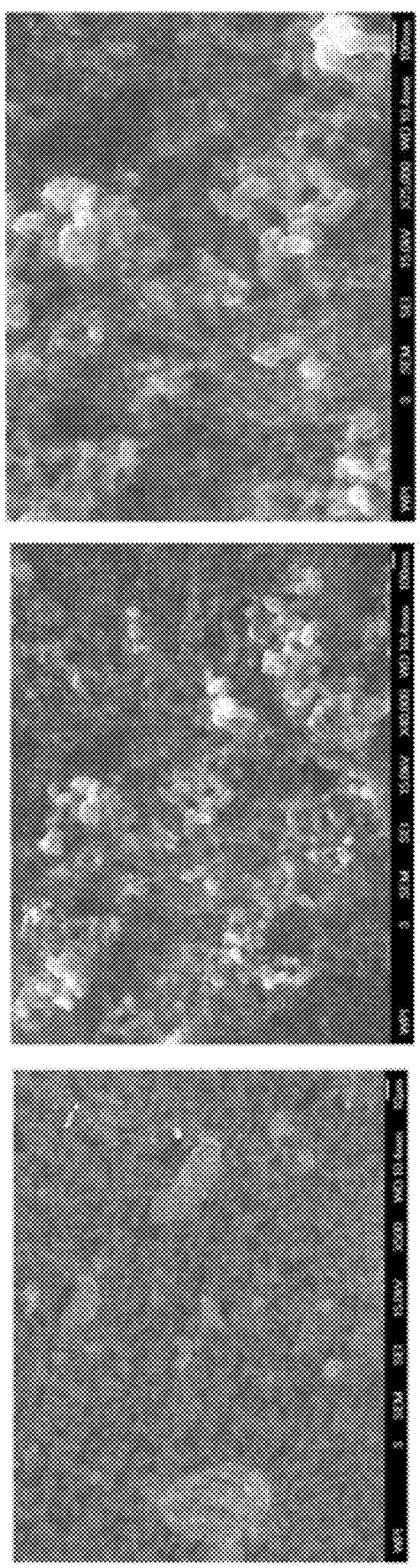
FIG. 32 is SEM images of thick composite (~0.6 mm), where Si and PI were mixed for 16 hrs.
Figure 33:
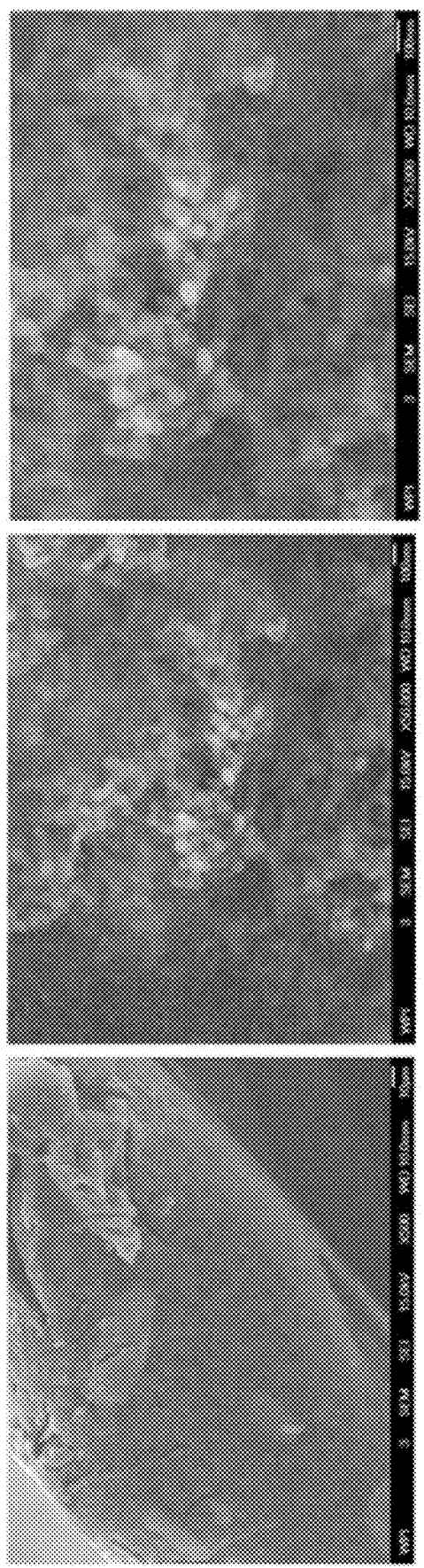
FIG. 33 is SEM images of thin composite (~0.12 mm), where Si and PI were mixed for 16 hrs.
Figure 34:
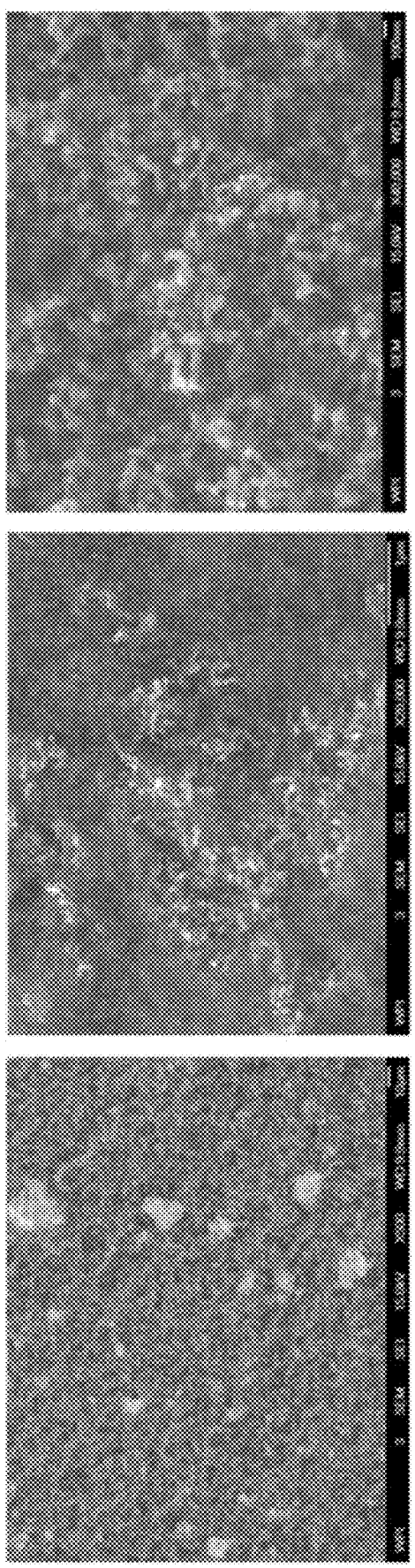
FIG. 34 is SEM images of a monolith sample, where Si and PI were mixed for 16 hrs.

Subsequently, a number of different samples (e.g., compressed, non-compressed, monoliths, etc.) were analyzed by SEM to evaluate the dispersion of silicon in the carbon matrix. FIG. 32 shows three cross-sectional SEM images of thick non-compressed composite (0.60 mm). At low magnification (image on the left), uniform and well-distributed silicon is illustrated. Large clusters of silicon are shown, as well. At higher magnification (right image), high-density silicon can be seen to have embedded well into the carbon matrix. FIG. 33 shows three cross-sectional SEM images of thin composite (0.12 mm). The same observations are made, namely good Si dispersion and rightly impregnated into the carbon matrix. The cross-sectional SEM images of a monolith (FIG. 34) clearly confirm the same structures shown in the thick and thin composites.

Figure 35:
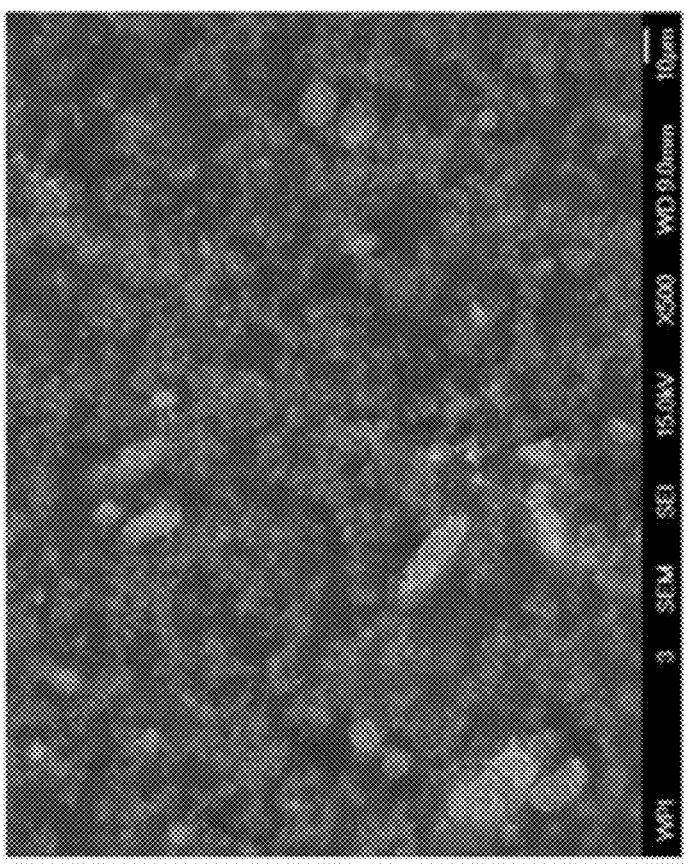
FIG. 35 is SEM cross-sectional images of C/Si monoliths, where Si and PI mixed for 16 hrs in the left image, Si and PI mixed for 4-6 min in the right image.
Figure 35:
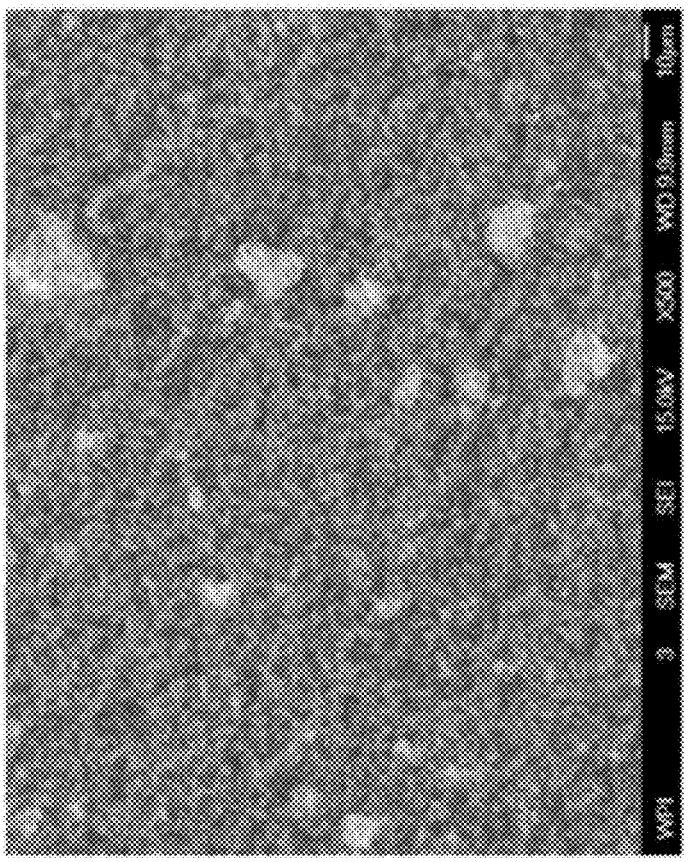
Figure 36:
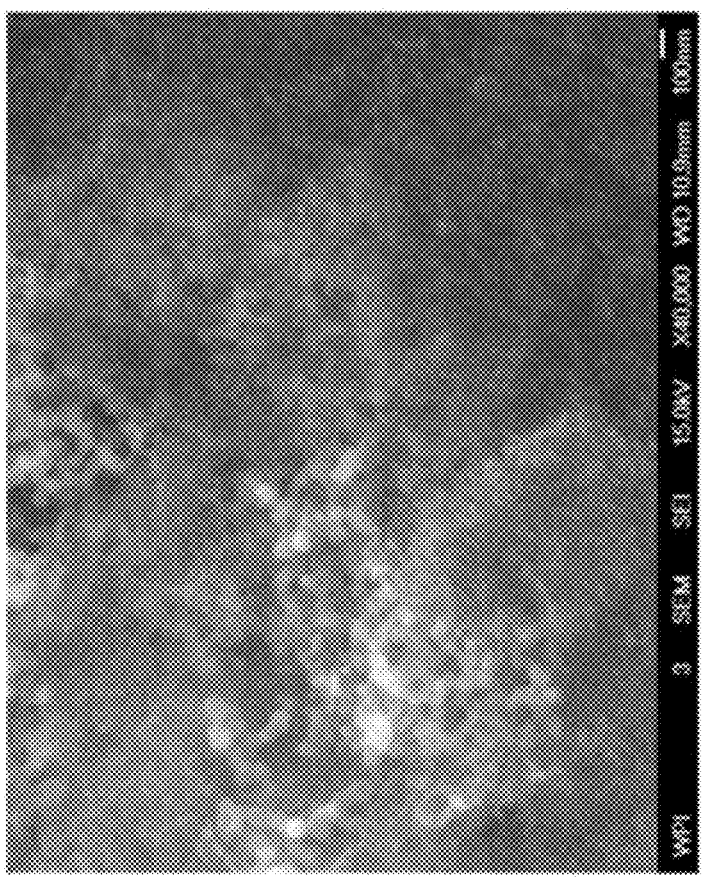
FIG. 36 is SEM cross-sectional images of C/Si composites, where Si and PI mixed for 16 hrs in the left image, Si and PI mixed for 4-6 min in the right image.
Figure 36:
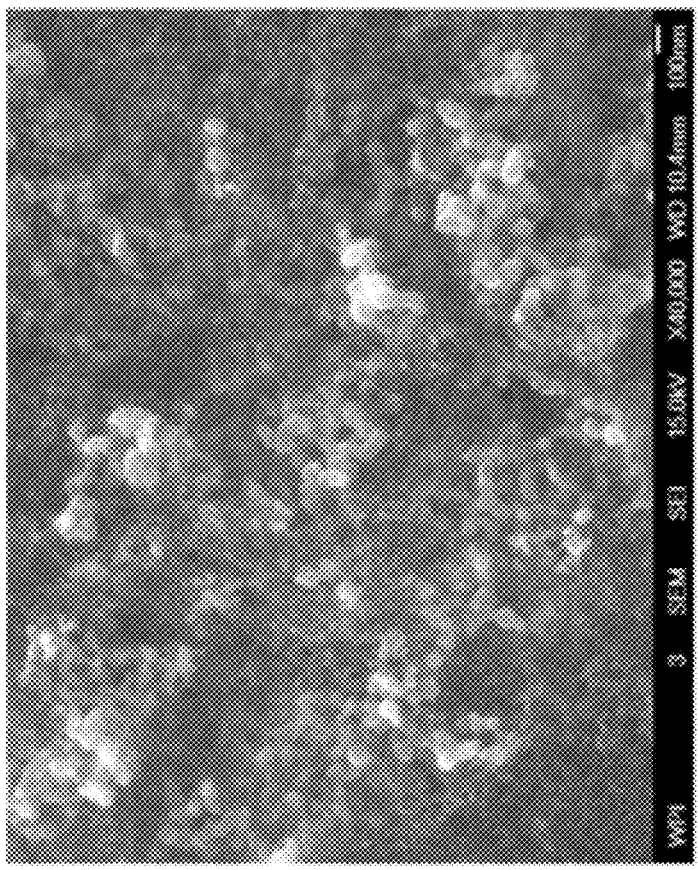

FIGS. 35-36 show side-by-side comparisons of two C/Si composites that were processed differently. The left images (in both figures) are for a monolith and composite casted from a Si/polyamic acid solution mixed for 16 hrs (long contact). The right pictures are for monolith and composite made from Si/polyamic acid solution mixed for 4-6 min (brief contact). The distributions of the silicon are observed to be different in the two processes. Long contact assured a better Si dispersion than brief contact.

Half-cell testing of compressed and non-compressed C/Si composite was performed. Both samples, PISi3 (non-compressed) and PISi6C (compressed), had well dispersion of the Si in the carbon aerogel matrix. The physical properties of the two samples are reported in Table 16.

TABLE 16

Physical characteristics of C/Si (mixed for 16 hrs) submitted for half-cell testing.

| ID | % Si in composite | Thick. (mm) | Density (g/cc) | Weight (g) | Length (cm) | Width (cm) |
|---|---|---|---|---|---|---|
| PISi3 | 47 | 0.59 | 0.226 | 0.0158 | 1.072 | 1.102 |
| PISi6C | 47 | 0.16 | 0.587 | 0.0170 | 1.311 | 1.380 |

Figure 37:
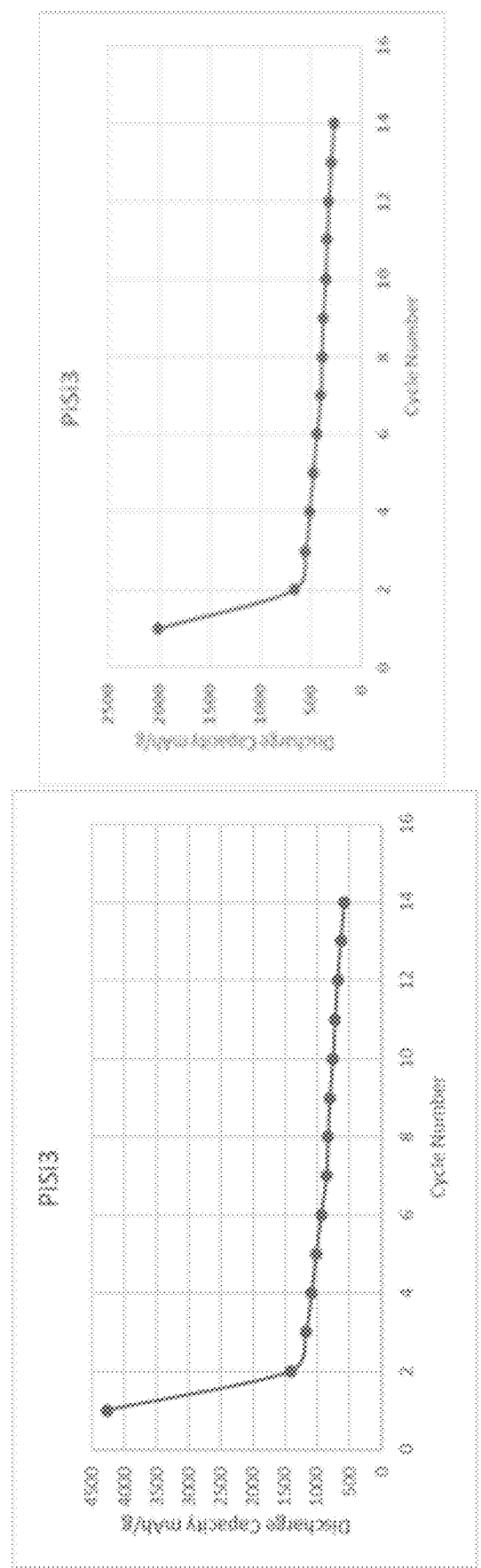
FIG. 37 depicts cycling capacities of non-compressed C/Si (mixing 16 hrs) based on Si content (left) and based on the electrode (right).
Figure 38:
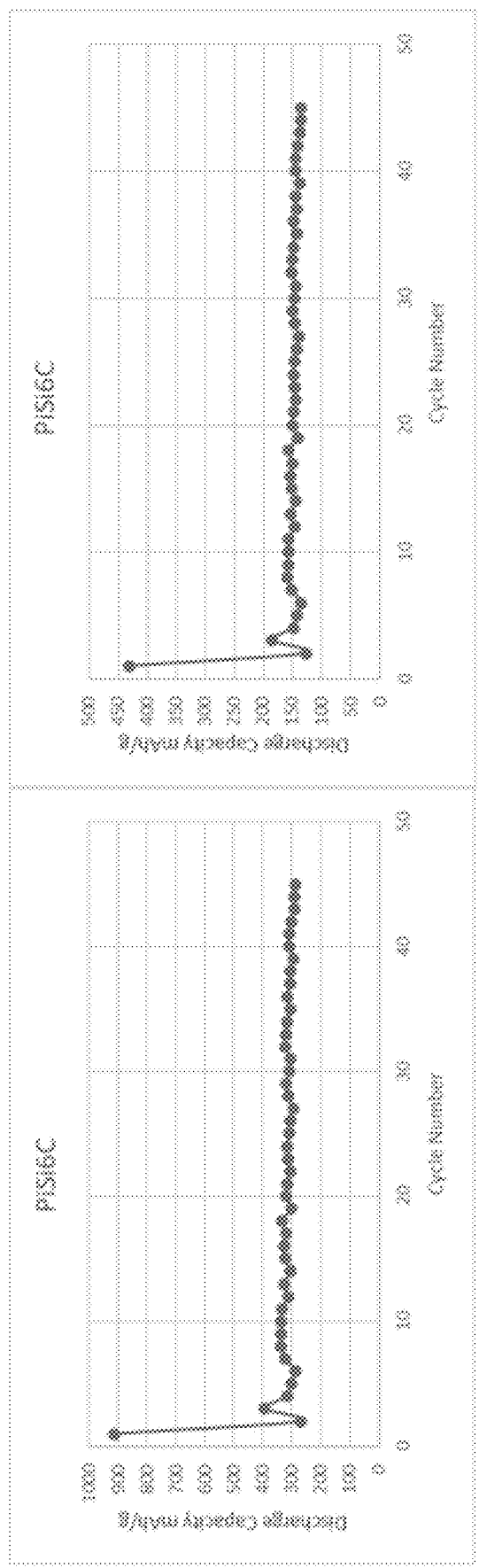
FIG. 38 depicts cycling capacities of compressed C/Si (mixing 16 hrs) based on Si content (left) and based on the electrode (right).

The charge-discharge cycles of the two samples are shown in FIGS. 37-38. The samples performed surprisingly well, with the compressed sample (PISi6C) showing stable cycle performance.

Example 8: C/Si Circular Electrode Fabrication

In previous examples, the C/Si electrodes were in the form of a square (~1 $cm^2$) and tested for battery performance in a circular cell (ID=15 mm). For higher efficiency and more reliable test results, testing circular C/Si electrodes is required. Therefore, a route to make circular electrodes was performed using a die cutter.

Figure 39:
FIG. 39 depicts compressed and circular Si/C electrodes made using a die cutter on aerogel.

PI aerogel composites having 0.13 g/cc target density and loaded with 31.4% Si (using 16 hrs mixing) were fabricated. After extraction, the density of the final aerogel was measured to be about 0.213 g/cc. Using a die cutter, a plurality of circular aerogel composites with ID of 15 mm were produced (see FIG. 39). The thickness of the samples was around 0.43 mm. Some of the samples were compressed prior to pyrolysis at 1050° C. for 2 hrs. The characteristics of the pyrolyzed circular electrodes are as followed:

Weight loss: ~41%
Non-compressed samples: ~0.261 g/cc (1.1 cm ID, 0.38 mm thick)
Compressed samples: ~0.652 g/cc (1.35 cm ID, 0.11 mm thick)

Figure 40:
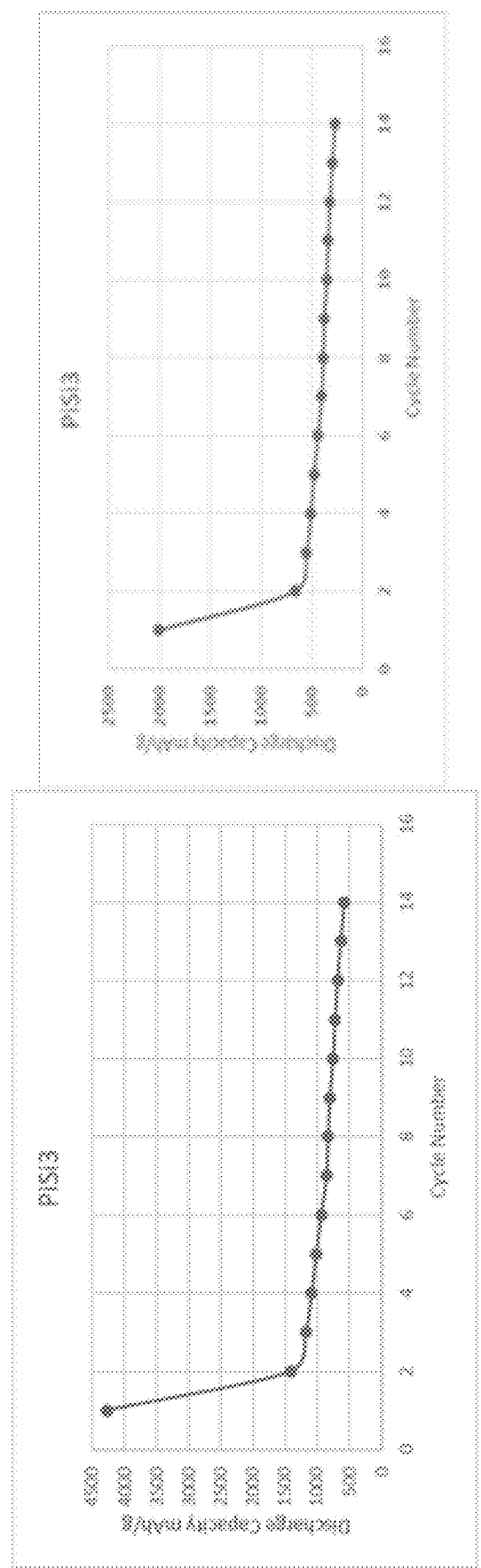
FIG. 40 depicts cycling capacities of non-compressed and circular C/Si aerogel based on Si content (left) and based on the electrode (right).
Figure 41:
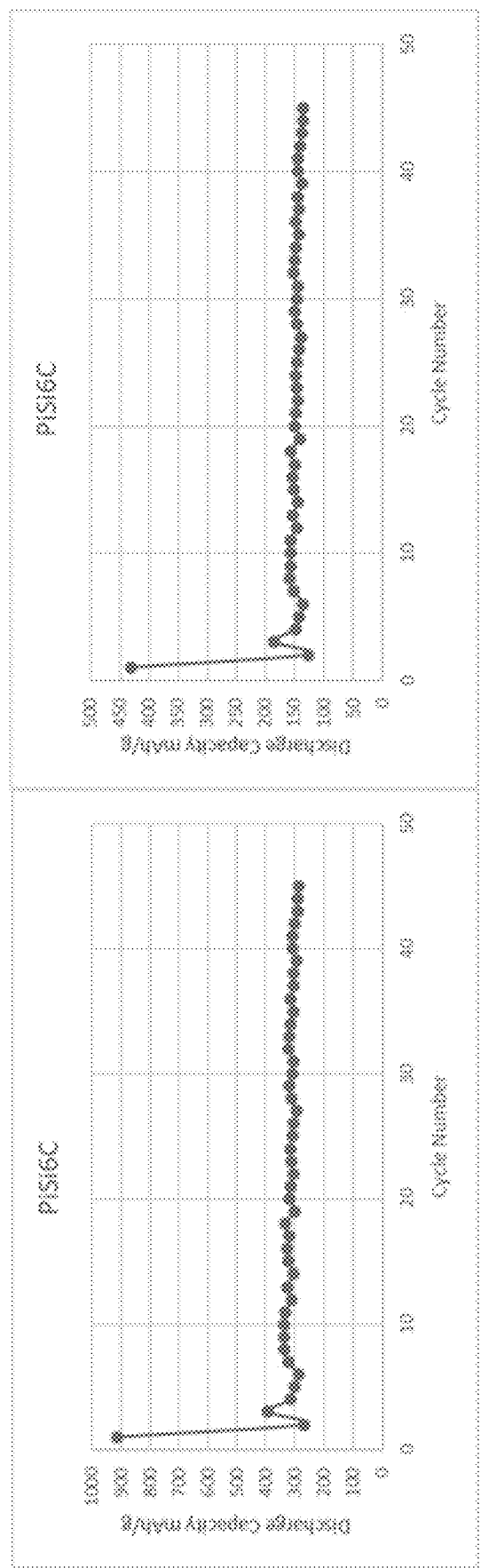
FIG. 41 depicts cycling capacities of compressed and circular C/Si aerogel based on Si content (left) and based on the electrode (right).

The half-cell battery performance of the compressed and non-compressed are shown in FIGS. 40-41. The capacity of the non-compressed sample appears to be higher than the compressed sample, though the non-compressed sample also produced a more unstable capacity.

Example 9. Carbonized PF Aerogel Loaded with Si

Carbon aerogels made from PF are also contemplated herein for C/Si aerogel electrode fabrication. For the PF system, high target density (>0.7 g/cc) aerogels can be achieved through a synthetic route. The aerogel obtained does not need to be compressed. The aerogel obtained does not need to be compressed. High-density PF gel composite was fabricated as follow. 22 g of phloroglucinol were dissolve in 100 mL ethanol, and 44 mL of 2-furaldehyde were added to phloroglucinol solution. The obtained solution was mixed for 30 min. To the mixture, 5 wt % of silicon was added, and mixed vigorously for another 30 min. The PF mixture can be gelled by a base (diamine or triamine) and the gel time is around 20-40 min, depending on the concentration of the base. In this case and in presence of silicon, the gel time should be shorter (less than 1 min) to avoid any settling of silicon during gelation. Chloridric acid (HCl) was used to catalyze the gelation of PF with a gel time as short as 20 seconds. Accordingly, 0.012 g of concentrate HCl per 100 mL of mixture was added to the mixture, mixed for 20 seconds and casted between Teflon plates for gel fabrication.

Figure 42:
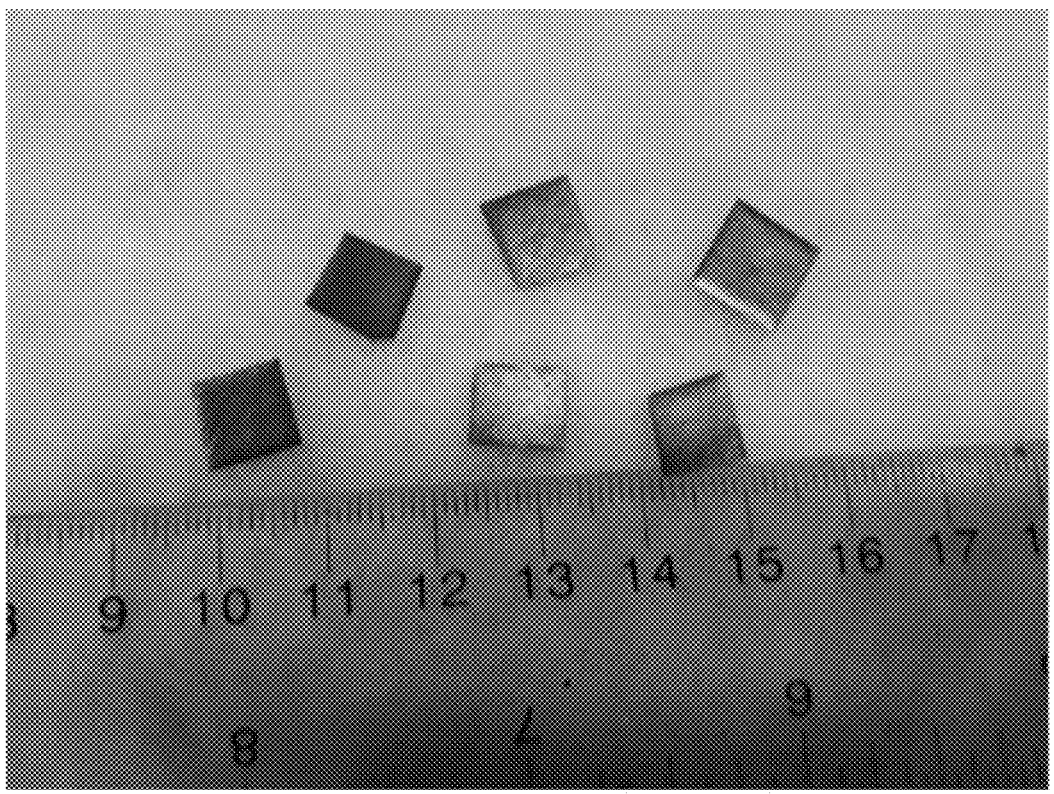
FIG. 42 depicts C/Si aerogel samples resulting from PF/Si aerogel.

After aging and solvent exchange, PF gel composites were dried with supercritical C02. The obtained PF/Si aerogel had the following properties:

Two thicknesses of composites: ~0.2 mm and ~0.1 mm
Final density aerogel: ~0.7 g/cc After, pyrolysis under inert gas at 1050° C./2 hrs, the resulting C/Si aerogel had a density of 0.77 g/cc and an adjusted % Si of 10 wt %. Pre-cut samples (1 $cm^2$) (see FIG. 42) were prepared.

Figure 43:
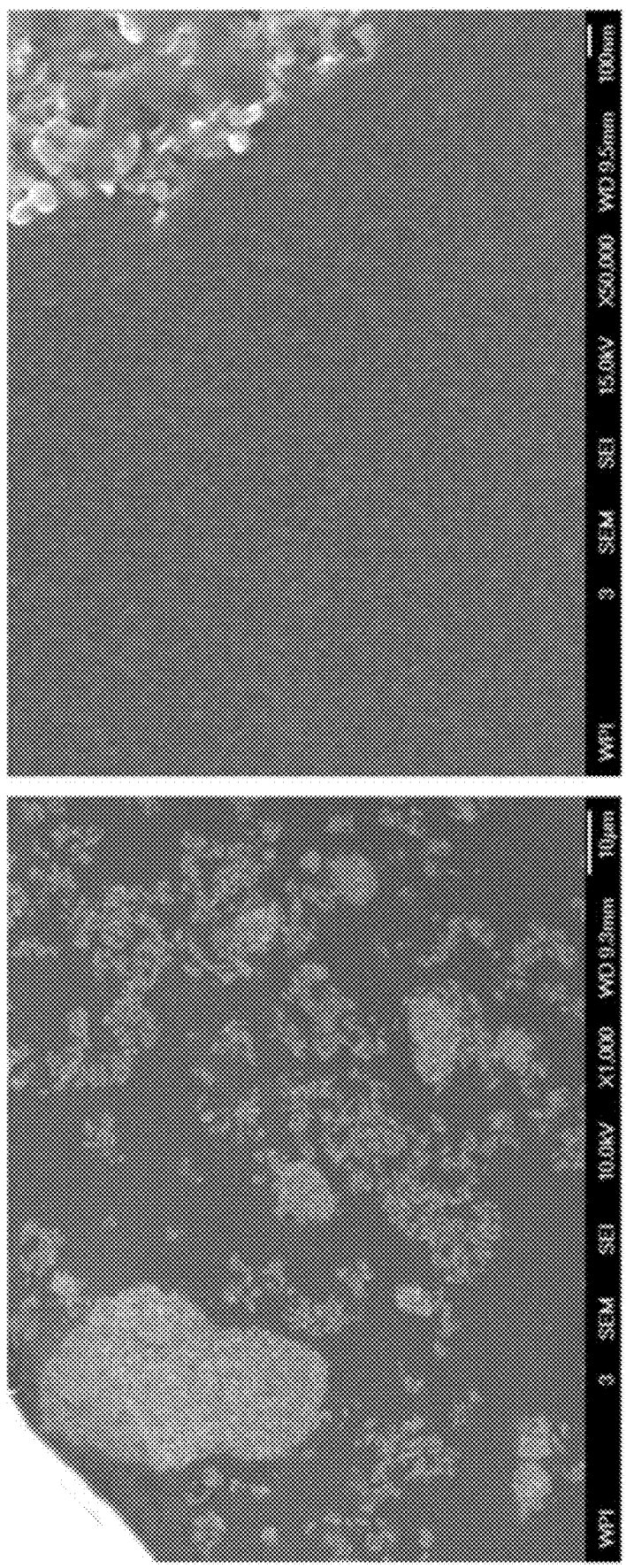
FIG. 43 depicts SEM images of C/Si aerogel (resulting from PF/Si aerogel).
Figure 44:
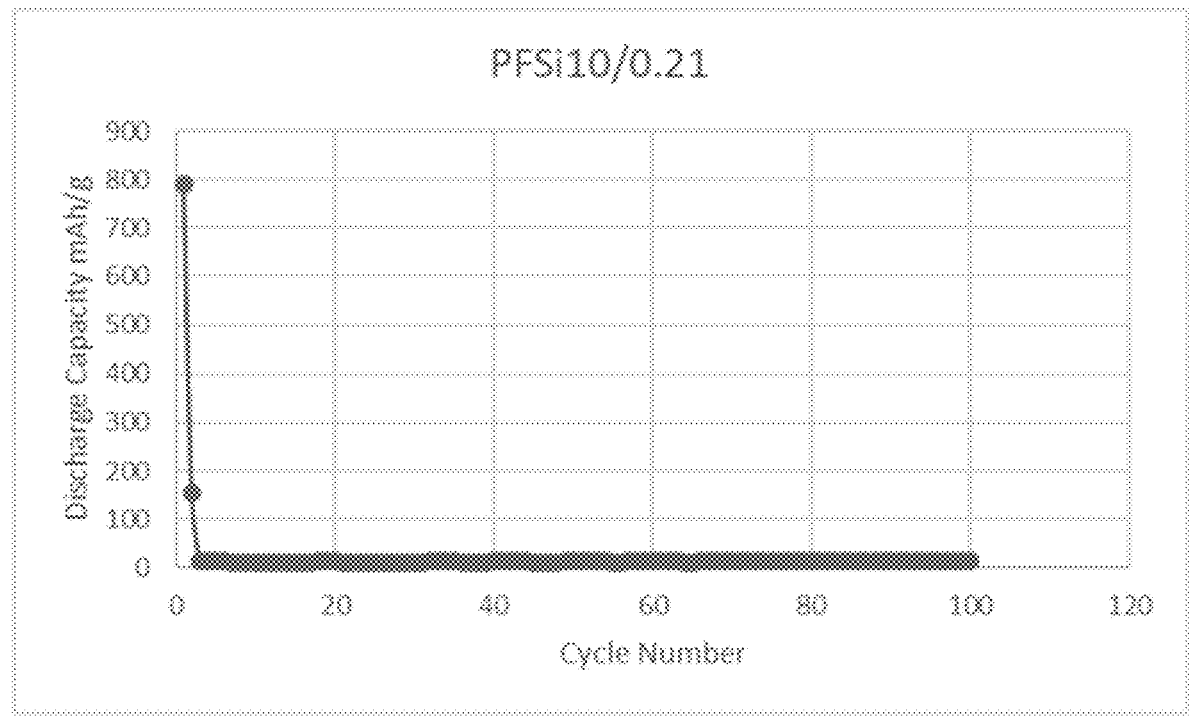
FIG. 44 depicts cycling capacities of PF aerogel composite with Si based on the electrode.

The C/Si aerogel, tested by liquid nitrogen adsorption-desorption, developed a high surface area of 541 $m^2/g$ and a pore volume of 0.32 cc/g. Interestingly, micropore area represented 80% of total surface area, which confirms the dense and compact structure shown in SEM images (see FIG. 43). In addition, carbon aerogel composite samples containing Si, where the carbon was derived from the PF, resulted in high capacity loss after the first cycle and very low overall capacity (see FIG. 44). These results highlight the unique nature of the Si to perform better in a fibrillar morphology, such as that seen in polyimide-derived nanoporous carbons/carbon aerogels.

Example 10: Nanoindentation as a Measure of Mechanical Strength

Figure 45:
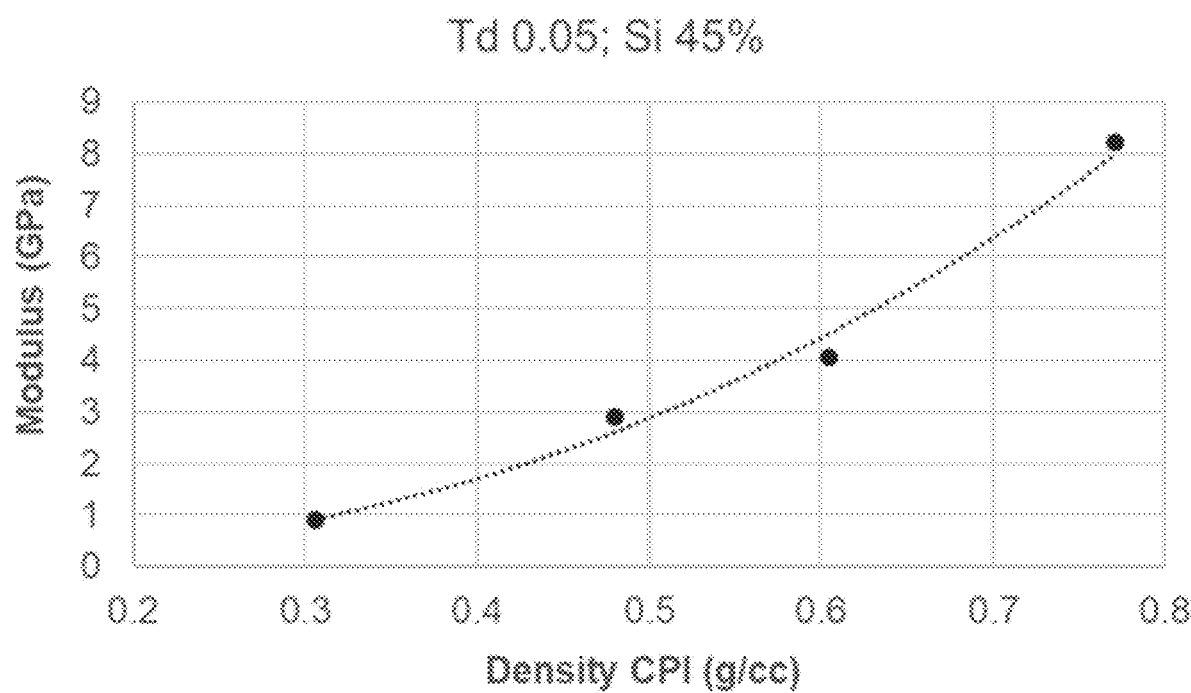
FIG. 45 depicts the effect of silicon content on Young modulus in samples tested with nanoindentation methods.
Figure 46:
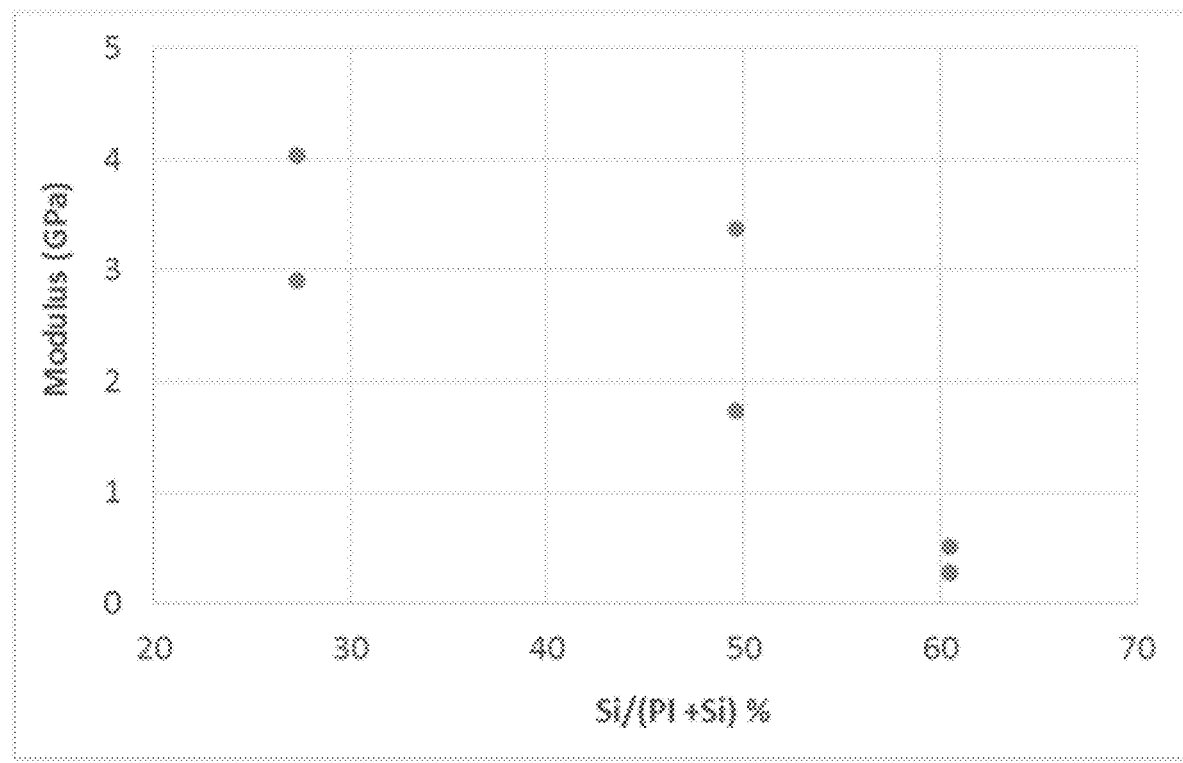
FIG. 46 depicts the effect of density on Young modulus tested with nanoindentation methods.
Figure 47:
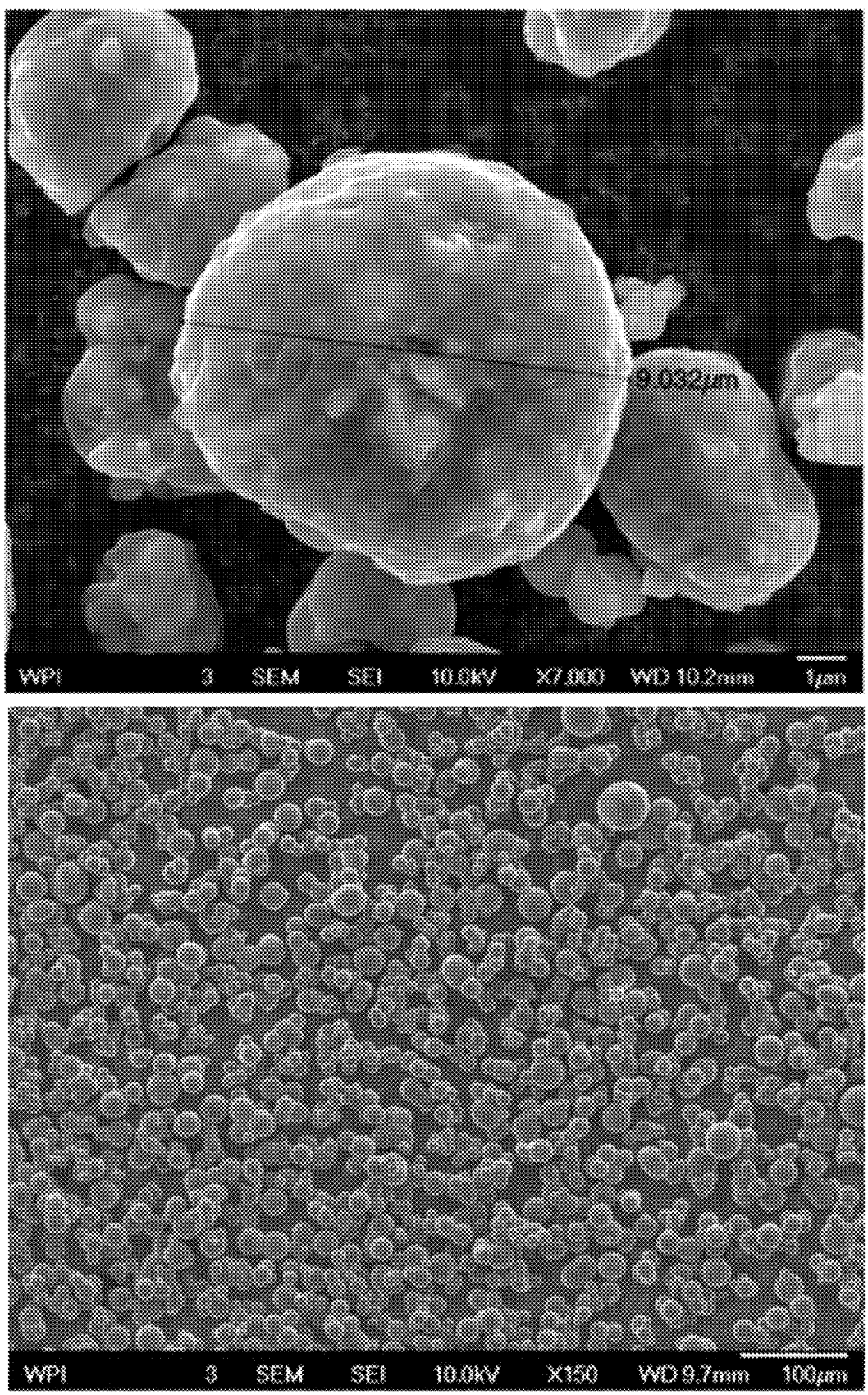
FIG. 47 is SEM images of particulate C/Si aerogel samples according to embodiments disclosed herein.

A plurality of CPI composite samples were made using the above-described methodologies, where variables within the samples included silicon content and densities. Each sample's Young modulus was measured using nanoindentation, which tests the hardness of the material. More specifically, twenty (20) indents were run across the sample surface. About 8-10 indents were selected to obtain average data as well as standard deviation for each mechanical property. The indentation locations were chosen under microscope, where surfaces were relatively clean and smooth and without many surface features, thus providing more reliable data. A 50-mN maximum load was selected for samples 1 and 2 since they were softer than other samples. A 300-mN indent load was employed for samples 3-7. Results and other properties are shown in Table 18. FIG. 45 depicts the modulus as a function of density, and FIG. 46 depicts the modulus as a function of density.

TABLE 18

Physical characteristics of CPI samples tested with nanoindentation methods.

| # | % Si/ (C + Si) | % Si/ (PI + Si) | Td (g/cc) | Density (g/cc) | Young Modulus (GPa) |
|---|---|---|---|---|---|
| 1 | 66 | 60.5 | 0.05 | 0.644 | 0.279 ± 0.022 |
| 2 | 66 | 60.5 | 0.05 | 0.608 | 0.504 ± 0.038 |
| 3 | 45 | 27.3 | 0.05 | 0.605 | 4.049 ± 0.317 |
| 4 | 45 | 27.3 | 0.05 | 0.480 | 2.911 ± 0.428 |
| 5 | 64 | 49.6 | 0.08 | 0.739 | 1.735 ± 0.173 |
| 6 | 64 | 49.6 | 0.08 | 0.658 | 3.381 ± 0.168 |
| 7 | 45 | 27.3 | 0.05 | 0.771 | 8.218 ± 0.657 |
| 8 | 45 | 27.3 | 0.05 | 0.306 | 0.883 ± 0.053 |

Example 11: CPI Beads Doped with 45% Silicon

PI gel beads were prepared at 0.10 g/cc target density. PMDA and PDA precursors were mixed in DMAC solvent at room temperature for 3 hours. Then AA was added and mixed with the solution for 2 hours. Separately, silicon powder of 30 nm particle size was sonicated for 1 minute in DMAC solvent, and added to the mixture 5 minutes prior to the addition of pyridine catalyst. Silicon was added at ~24% per total solids. The doped mixture was catalyzed using 3.2 molar ratio of Py to PMDA. Prior to gelation, the catalyzed sol containing silicon particles was poured into an already-agitated container of silicone oil as the dispersion medium (at a volume ratio of 10:1 silicone oil:catalyzed sol). Gelled PI beads were isolated from the silicone oil by filtration, subsequently rinsed using ethanol and then dried by supercritical C02 extraction. The PI aerogel-silicon composite beads were then pyrolyzed for 2 hours at 1050° C. to form CPI silicon composite beads, having a tap density of 0.7 g/cc and D50=15 μm.

Example 12: Electrode Prepared from CPI Beads

An anode electrode was prepared using CPI silicon composite beads prepared according to Example 11 on Cu foil as the current collector with a slurry containing 80 wt % CPI silicon composite beads, 10 wt % polyacrylic acid (PAA) binder, and 10 wt % hard carbon conductive additive (C65), mixed in water at a total solids content of approximately 36 wt %. The slurry was cast onto Cu foil using a doctor blade. After drying and calendaring, an electrode with a loading of 3.1 mg/cm$^2$ and a density of 0.7 g/cc was obtained.

Example 13: Half-Cell Units Built from CPI Electrode

Figure 48:
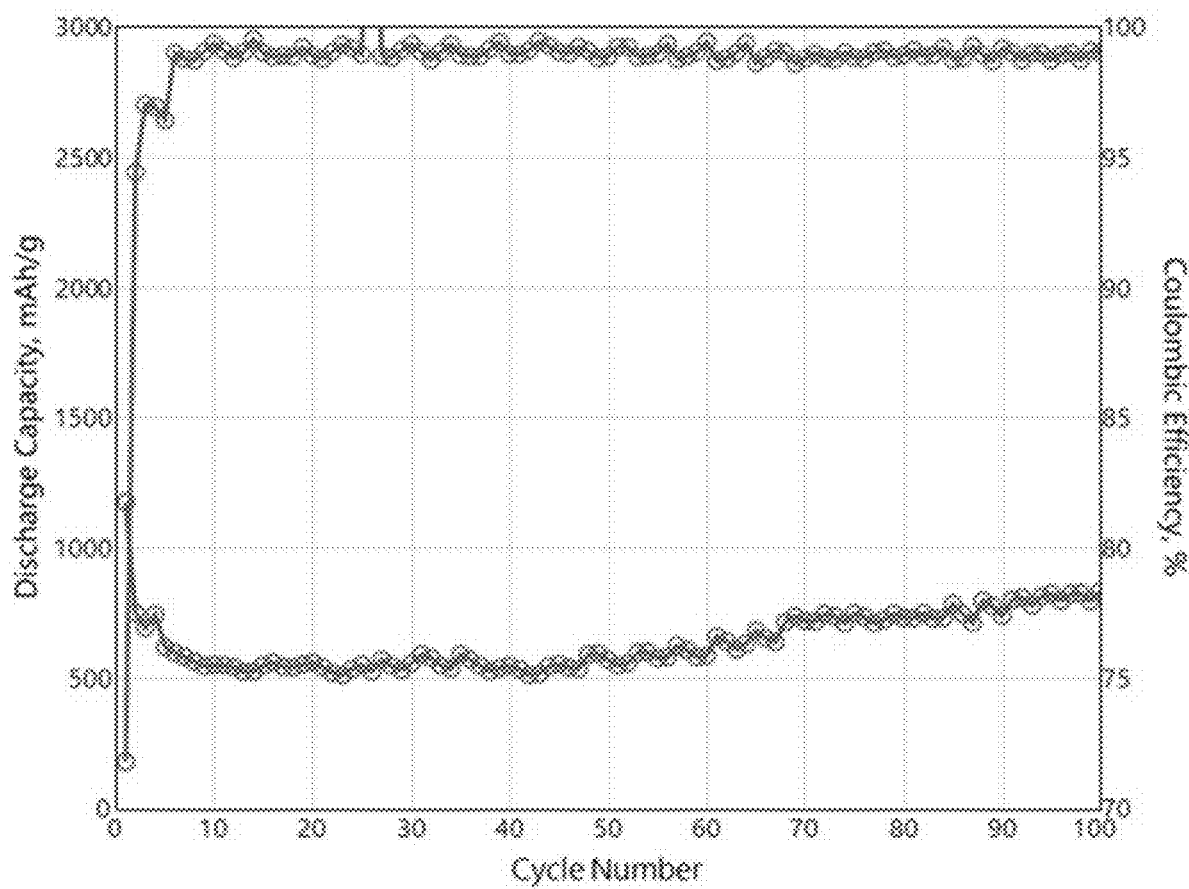
FIG. 48 depicts cycling performance of an electrode including CPI silicon beads according to embodiments disclosed herein.

Half-cell units (2032 coin cells) were built with the CPI composite electrodes prepared according to Example 12 with lithium foil as the counter electrode and CELGARD 2500 as the microporous separator between the electrodes. The electrolyte was 1.0 M LiPF6 in ethylene carbonate (EC)/ethylmethyl carbonate (EMC) (3:7 weight ratio) and 5 wt % fluoroethylene carbonate (FEC). All cells were tested with an ARBIN BT2043 tester. The protocol for testing cells included 4 formation cycles at a charge/discharge rate of C/20. Subsequent cycling occurred at various rates between C/20 and 5 C. FIG. 48 shows half-cell cycling performance of CPI composite electrodes containing 30 wt % silicon particles prepared as electrode from slurry containing 80 wt % CPI silicon composite beads, 10 wt % polyacrylic acid (PAA) binder, and 10 wt % hard carbon conductive additive (C65). The chart of FIG. 48 shows discharge capacity (mAh/g based on total weight of the electrode) and Coulombic efficiency versus cycle number in 1.0 M LiPF6 in ethylene carbonate (EC)/ethylmethyl carbonate (EMC) (3:7 weight ratio) and 5 wt % fluoroethylene carbonate (FEC).

Example 14: Alternative Methods of Producing a PI Aerogel

Previous examples discussed herein teach certain methodologies of forming a PI aerogel. In certain embodiments, the current invention contemplates alternative methods of forming a PI aerogel as well. A non-exhaustive and non-limiting set of examples of such alternative methodologies will now be discussed.

For example, U.S. Pat. No. 6,399,669 to Suzuki et al. teaches four (4) related methods of making a PI dry gel (aerogel). In a first method, a PI precursor is synthesized, followed by formation of an imide from PI precursor, resulting in production of polyimide. A PI solution or swollen bulk is prepared, and the solution/swollen bulk is gelled to produce a PI wet gel. This wet gel is dried, resulting in the PI dry gel (aerogel). In a second method, a PI precursor is synthesized, followed by preparation of a PI precursor solution or swollen bulk. The solution/swollen bulk is gelled to produce a PI precursor wet gel. An imide is then formed from the PI precursor to form a PI wet gel. This wet gel is dried, resulting in the PI dry gel (aerogel). In a third method, a PI precursor is synthesized, followed by preparation of a PI precursor solution or swollen bulk. An imide is then formed from the PI precursor while gelling it to produce a PI wet gel. In a third method, a PI precursor is synthesized, followed by preparation of a PI precursor solution or swollen bulk. The solution/swollen bulk is gelled to produce a PI precursor wet gel. This wet gel is then dried to produce a PI precursor dry gel. An imide is then formed from the PI precursor dry gel to form a PI dry gel (aerogel).

As further examples, Leventis et al. [Polyimide Aerogels by Ring-Opening Metathesis Polymerization (ROMP), Chem. Mater. 2011, 23, 8, 2250-2261] discusses the formation of PI aerogels using the ROMP method. Low-molecular weight imidized oligomers that are end-capped with polymerizable groups are provided and mixed with a polymerization (e.g., ROMP) catalyst. Polymerization is thus initiated, creating a cross-linked polyimide. This polyimide is gelled and dried to form a PI aerogel. Leventis et al. [U.S. Pat. No. 9,745,198; Chidambareswarapattar et al., One-step room-temperature synthesis of fibrous polyimide aerogels from anhydrides and isocyanates and conversion to isomorphic carbons, J. Mater. Chem., 2010, 20, 9666-9678] also teaches formation of a PI aerogel by mixing a dianhydride (e.g., PMDA) with an isocyanate (e.g., 4,4'-diisocyanatodiphenylmethane or methylene di-p-phenyldiisocyanate) to form a sol-gel material. That sol-gel material is then dried to produce the PI aerogel. Leventis et al. [Isocyanate-Derived Organic Aerogels: Polyureas, Polyimides, Polyamides, MRS Proceedings, 1306 (2011), Mrsf10-1306-bb03-01. doi: 10.1557/opl.2011.90] also notes that DESMODUR N 3300A, DESMODUR RE, and MONDUR CD (all obtained from BAYER CORP.) may be utilized as the isocyanate.

In alternative methodologies, Guo et al. [Polyimide Aerogels Cross-Linked through Amine Functionalized Polyoligomeric Silsesquioxane, ACS Appl. Mater. Interfaces 2011, 3, 546-552] discusses the formation of PI aerogels by reacting amino silsesquioxane with polyamic acid oligomers that are end-capped with anhydride groups. The product is imidized using pyridine (though thermal imidization is also contemplated) and gelled, followed by drying to obtain the PI aerogel. Nguyen et al. [Development of High Temperature, Flexible Polyimide Aerogels, American Chemical Society, proceedings published 2011] discuss the creation of a branched polyimide by mixing diamine and dianhydride, and imidizing, followed by a reaction with a multi-amino compound (e.g., 1,3,5-tris(4-aminophenoxybenzene)). This product is then reacted with 4,4'-methylenediisocyanate, and dried to form a PI-urea aerogel.

In other embodiments, Meador et al. [Mechanically Strong, Flexible Polyimide Aerogels Cross-Linked with Aromatic Triamine, ACS Appl. Mater. Interfaces, 2012, 4 (2), pp 536-544] discusses the production of PI gels by cross-linking polyamic acid oligomers that are end-capped with anhydride groups, with aromatic triamine in solution, followed by imidization. The resulting wet is dried to form a PI aerogel. Furthermore, Meador et al. [Polyimide Aerogels with Amide Cross-Links: A Low Cost Alternative for Mechanically Strong Polymer Aerogels, ACS Appl. Mater. Interfaces 2015, 7, 1240-1249] discusses the formation of PI gels by cross-linking amine-capped oligomers with 1,3,5-benzenetricarbonyl trichloride. The resulting gel was dried to form the PI aerogel.

In yet another embodiment, Pei et al. [Preparation and Characterization of Highly Cross-Linked Polyimide Aerogels Based on Polyimide Containing Trimethoxysilane Side Groups, Langmuir 2014, 30, 13375-13383] produces a PI aerogel from polyimide containing trimethoxysilane side groups, which was a condensation product of polyimide containing acid chloride side groups and 3-aminopropyltrimethoxysilane. The resulting gel was dried to form the PI aerogel.

In any one of these methods, suspension of graphene can be added (see Zhang et al., Graphene/carbon aerogels derived from graphene crosslinked polyimide as electrode materials for supercapacitors, RSC Adv., 2015, 5, 1301).

Each of these methodologies can lead to a polyimide aerogel, and the current invention contemplates any suitable method for producing such polyimide aerogel. According to certain embodiments of the current invention, regardless of which methodology is utilized to produce the PI aerogel, the resulting PI aerogel can be pyrolyzed to form a PI-derived carbon aerogel. Additives, such as silicon, can be introduced as well, according to certain embodiments discussed herein.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference should be disregarded.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A carbon composition comprising:
    a carbon material comprising a fibrillar morphology, the fibrillar morphology comprising a plurality of interconnected carbon struts, wherein the interconnected carbon struts define a plurality of pores; and
    a silicon-based material,
    wherein the carbon composition includes greater than about 10% by weight of the silicon-based material, and
    wherein the carbon material is characterized by a Young's modulus of at least about 0.2 GPa and a density of less than 0.1 grams/cubic centimeter.

2. The carbon composition of claim 1, wherein the carbon material has an electrical conductivity of at least about 10 S/cm.

3. The carbon composition of claim 1, wherein the carbon material comprises a carbon aerogel.

4. The carbon composition of claim 3, wherein the carbon material comprises a polyimide-derived carbon aerogel.

5. The carbon composition of claim 1, wherein the carbon material comprises residual nitrogen of at least about 4 wt %.

6. The carbon composition of claim 1, wherein the carbon composition is in a monolith form.

7. The carbon composition of claim 6, wherein the monolithic carbon composition is binder-free.

8. The carbon composition of claim 7, wherein the monolithic carbon composition has a thickness between about 10 micrometers and about 500 micrometers.

9. The carbon composition of claim 1, wherein the carbon composition is in a particulate form.

10. The carbon composition of claim 9, wherein the particulate carbon composition has a diameter of about 1 micrometer to about 50 micrometers.

11. The carbon composition of claim 1, wherein the silicon-based material is present at least partially within a pore of the plurality of pores of the carbon material.

12. The carbon composition of claim 1, wherein the carbon material includes about 25% to 65% of silicon by weight of the carbon material.

13. The carbon composition of claim 1, wherein the carbon composition has a capacity of at least about 800 mAh/g.

14. An electrode comprising the carbon composition of claim 1.

15. An energy storage device comprising the carbon composition of claim 1.

16. The energy storage device of claim 15, wherein the energy storage device is a lithium-ion battery.

17. A method of forming a carbon composition, the method comprising:
    providing a mixture of a polyimide precursor and a silicon-based material,
    imidizing the mixture chemically or thermally;
    drying the imidized mixture to yield a porous polyimide silicon composite; and
    carbonizing the porous polyimide silicon composite to yield the carbon composition that is greater than about 10% by weight silicon and comprises a fibrillar morphology, wherein the fibrillar morphology comprises a plurality of interconnected carbon struts, wherein the interconnected carbon struts define a plurality of pores, and
    wherein the carbon material is characterized by a Young's modulus of at least about 0.2 GPa and a density of less than 0.1 grams/cubic centimeter.

18. The method of claim 17, wherein the carbon composition comprises a carbon aerogel.

19. The method of claim 17, wherein the carbon composition is formed as a monolith.

20. The method of claim 17, further comprising combining the mixture with a medium that is non-miscible with the mixture, thereby forming droplets of the imidized mixture.

21. The method of claim 20, further comprising drying the droplets to form particles.

22. The method of claim 21, wherein the particles have a diameter of about 1 micrometers to about 50 micrometers.

23. The method of claim 17, wherein a maximum carbonizing temperature is between about 750° C. and about 1600° C.

24. The method of claim 17, wherein the silicon-based material is present at least partially within a pore structure of the carbon composition.

25. The method of claim 17, wherein the carbon composition has a capacity of at least about 800 mAh/g.

26. The method of claim 17, wherein the carbon composition has a silicon utilization of at least about 20%.

* * * * *